United States Patent
Sastre-Martinez et al.

(10) Patent No.: US 12,412,571 B2
(45) Date of Patent: Sep. 9, 2025

(54) DIALOG FLOW INFERENCE BASED ON WEIGHTED FINITE STATE AUTOMATA

(71) Applicant: Accenture Global Solutions Limited, Dublin (IE)

(72) Inventors: Javier Miguel Sastre-Martinez, Dublin (IE); Aisling Nugent, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 898 days.

(21) Appl. No.: 17/649,097

(22) Filed: Jan. 27, 2022

(65) Prior Publication Data
US 2023/0237994 A1    Jul. 27, 2023

(51) Int. Cl.
| | |
|---|---|
| *G10L 15/22* | (2006.01) |
| *G06N 20/00* | (2019.01) |
| *G10L 15/193* | (2013.01) |
| *G06F 40/279* | (2020.01) |
| *G10L 15/18* | (2013.01) |

(52) U.S. Cl.
CPC ............ *G10L 15/193* (2013.01); *G06N 20/00* (2019.01); *G10L 15/22* (2013.01); *G06F 40/279* (2020.01); *G10L 15/1822* (2013.01); *G10L 2015/223* (2013.01)

(58) Field of Classification Search
CPC ... G10L 15/22; G10L 15/193; G10L 15/1822; G10L 14/063; G10L 2015/223; G10L 15/197; G10L 15/16; G10L 15/083; G10L 25/30; G06F 40/35; G06F 40/216; G06F 40/30; G06F 40/40; G06F 40/279; G06F 18/23213; G06N 20/00; G06N 3/042; G06N 5/01
USPC ........................................................ 704/242
See application file for complete search history.

(56) References Cited

U.S. PATENT DOCUMENTS

| | | | | |
|---|---|---|---|---|
| 9,473,637 | B1 * | 10/2016 | Venkatapathy | ....... G06F 40/216 |
| 10,157,226 | B1 * | 12/2018 | Costabello | ............ G06N 5/022 |
| 10,262,079 | B1 * | 4/2019 | Costabello | ............ G16H 50/30 |
| 11,715,042 | B1 * | 8/2023 | Liu | ........................ G06N 3/006 |
| | | | | 705/26.1 |
| 11,961,509 | B2 * | 4/2024 | Shukla | ................... G06N 5/022 |

(Continued)

OTHER PUBLICATIONS

Extended European Search Report for Application No. EP22193113, mailed on Jun. 22, 2023, 8 pages.

(Continued)

*Primary Examiner* — Vijay B Chawan
(74) *Attorney, Agent, or Firm* — POLSINELLI PC

(57) ABSTRACT

In some implementations, a system may receive non-deterministic finite state automata (NFSA) to represent a set of dialog flows associated with a human-machine interface. The system may generate a deterministic finite state automaton (DFSA) that includes a minimum set of states that represents all dialog flows included in the set of dialog flows represented in the NFSA and does not represent any dialog flows that are not included in the set of dialog flows represented in the NFSA. The system may traverse the DFSA to identify a set of K paths that have a highest total weight based on a weight assigned to each transition in the DFSA. The system may prune the DFSA to remove any states and any transitions that do not belong to the set of K paths. The system may generate an output related to one or more subsets of the set of K paths.

20 Claims, 43 Drawing Sheets

(56) References Cited

U.S. PATENT DOCUMENTS

| | | | | |
|---|---|---|---|---|
| 12,254,276 | B2* | 3/2025 | Sastre Martinez | G06F 18/23213 |
| 2013/0073503 | A1* | 3/2013 | Nagao | G06N 5/02 706/45 |
| 2015/0324693 | A1* | 11/2015 | Hu | G06N 5/04 706/12 |
| 2019/0065987 | A1* | 2/2019 | Lecue | G06N 5/022 |
| 2019/0066333 | A1* | 2/2019 | Furihata | G06T 7/77 |
| 2020/0057946 | A1* | 2/2020 | Singaraju | G06N 7/01 |
| 2020/0242444 | A1* | 7/2020 | Zhang | G06N 3/042 |
| 2021/0090557 | A1* | 3/2021 | Park | G10L 15/197 |
| 2021/0090563 | A1* | 3/2021 | Kim | G10L 15/22 |
| 2023/0237994 | A1* | 7/2023 | Sastre-Martinez | G10L 15/22 704/255 |
| 2023/0274092 | A1* | 8/2023 | Sastre Martinez | G06F 40/30 704/9 |

OTHER PUBLICATIONS

Bangalore et al., "Learning the Structure of Task-Driven Human-Human Dialogs," Proceedings of the 21st International Conference on Computational Linguistics and 44th Annual Meeting of the Association for Computational Linguistics, Australia, 2006, 8 pages.

Bouraoui et al., "Graph2Bots, Unsupervised Assistance for Designing Chatbots," Proceedings of the SIGDial 2019 Conference, Sweden, 2019, 4 pages.

Bouraoui et al., "Cluster-Based Graphs for Conceiving Dialog Systems," Proceedings of DMNLP, Workshop at ECML/PKDD, Macedonia, 2017, 16 pages.

Chalamalla et al., "Identification of Class Specific Discourse Patterns," Proceedings of the 17th ACM conference on Information and Knowledge Management, United States, 2008, 10 pages.

D'Haro et al., "Speeding Up the Design of Dialogue Applications by Using Database Contents and Structure Information," Proceedings of the SIGDIAL 2009 Conference, United Kingdom, 2009, 10 pages.

Negi et al., "Automatically Extracting Dialog Models from Conversation Transcripts," 2009 Ninth IEEE International Conference on Data Mining, United States, 2009, 6 pages.

Paul, "Mixed Membership Markov Models for Unsupervised Conversation Modeling," Proceedings of the 2012 Joint Conference on Empirical Methods in Natural Language Processing and Computational Natural Language Learning, Korea, 2012, 11 pages.

Qiu et al., "Structured Attention for Unsupervised Dialogue Structure Induction," Proceedings of the 2020 Conference on Empirical Methods in Natural Language Processing, Dominican Republic, 2020, 11 pages.

Vinyals et al., "A Neural Conversational Model," Proceedings of the 31st International Conference on Machine Learning, France, 2015, 8 pages.

Zhai et al., "Discovering Latent Structure in Task-Oriented Dialogues," Proceedings of the 52nd Annual Meeting of the Association for Computational Linguistics (vol. 1: Long Papers), United States, 2014, 11 pages.

Sastre Martinez, "Efficient Finite-State Algorithms for the Application of Local Grammars," Universite Paris-Est, 2011, https://pastel.archives-ouvertes.fr/tel-00621249v2 (submitted Feb. 8, 2012), 497 pages.

* cited by examiner

330
Annotate each state with
number of incoming transitions
to enable topological sort Dialog Modeling System

300

DIALOG FLOW INFERENCE BASED ON WEIGHTED FINITE STATE AUTOMATA

BACKGROUND

A virtual assistant, sometimes referred to as a virtual agent, a digital assistant, or an intelligent personal assistant, is a software agent that can perform various tasks or services based on commands and/or questions provided by a user. For example, the user may ask the virtual assistant questions (e.g., to search for information) and/or the user may request that the virtual assistant perform commands (e.g., to control home automation devices and/or media playback), among other examples. Virtual assistants are typically implemented as voice assistants that are able to interpret human speech and respond via synthesized voices or as chatbots that allow users to ask questions, retrieve information, and/or perform tasks via a text-based interface.

SUMMARY

Some implementations described herein relate to a method. The method may include receiving, by a device, non-deterministic finite state automata (NFSA) to represent a set of dialog flows associated with a human-machine interface, wherein each dialog flow is represented in the NFSA as a set of non-overlapping paths, wherein states in the NFSA are annotated with one or more user utterances, and wherein transitions in the NFSA are annotated with an agent utterance type. The method may include generating, by the device, a deterministic finite state automaton (DFSA) that includes a minimum set of states that represents all dialog flows included in the set of dialog flows represented by the NFSA and does not represent dialog flows that are not included in the set of dialog flows represented in the NFSA. The method may include assigning a weight to each transition in the DFSA. The method may include traversing, by the device, the DFSA to identify a set of K paths that have a highest total weight based on a weight assigned to each transition in the DFSA. The method may include pruning, by the device, the DFSA to remove any states and any transitions that do not belong to the set of K paths that have the highest total weight. The method may include generating, by the device, an output that includes information related to one or more subsets of the set of K paths that have the highest total weight.

Some implementations described herein relate to a dialog modeling system. The dialog modeling system may include one or more memories and one or more processors coupled to the one or more memories. The one or more processors may be configured to receive NFSA to represent a set of dialog flows associated with a human-machine interface, wherein each dialog flow is represented in the NFSA as a set of non-overlapping paths, wherein states in the NFSA are annotated with one or more user utterances, and wherein transitions in the NFSA are annotated with an agent utterance type. The one or more processors may be configured to generate a DFSA that includes a minimum set of states that represents all dialog flows included in the set of dialog flows represented by the NFSA and does not represent dialog flows that are not included in the set of dialog flows represented in the NFSA. The one or more processors may be configured to assign a weight to each transition in the DFSA. The one or more processors may be configured to traverse the DFSA to identify a set of K paths that have a highest total weight based on a weight assigned to each transition in the DFSA. The one or more processors may be configured to prune the DFSA to remove any states and any transitions that do not belong to the set of K paths that have the highest total weight.

Some implementations described herein relate to a non-transitory computer-readable medium that stores a set of instructions for a dialog modeling system. The set of instructions, when executed by one or more processors of the dialog modeling system, may cause the dialog modeling system to receive NFSA to represent a set of dialog flows associated with a human-machine interface, wherein each dialog flow is represented in the NFSA as a set of non-overlapping paths, wherein states in the NFSA are annotated with one or more user utterances, and wherein transitions in the NFSA are annotated with an agent utterance type. The set of instructions, when executed by one or more processors of the dialog modeling system, may cause the dialog modeling system to generate a DFSA that includes a minimum set of states that represents all dialog flows included in the set of dialog flows represented by the NFSA and does not represent dialog flows that are not included in the set of dialog flows represented in the NFSA. The set of instructions, when executed by one or more processors of the dialog modeling system, may cause the dialog modeling system to assign a weight to each transition in the DFSA. The set of instructions, when executed by one or more processors of the dialog modeling system, may cause the dialog modeling system to traverse the DFSA to identify a set of K paths that have a highest total weight based on a weight assigned to each transition in the DFSA. The set of instructions, when executed by one or more processors of the dialog modeling system, may cause the dialog modeling system to prune the DFSA to remove any states and any transitions that do not belong to the set of K paths that have the highest total weight. The set of instructions, when executed by one or more processors of the dialog modeling system, may cause the dialog modeling system to generate an output that includes information related to one or more subsets of the set of K paths that have the highest total weight.

DETAILED DESCRIPTION

The following detailed description of example implementations refers to the accompanying drawings. The same reference numbers in different drawings may identify the same or similar elements.

Many organizations are increasingly turning to virtual assistants, or virtual agents, to handle customer interactions. In particular, interacting with customers was traditionally done by human agents, face-to-face or over a telephone call, and developments in conversational user interface technologies have led to a move toward automating customer interactions in order to offload tasks from human agents, reduce hold times, and/or otherwise provide customers with contextually relevant information in an efficient and cost-effective manner without the complexities and learning curve typically associated with a new technology. For example, in order to emulate a conversation with a real human, a virtual assistant may use a conversational user interface that supports natural language processing to allow the virtual assistant to understand, analyze, and create meaning from user utterances (e.g., spoken utterances for a voice assistant or text-based utterances for a chatbot). Furthermore, in some cases, a conversational user interface may support natural language understanding, which enables sentiment analysis to respond to affective states or subjective information, conversational searches in which a context may be carried throughout a dialog, and/or an ability to handle unstructured inputs that occur in human conversations (e.g., spelling mistakes or misspoken words, stammers, and/or follow-up questions, among other examples). However, deciding which conversation or dialog flows to model in automated virtual assistant is a challenging task.

Figure 1A:
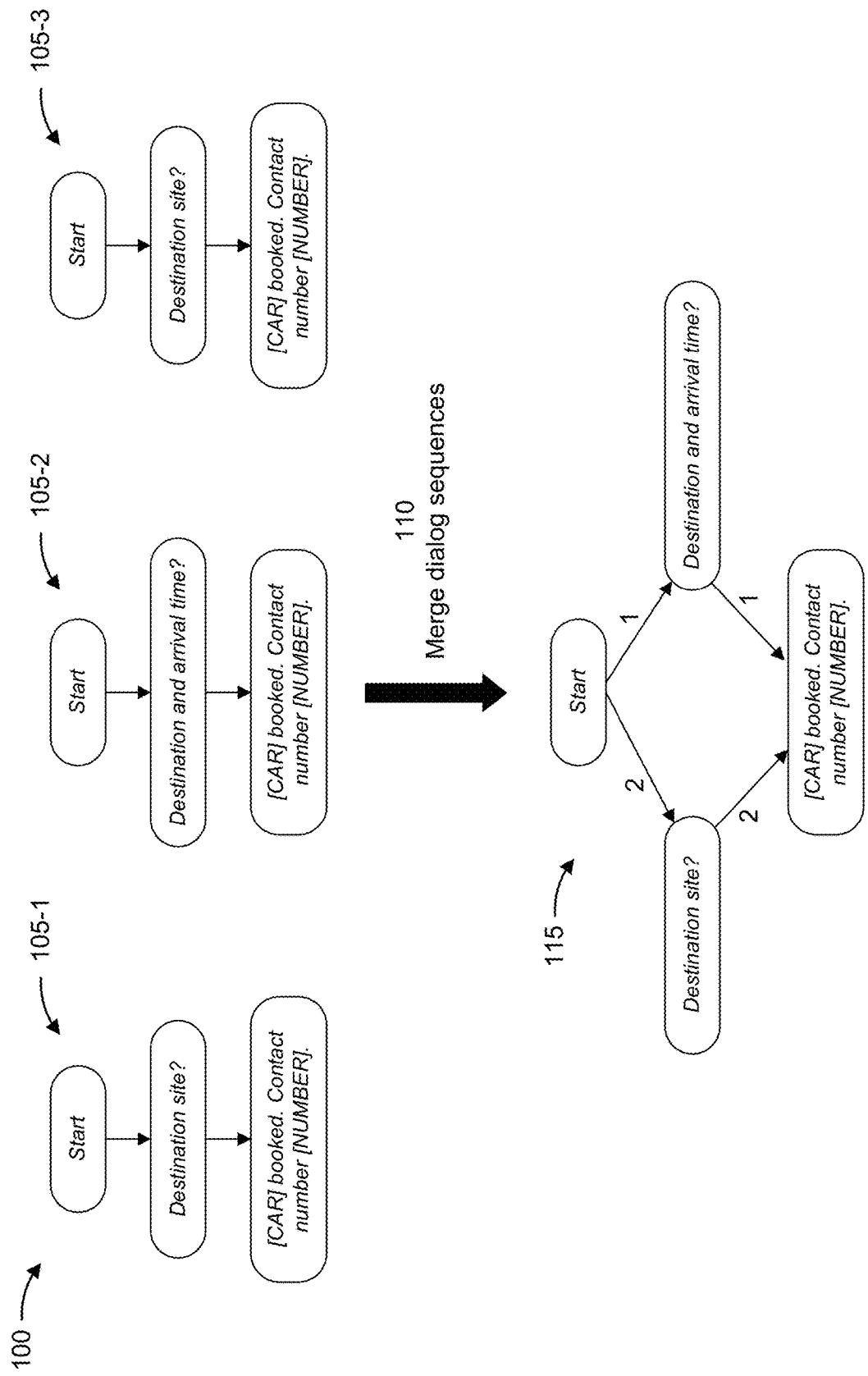
FIGS. 1A-1C are diagrams of an existing dialog inference technique that may be used in an automated conversational flow system.
Figure 1B:
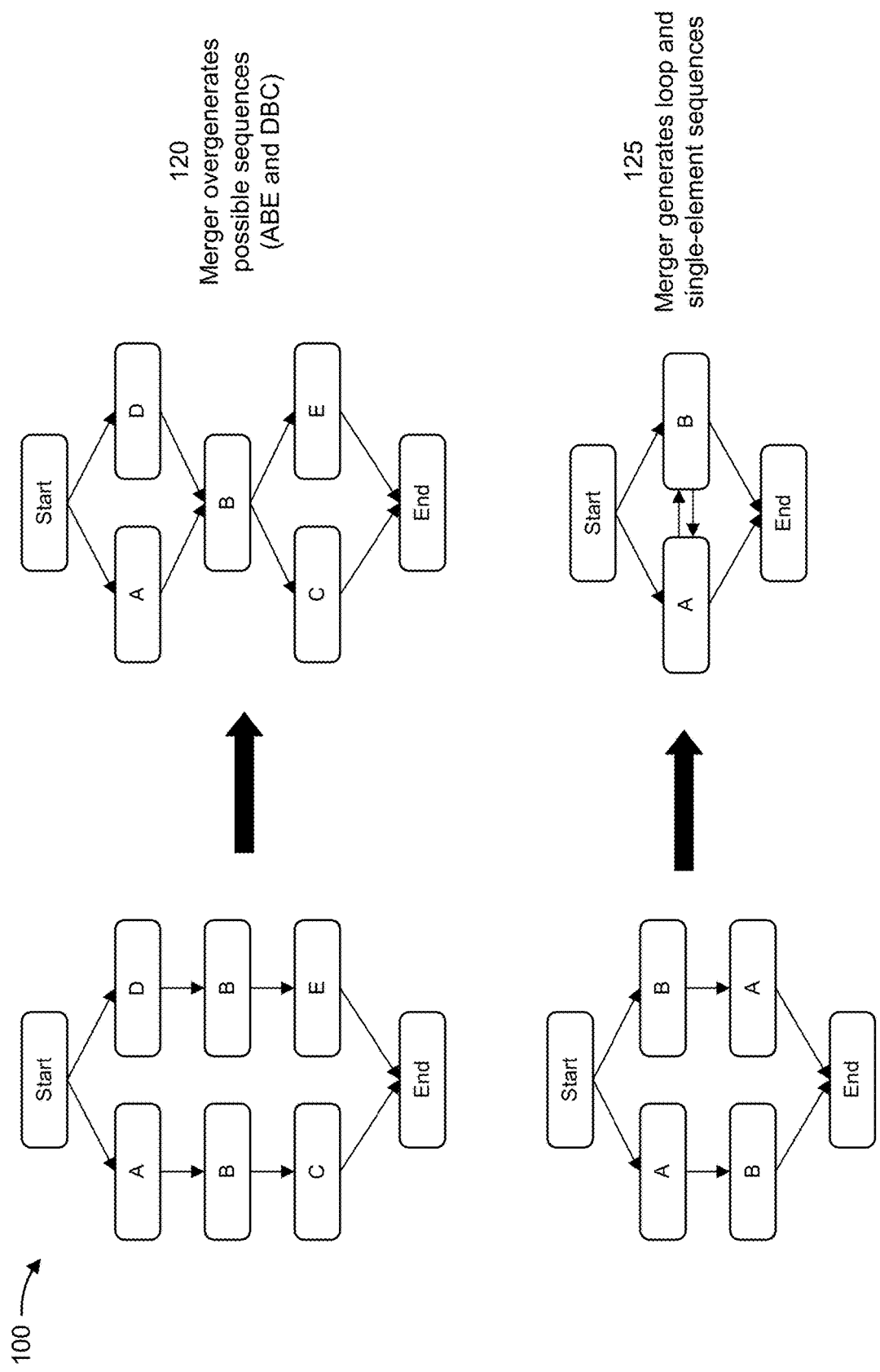
Figure 1C:
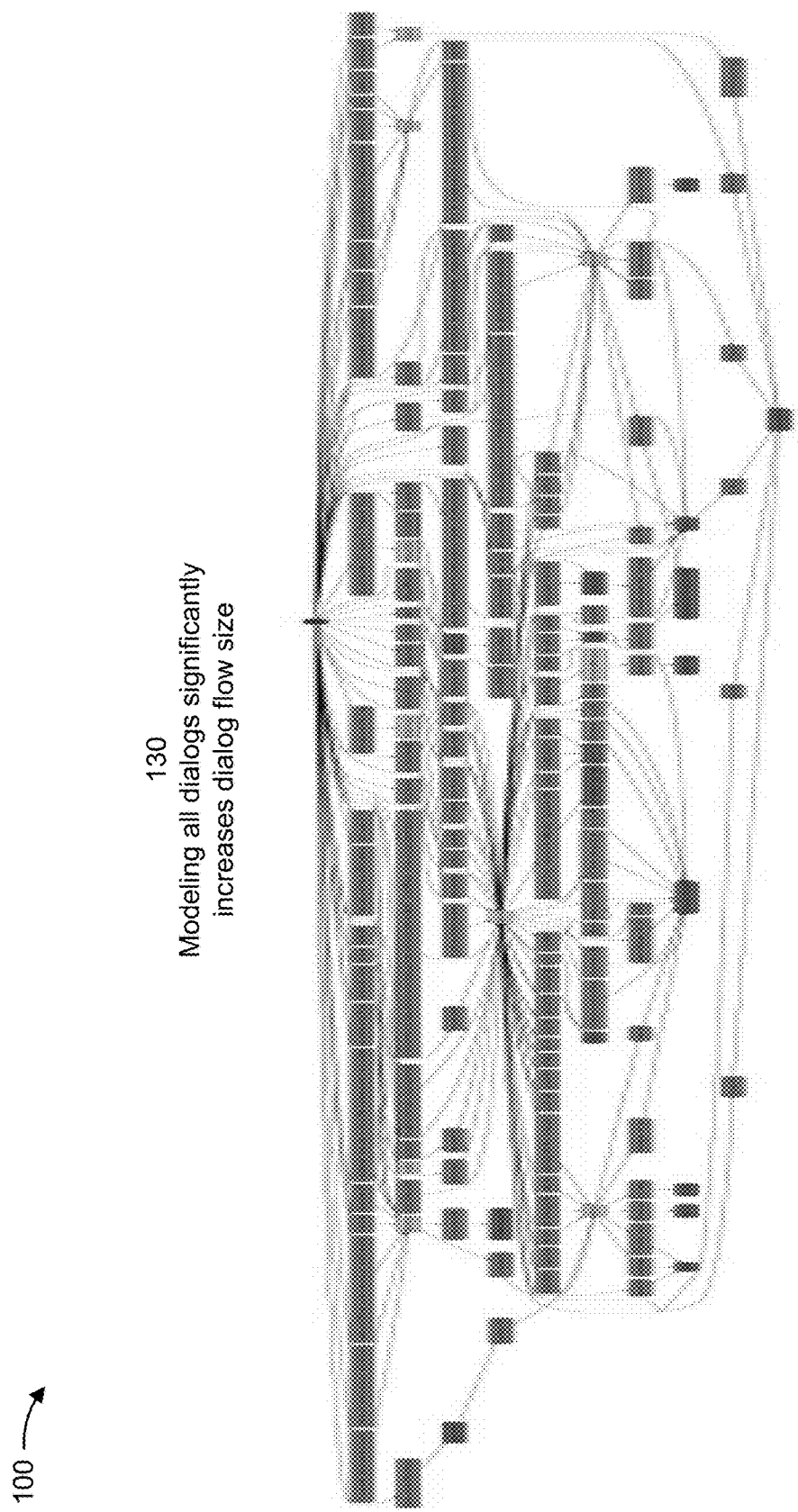

For example, FIGS. 1A-1C are diagrams illustrating an example 100 of an existing dialog inference technique that may use one or more graphs to model dialogs that relate to a particular domain or context. As described herein, the graph may generally model or otherwise represent dialogs, or conversational flows, according to a sequential exchange between a user and an agent (e.g., a virtual assistant) based on topics that are likely to occur discussed during interactions related to a particular domain or context and based on transitions between different topics. For example, in a case where an agent is configured to help make reservations for a hotel chain, the agent may be engineered and configured to handle conversation flows or dialogs related to booking a room, arranging a taxi, and/or booking a meal in a restaurant, among other examples. Accordingly, the graph may generally model different linear sequences of questions, responses, or other utterances that may occur during a dialog. For example, in FIG. 1A, reference number 105-1 depicts a graph to represent a first dialog in which a first agent utterance is a question requesting a destination site, which may be expressed using different utterances that have the same general meaning (e.g., "Where do you want to go?" and "Where are you going?", among other examples), and a second agent utterance confirms that a car has been booked and provides the user with a contact number for a car service that was used to book the car. In other examples, reference number 105-2 depicts a graph to represent a second dialog in which the first agent utterance requests a destination site and an arrival time, and reference number 105-3 depicts a graph to represent a third dialog in which the first agent utterance requests only a destination site (e.g., using a different phrasing than the first dialog). As shown in FIG. 1A, the various dialogs may all share a common final agent utterance to confirm a car has been booked and to provide the user with a contact number.

Accordingly, as shown by reference number 110, the different dialog sequences may be merged to form to a graph that represents the various dialogs. For example, in FIG. 1A, reference number 115 depicts a graph that represents the various dialogs depicted by reference numbers 105-1, 105-2, and 105-3, where the graph includes a start node that is shared by all three dialogs, an intermediate node corresponding to a first agent utterance that may either be a question requesting a destination site or a question requesting a destination site and an arrival time, and a final node corresponding to a second agent utterance confirming that a car has been booked and providing the user with a contact number. Furthermore, each transition is annotated with a value that indicates the number or frequency of equivalent transitions that occur in the different dialogs (prior to the merger). For example, because there are two (2) dialogs where the first agent utterance is a question requesting only a destination site and one (1) dialog where the first agent utterance is a question requesting a destination site and an arrival time, a transition to the node where only the destination site is requested is annotated with a value of 2 and a transition to the node where the destination site and arrival time is requested is annotated with a value of 1. However, although the approach shown in FIG. 1A may be used to model the main interactions that occur in a given set of dialogs and the overall sequence in which the interactions occur, existing dialog inference techniques suffer from an overgeneration problem, whereby the graph that represents the various dialogs that may occur in an automated conversational flow system may include infinite loops and/or dialogs that do not actually occur.

For example, as shown in FIG. 1B, reference number 120 illustrates a first example where merging different dialog sequences may overgenerate the possible dialog sequences (e.g., by including one or more dialog sequences that do not occur and/or are not expected to occur). For example, as shown by reference number 120, a set of dialogs to be modeled may include a first sequence of ABC (where A, B, and C represent agent utterances that occur before and/or after user utterances during a first dialog) and a second sequence of DBE (where D, B, and E represent agent utterances that occur before and/or after user utterances during a second dialog). In this case, the second agent utterance is the same in both dialogs, whereby the first sequence and the second sequence may be merged to form a graph in which the second agent utterance (B) is collapsed into a single node. Although the merger may reduce the size of the graph (e.g., by compressing six nodes into five nodes), the graph that merges the first sequence and the second sequence includes sequences ABE and DBC that do not appear in the set of dialogs to be modeled. In another example, reference number 125 depicts an example where merging sequences AB and BA results in a dialog model that includes an infinite A-B loop, which cannot be deployed in an automated conversational flow system because the user may become stuck in the infinite loop. Furthermore, the dialog model includes A only and B only, which do not occur in the set of dialogs to be modeled.

Moreover, existing approaches to modeling dialogs often place insufficient limits or controls on the number of dialogs that are modeled, instead modeling all possible dialogs that may occur or simply removing low-frequency or low-probability transitions to reduce the dialog flow size. However, as shown in FIG. 1C, and by reference number 130, modeling all dialogs that may occur in automated conversational flow system, including dialogs that may occur rarely or relatively infrequently, can significantly increase the dialog flow size. As a result, the model that represents the possible dialogs may have a very large size, which may require significant resources and/or time to process and/or may lead to users experiencing delays during dialogs with agents (e.g., virtual assistants or virtual agents), among other problems. Furthermore, simply removing low-frequency or low-probability transitions to reduce the dialog flow size may result in one or more dialog fragments being deleted, which creates gaps in the dialog flow.

Some implementations described herein relate to techniques to build representative dialog flow models that are based on various sample dialogs included in a dataset and fine-tuning the representative dialog flow models to a desired level of detail such that an automated conversational flow system can be configured to focus on a subset of the dialogs that are most likely to occur in a given context or domain. For example, as described in further detail herein, a dialog modeling system may receive a dataset that represents a set of dialog flows using non-deterministic finite state automata (NFSA) in which each state (or node) represents one or more user utterances that may occur at a particular point in a dialog and transitions between states represent agent utterances that may occur between the user utterances. In some implementations, the dialog modeling system may minimize the NFSA to build a deterministic finite state automaton (DFSA) that represents the exact set of dialog flows included in the dataset. For example, in some implementations, the minimized DFSA may represent all of the dialog flows that are included in the dataset, and any dialog flows that are not included in the dataset are not represented in the minimized DFSA, thereby avoiding the overgeneration problem described above. Furthermore, in some implementations, the dialog modeling system may employ a top-K carving algorithm to identify the K best paths through the minimized DFSA, where the K best paths may correspond to the dialogs that are most likely to occur or occur the most frequently in a given context or domain, and the dialog building system may prune the minimized DFSA to filter out low-ranked paths (e.g., that do not belong to the K best paths) in order to reduce the dialog flow size. In this way, the dialog building system may generate an output to visualize and/or export information related to different subsets of the K best paths (e.g., within different ranges), which may reduce a cognitive load on a user tasked with reviewing and processing the modeled dialog flows and/or improve efficiency of a virtual assistant or virtual agent using the modeled dialog flows to interact with users (e.g., loading a subset of the dialogs that have a highest frequency, probability, score, and/or other weight, and loading another subset of the dialogs on-demand when a user utterance or an agent utterance leads to a transition that is not included in the subset of the dialogs that have the highest frequency, probability, score, and/or other weight). Furthermore, the top-K carving algorithm described herein may consider the global (e.g., cumulative) score or weight of full dialogs and keep top-scoring or top-weighed full dialogs, whereby low-scoring or low-weighted dialogs may be removed without creating any gaps in the modeled dialog flows.

Figure 2A:
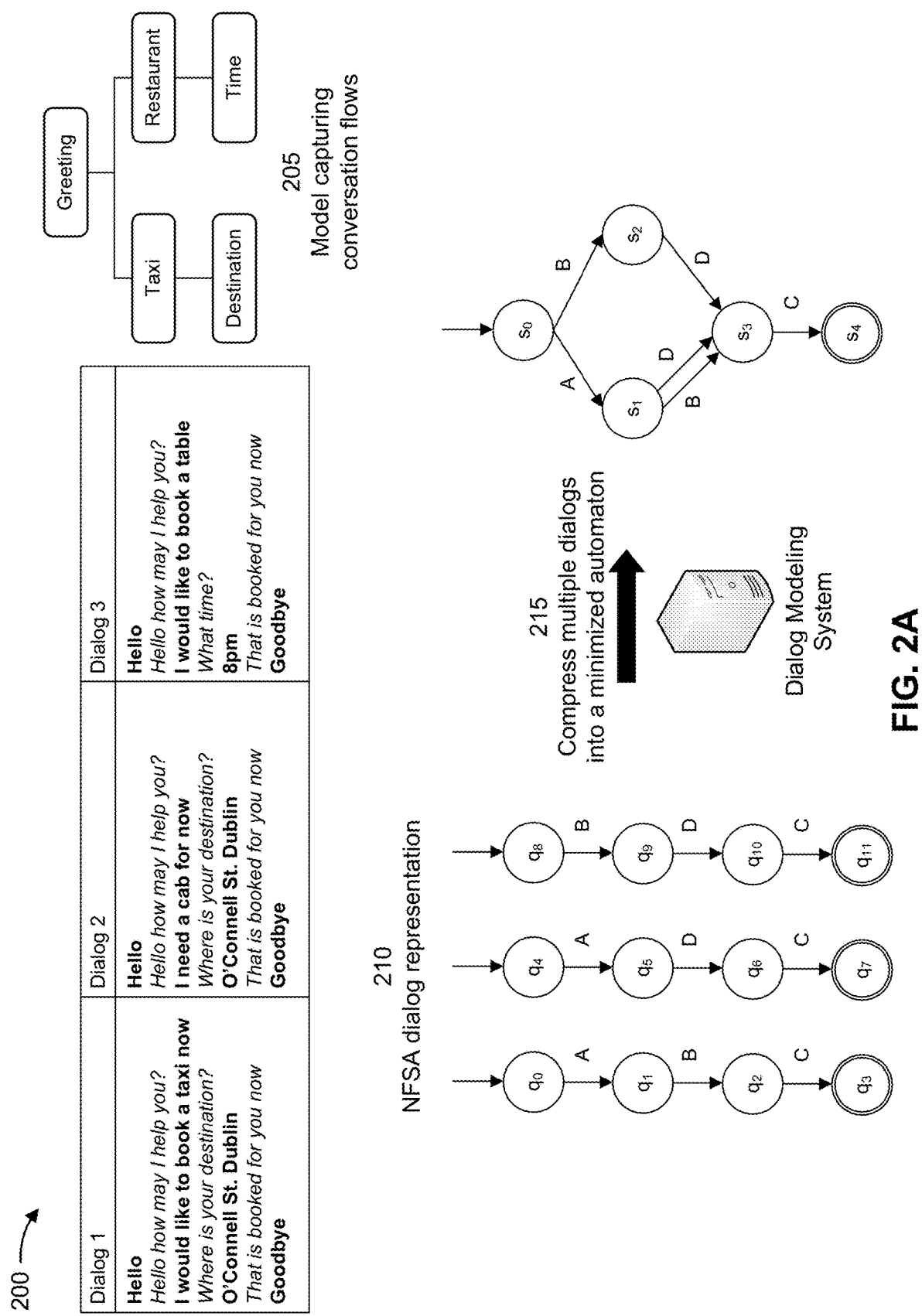
FIGS. 2A-2C are diagrams of an example implementation associated with generating a deterministic finite state automaton (DFSA) and/or a weighted finite state automaton (WFSA) to model dialog flows that may be used in an automated conversational flow system.
Figure 2B:
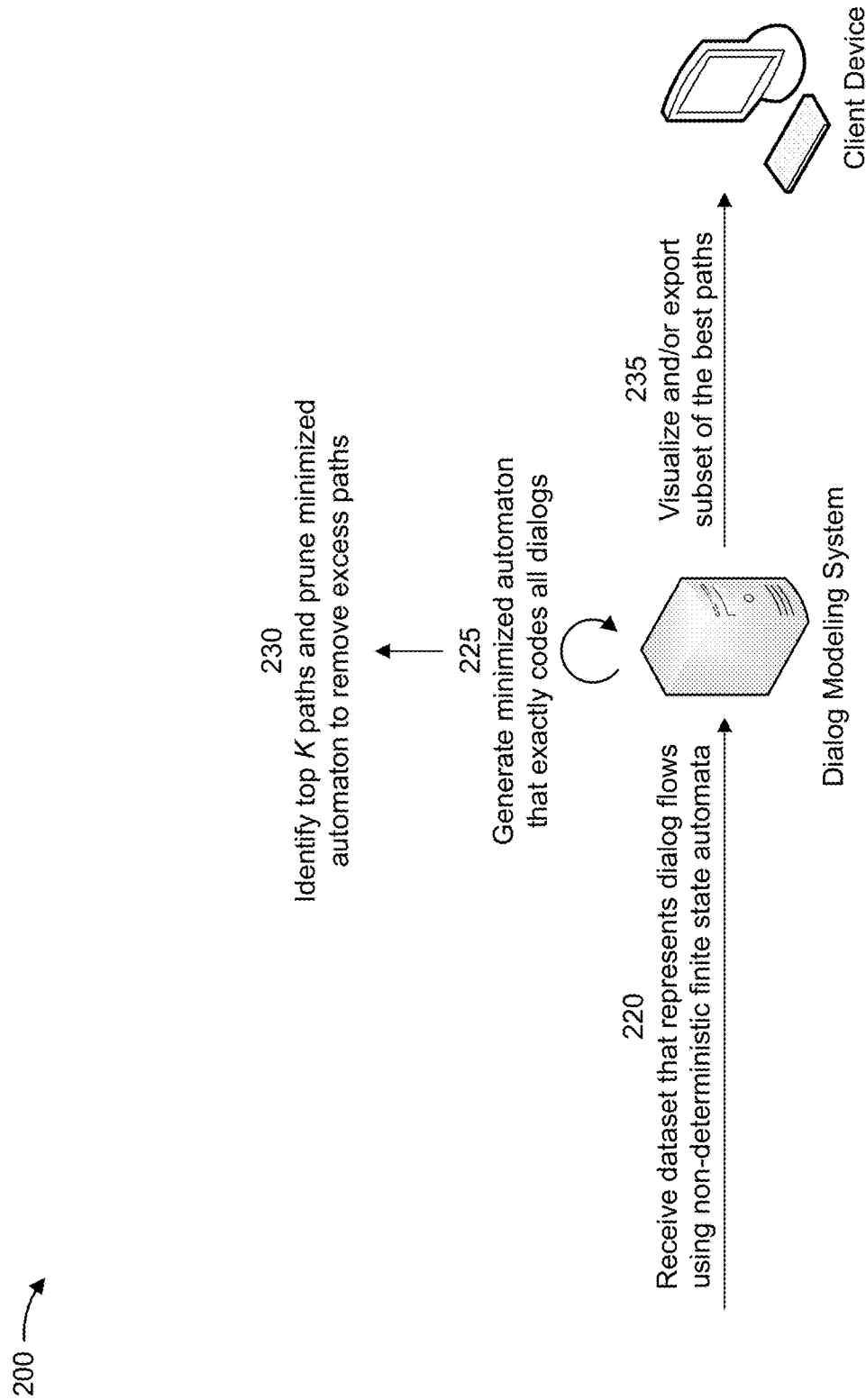
Figure 2C:
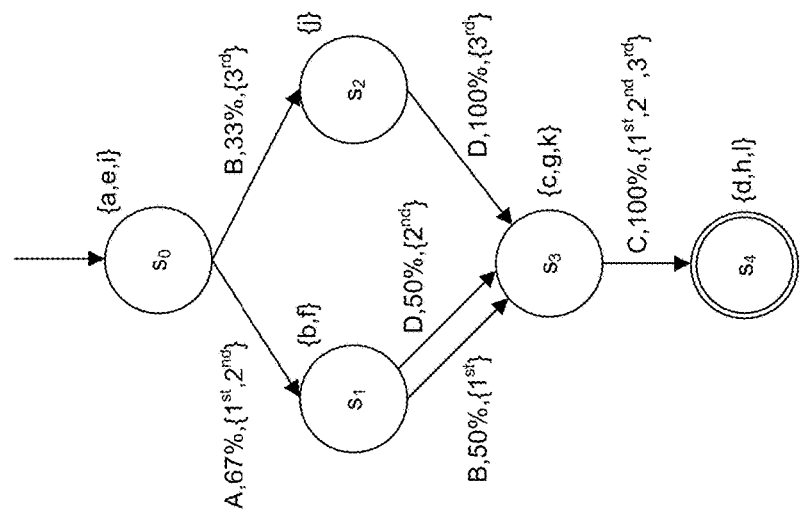
Figure 2C:
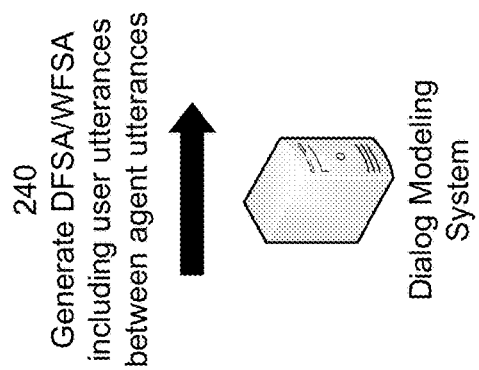
Figure 2C:
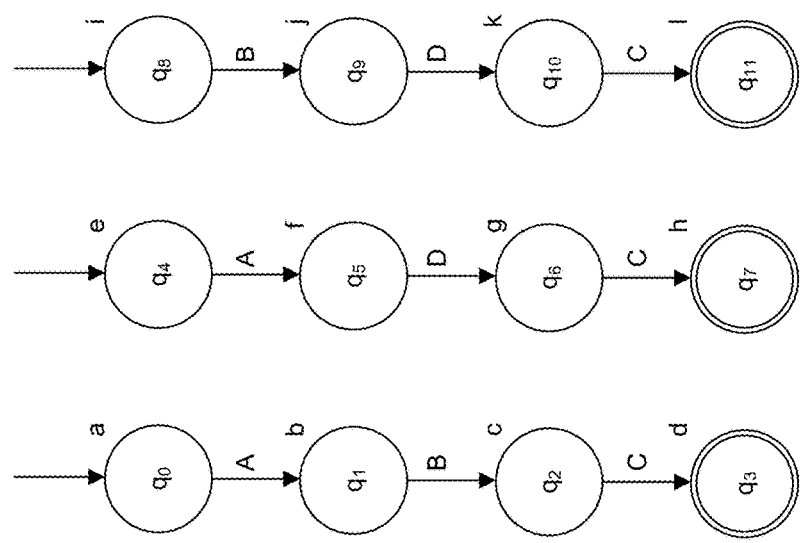

FIGS. 2A-2C are diagrams of an example implementation 200 associated with generating a DFSA and/or a weighted finite state automaton (WFSA) to model dialog flows used in an automated conversational flow system. As shown in FIGS. 2A-2C, example implementation 200 includes a dialog modeling system and a client device. The dialog modeling system and client device are described in more detail below in connection with FIGS. 6-7.

In some implementations, as described herein, example implementation 200 may be used to build a DFSA and/or a WFSA that includes representative dialog flows that can be fine-tuned to a desired level of detail (e.g., pruned to only include a subset of possible dialog flows that have a highest probability of occurring and/or have a highest frequency (e.g., occur most frequently) during a dialog between a human user and an agent). Accordingly, in some implementations, the DFSA and/or WFSA may be used in an automated conversational flow system, where a human-machine interface is implemented as a conversational user interface to enable interaction between a human user and an agent. For example, in some implementations, the agent may be implemented as a voice assistant that provides a voice-based conversational user interface to interpret human speech, perform commands or search for information, and/or generate utterances as output (e.g., speech-based utterances during a telephone call or on a device that has audio output capabilities, such as a smartphone or a smart speaker, and/or text-based utterances on a device that has a screen or another text-based interface). Additionally, or alternatively, the agent may be implemented as a chatbot that provides a text-based conversational user interface to interpret text-based user utterances.

Accordingly, in some implementations, a DFSA and/or a WFSA built using the techniques shown in FIGS. 2A-2C may be used to configure a speech-based conversational user interface or text-based conversational user interface that is focused on a set of dialogs that are most likely to occur in a given domain or context (e.g., transportation booking, a hotel concierge, a customer service call center, a smartphone voice assistant, and/or a home automation system, among other examples). For example, as described in further detail herein, example implementation 200 includes a dialog modeling system that may be build a DFSA and/or a WFSA that includes represents an exact set of dialog flows included in a given dataset (e.g., the DFSA and/or WFSA represents every dialog flow included in the dataset, and does not represent or otherwise overgenerate any dialog flows that are not included in the dataset). Furthermore, as described herein, the dialog modeling system may be configured to prune the DFSA and/or WFSA to filter out low-ranked paths that represent low-weight paths (e.g., low-frequency and/or low-probability paths), which may reduce a cognitive load on one or more users tasked with configuring and/or deploying the DFSA and/or WFSA for the conversational user interface. Additionally, or alternatively, filtering the DFSA and/or WFSA to exclude the low-ranked paths may improve processing efficiency (e.g., reducing delays and improving response time) and/or reduce resource requirements (e.g., storage requirements and/or processing requirements) for the agent implementing the DFSA and/or WFSA in conversational user interface.

As shown in FIG. 2A, and by reference number 205, the dialog modeling system may build the DFSA and/or WFSA based on a model that captures a set of dialog flows that may occur in a given context or domain. For example, in some implementations, agent utterances and users utterances that define the set of dialog flows to be modeled (e.g., agent utterances including questions and responses that may occur during a dialog and user utterances that may appear before, between, and/or after the agent utterances) may be determined using any suitable technique, such as an utterance clusterization technique, and the dialog modeling system may synthesize a model that captures the general essence of the set of dialog flows to be modeled. For example, reference number 205 depicts an example of a set of dialog flows that may be modeled for an agent that provides a concierge service, where user utterances are shown in bold text (e.g., "Hello," "I would like to book a taxi now," and "Goodbye," among other examples) and agent utterances are shown in italic text (e.g., "Hello how may I help you?," "Where is your destination?," and "That is booked for you now," among other examples). Accordingly, as shown in FIG. 2A, the set of dialog flows may be modeled as directed graphs where a root node is a greeting, a first branch includes booking a taxi and specifying a destination, and a second branch includes booking a restaurant and specifying a time. As will be appreciated, the example shown in FIG. 2A includes three relatively simple conversations for clarity and ease of description, but the dialog modeling techniques described in further detail herein may be applied to produce compact dialog flow models that represent any number of conversations (e.g., hundreds or thousands or more) with varying degrees of complexity.

In some implementations, as shown in FIG. 2A, and by reference number 210, the set of dialog flows to be modeled may be represented using a set of NFSA, where each NFSA represents a linear sequence of utterances that may occur during a dialog with an agent. For example, as shown in FIG. 2A, each transition in an NFSA may be annotated with an agent utterance type (e.g., A, B, C, and D may correspond to different types of agent utterances) and/or other suitable metadata. Accordingly, the three NFSA shown in FIG. 2A may be used to represent a first dialog in which the sequence of agent utterance types is ABC, a second dialog in which the sequence of agent utterance types is ADC, and a third dialog in which the sequence of agent utterance types is BDC. Furthermore, each state in the NFSA (e.g., $q_0$, $q_1$, $q_2$, and $q_3$ in the first dialog) represents a state of the dialog, and a final state of the NFSA that represents a conclusion of the dialog is shown using two concentric circles. In some implementations, in addition to annotating the transitions to indicate the type of agent utterances that may occur when a dialog transitions to a next state, one or more states in the NFSA may be annotated with a concatenation of user utterances that may occur before a first agent utterance, between each consecutive pair of agent utterances, and/or after a final agent utterance (e.g., as shown in FIG. 2C and described in more detail with reference to FIGS. 5A-5F). In some implementations, one or more states in the NFSA may be annotated with other suitable metadata in addition to the user utterances.

As further shown in FIG. 2A, and by reference number 215, the dialog modeling system may compress multiple dialogs that are represented by a group of NFSA into a minimized automaton (e.g., a DFSA in the example shown in FIG. 2A). For example, as shown, starting states $q_0$, $q_4$, and $q_8$ are collapsed into a single state $s_0$, which may be followed by a transition of agent utterance type A or agent utterance type B. In the NFSA, agent utterance type A may be used to transition from state $q_0$ to state $q_1$ or from state $q_4$ to state $q_5$, and agent utterance type B may be used to transition from state $q_8$ to state $q_9$. Accordingly, in the minimized automaton, states $q_1$ and $q_5$ are collapsed into state $s_1$, and state $q_9$ is collapsed into state $s_2$. Accordingly, the dialog modeling system may process the various states and transitions in the NFSA to build the minimized automaton, which represents the exact same set of sequences (and no extraneous sequences) with a minimum possible number of states. For example, in FIG. 2A, the sequences ABC, ADC, and BDC that are represented in the NFSA also appear in the minimized automaton, which does not include any other sequences. As described in more detail elsewhere herein (e.g., with reference to FIG. 2B and FIGS. 3A-3H), the dialog modeling system may build the minimized automaton by reversing the NFSA, determinizing the reversed NFSA to form a temporary DFSA, reversing the temporary DFSA, and determinizing the temporary DFSA. For example, in some implementations, the two determinizing steps may generally include collapsing all states that can be reached by the same input subsequence, whereby the dialog states to be modeled may be collapsed from the end of the NFSA to the beginning (after the first reversal) and then from the beginning to the end (after the second reversal). In this way, in addition to building a compressed automaton that may be processed more efficiently, the compressed automaton produced by minimizing the NFSA is deterministic (e.g., only one state can be reached by consuming a given input subsequence).

Accordingly, as shown in FIG. 2B, and by reference number 220, a process for generating a DFSA and/or WFSA to represent a set of dialogs associated with an agent may include receiving a dataset that represents a set of dialog flows using NFSA that represents a set of dialog flows as a set of non-overlapping sequential paths (e.g., one per dialog flow). In particular, the set of dialog flows may be represented as a set of sequences alternating between user utterances and agent utterance types, where the dialog modeling system may build the NFSA, which may then be minimized using techniques described in further detail below with reference to FIGS. 3A-3H. Accordingly, the NFSA that the dialog modeling system builds and processes to generate the DFSA and/or WFSA may generally include a set of non-overlapping paths (e.g., one per dialog), where states in the NFSA are annotated with one or more user utterances and transitions in the NFSA are annotated with an agent utterance type. For example, for each dialog i in the dataset, the dialog modeling system may compute a sequence of types of agent utterances (e.g., agent question and response types) and encode the sequence associated with each dialog i as a linear automaton $A_i$ having the corresponding types of agent utterances as an input alphabet. Furthermore, in some implementations, the dialog modeling system may annotate states in each automaton $A_i$ with a concatenation of user utterances that may occur before, between, and/or after the agent utterances. For example, in some implementations, the dialog modeling system may annotate or otherwise associate each state s of an automaton $A_i$ with one or more user utterances that may occur between the agent utterances associated with a transition pair that includes an incoming transition and an outgoing transition for the state s. Furthermore, for a state without an incoming transition (e.g., an initial state in a dialog), the state may be associated with one or more user utterances that may start the conversation, if any. Similarly, for a state without an outgoing transition (e.g., a final state in a dialog), the state may be associated with one or more user utterances that may end the conversation, if any. Accordingly, because each automaton $A_i$ is linear, each automaton $A_i$ represents one possible sequence, whereby the dialog modeling system may build the NFSA by determining a union of all states and transitions of all automata $A_i$ (e.g., the dialog modeling system may build the NFSA to contain all states and transitions of all automata $A_i$, and equivalent states in the NFSA may be merged when the NFSA is minimized to factor out common subsequences across different dialogs).

In some implementations, as further shown in FIG. 2B, and by reference number 225, the dialog modeling system may generate a minimized automaton that exactly codes all dialogs in the dataset. For example, as described in further detail below with reference to FIGS. 3A-3H, the dialog modeling system may compute an automaton A that recognizes any sequence of agent utterances included in the received dataset as a union of all the dialog automata $A_i$, and the dialog modeling system may then compute the minimized automaton $A_{min}$ by minimizing the automaton A. For example, minimizing the automaton A may include collapsing every potential common path across different dialogs. The dialog modeling system may then traverse the automaton A and the minimized automaton $A_{min}$ synchronously to identify every set of transitions $\Delta$ in the automaton A that is equivalent to each transition $\delta$ in the minimized automaton $A_{min}$, and the dialog modeling system may annotate or otherwise associate each transition $\delta$ in the minimized automaton $A_{min}$ with a quantity of equivalent transitions $\Delta$ in the automaton A, where the quantity of equivalent transitions is a frequency f for the associated transition $\delta$. The dialog modeling system may then normalize the transition frequencies f in the minimized automaton $A_{min}$ to obtain probabilities for each transition $\delta$. For example, given transitions $\delta_1, \delta_2, \ldots, \delta_n$ representing a set of transitions that have a state s as a source state and the respective frequencies $f_1, f_2, \ldots, f_n$, the normalization of a frequency $f_i$ to a probability $p_i$ may be determined by $p_i = f_i / \Sigma f_i$.

Furthermore, in cases where the minimized automaton $A_{min}$ includes user utterances that may appear before, between, and/or after the agent utterances, the dialog modeling system may compute each set of states S in the automaton A that is equivalent to each state s in the minimized automaton $A_{min}$ while synchronously traversing the automaton A and the minimized automaton $A_{min}$ to find equivalent transitions $\Delta$. As the dialog modeling system identifies a set of states S in the automaton A that is equivalent to each state s in the minimized automaton $A_{min}$, the dialog modeling system may decorate s with the set of all user utterances associated with any state in the set of states S (e.g., a state s in the minimized automaton $A_{min}$ inherits all user utterances of all states in the set of states S). In some implementations, for each state s in the minimized automaton $A_{min}$, the dialog modeling system may identify one or more types of user utterances that are associated with the respective state s by applying a clusterization algorithm. For example, the user utterances may be converted into vectors (e.g., using a sentence embedding technique), and the clusterization algorithm may then be applied on the resulting set of vectors (which may be referred to as embeddings in some cases). The clusterization algorithm may then return groups of close-together embeddings, which represent equivalent and/or similar utterances. For example, for each user utterance type that is identified, the dialog modeling system may select the K largest clusters (e.g., the three (3) largest) and drop the remainder. For each remaining cluster, the dialog modeling system may select, as a representative of the cluster, the user utterance having an embedding that is the closest to a centroid of the cluster. The dialog modeling system may then associate each state s with the remaining cluster representatives only.

As further shown in FIG. 2B, and by reference number 230, the dialog modeling system may identify the K top paths in the minimized automaton $A_{min}$, and may remove any excess paths that do not belong to the K top paths). For example, as described in further detail below with reference to FIGS. 4A-4T, the dialog modeling system may use a Viterbi-like algorithm or another suitable algorithm to efficiently identify and mark the K paths within $A_{min}$ with a highest overall weight (e.g., a highest overall probability and/or a highest overall frequency), where the overall weight of a path p may be determined by multiplying all the probabilities of all the transitions in p and/or summing all the frequencies of all the transitions in p, and where K is an integer having a value that is generally less than a total quantity of paths within $A_{min}$ (e.g., top 3, top 10, or top 20, among other examples). Furthermore, the algorithm used to identify the top K paths may associate each transition $\delta$ in the minimized automaton $A_{min}$ with a list of one or more ranks of the top K paths to which the respective transition $\delta$ belongs. Accordingly, the dialog modeling system may then prune the minimized automaton $A_{min}$ to compute a pruned automaton $A_{pruned}$ by removing every state and transition in the minimized automaton $A_{min}$ that does not belong to any of the top K paths. Furthermore, in cases where the pruned automaton $A_{pruned}$ is to include user utterances that may appear before, between, and/or after the agent utterances, the dialog modeling system may also remove any user utterances that are associated with a state s that is removed from the minimized automaton $A_{min}$ while computing the pruned automaton $A_{pruned}$. In other words, removing a state s from the minimized automaton $A_{min}$ also removes the user utterances that are associated with the state s, and states that are not removed from the minimized automaton $A_{min}$ simply keep the user utterances previously associated with the respective states.

Accordingly, as further shown in FIG. 2B, and by reference number 235, the dialog modeling system may generate an output to visualize and/or export information related to one or more subsets of the top K paths. For example, in some implementations, the output may be provided to a client device that is operated by a user who is tasked with developing or otherwise configuring a DFSA and/or a WFSA to be used in an automated conversational flow system. Additionally, or alternatively, the client device may include an automated conversational flow system that uses the DFSA and/or WFSA to implement an agent. In either case, the output may include different versions or different subsets of the pruned automaton $A_{pruned}$, which may be used to visualize or convey information related to different ranges of the top K paths (e.g. a $1^{st}$ path through a $10^{th}$ path, an $11^{th}$ path through a $20^{th}$ path, and/or the top 20% of the top K paths, among other examples) to avoid cognitive overload on the user and/or to avoid overloading resources of the client device while preserving the most important paths (e.g., the paths most likely to occur in a dialog with an agent). For example, in some implementations, selective visualization and/or exporting of information related to the subsets of the top K paths in the pruned automaton $A_{pruned}$ may be enabled by the ranks that are associated with the transitions $\delta$ in the pruned automaton $A_{pruned}$.

Accordingly, as described herein, the dialog modeling system may generally receive a dataset that includes samples of human conversations or dialogs and summarize the sampled conversations or dialogs in a finite state automaton (FSA) model that is compressed and deterministic to capture the essence of human conversations or dialogs related to a particular context or domain and/or weighted to filter out random noise (e.g., low-probability paths that are unlikely or least likely to occur and/or low-frequency paths that occur least frequently during a conversation or dialog). For example, referring to FIG. 2C, the dialog modeling system may generate a DFSA and/or WFSA in which transitions represent various agent utterances that may occur during a conversation or dialog and further in which each state is associated with one or more user utterances that may occur before, between, and/or after the agent utterances. For example, as shown in FIG. 2C, the dialog modeling system may merge three separate vertical flows corresponding to NFSA representations of three different dialogs into a simplified conversation flow model on the right, shown as a deterministic and weighted FSA in which each transition is associated with a probability and the most likely paths are identified and ranked (e.g., as shown within brackets).

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

FIGS. 3A-3H are diagrams of an example implementation 300 associated with minimizing NFSA representing multiple dialogs in order to generate a DFSA and/or a WFSA that exactly represents all dialogs included in the NFSA. As shown in FIGS. 3A-3H, example implementation 300 includes a dialog modeling system. The dialog modeling system is described in more detail below in connection with FIGS. 6-7.

In some implementations, as described herein, the techniques shown in FIGS. 3A-3H may generally be used to compress multiple dialogs that are represented by a group of NFSA into a minimized automaton. For example, as shown by reference number 305 and described above with reference to FIGS. 2A-2C, the dialog modeling system may process various states and transitions included in the NFSA that represent a set of dialogs to be modeled in order to build a minimized automaton that represents the exact same set of sequences (and no extraneous sequences) with a minimum possible number of states. For example, the dialog modeling system may build the minimized automaton by reversing the NFSA, determinizing the reversed NFSA to form a temporary DFSA, reversing the temporary DFSA, and determinizing the temporary DFSA again. As described herein, the determinizing steps may generally include collapsing all states that can be reached by the same input subsequence, whereby the dialog states to be modeled may be collapsed from the end of the NFSA to the beginning and then from the beginning to the end. In this way, in addition to building a compressed automaton that may be processed more efficiently, the compressed automaton produced by minimizing the NFSA is deterministic (e.g., only one state can be reached by consuming a given input subsequence).

Figure 3A:
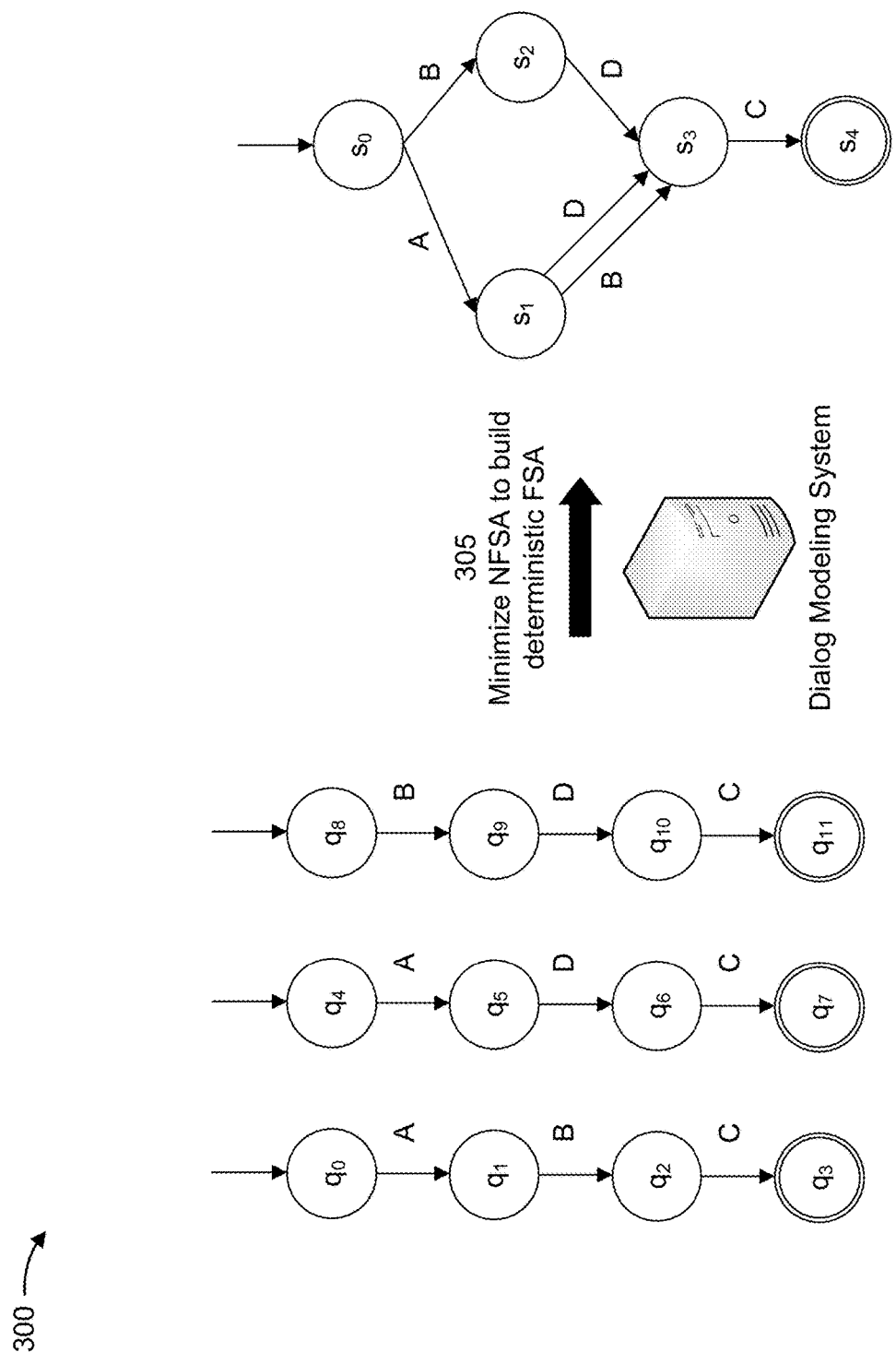
FIGS. 3A-3H are diagrams of an example implementation associated with minimizing non-deterministic finite state automata (NFSA) representing multiple dialogs in order to generate a DFSA and/or a WFSA that exactly represents all dialogs included in the NFSA.

In some implementations, as shown in FIG. 3A, the techniques that the dialog modeling system uses to minimize the NFSA are explained with reference to three example dialogs. For example, agent utterance types in the first dialog may include the sequence ABC, agent utterance types in the second dialog may include the sequence ADC, and agent utterance types in the third dialog may include the sequence BDC. Furthermore, each state in the NFSA (e.g., $q_0$, $q_1$, $q_2$, and $q_3$ in the first dialog) represents a state of the dialog, and a final state representing a conclusion of a dialog is shown using two concentric circles.

Figure 3B:
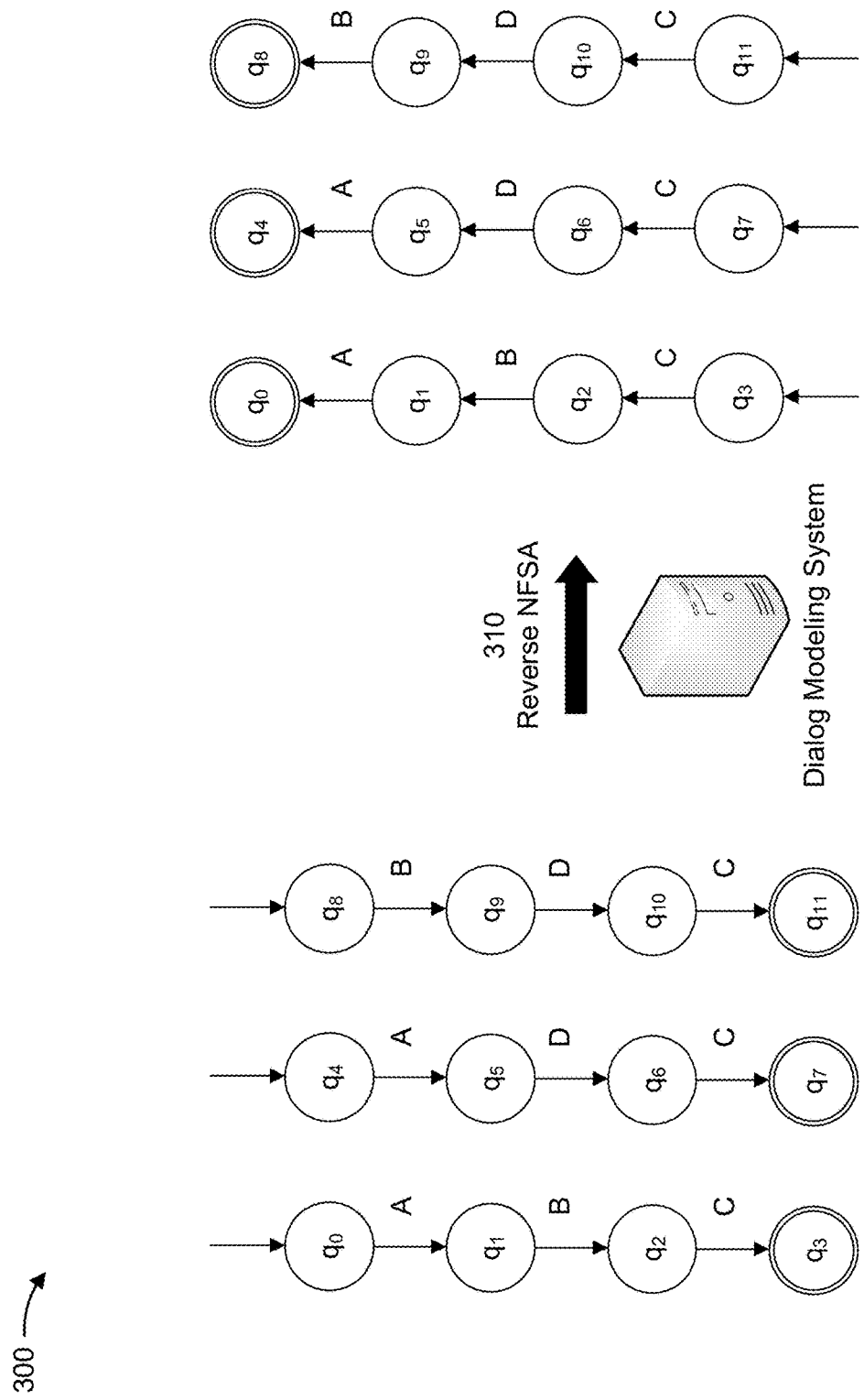

As shown in FIG. 3B, and by reference number 310, the dialog modeling system may initially reverse the NFSA. For example, to reverse the NFSA, the dialog modeling system may change the initial states $q_0$, $q_4$, $q_8$ to final states (shown as two concentric circles on the right) and the dialog modeling system may change the final states $q_3$, $q_7$, $q_{11}$ (shown as two concentric circles on the right) to initial states. Furthermore, to reverse the NFSA, the dialog modeling system may reverse a direction of each transition.

Figure 3C:
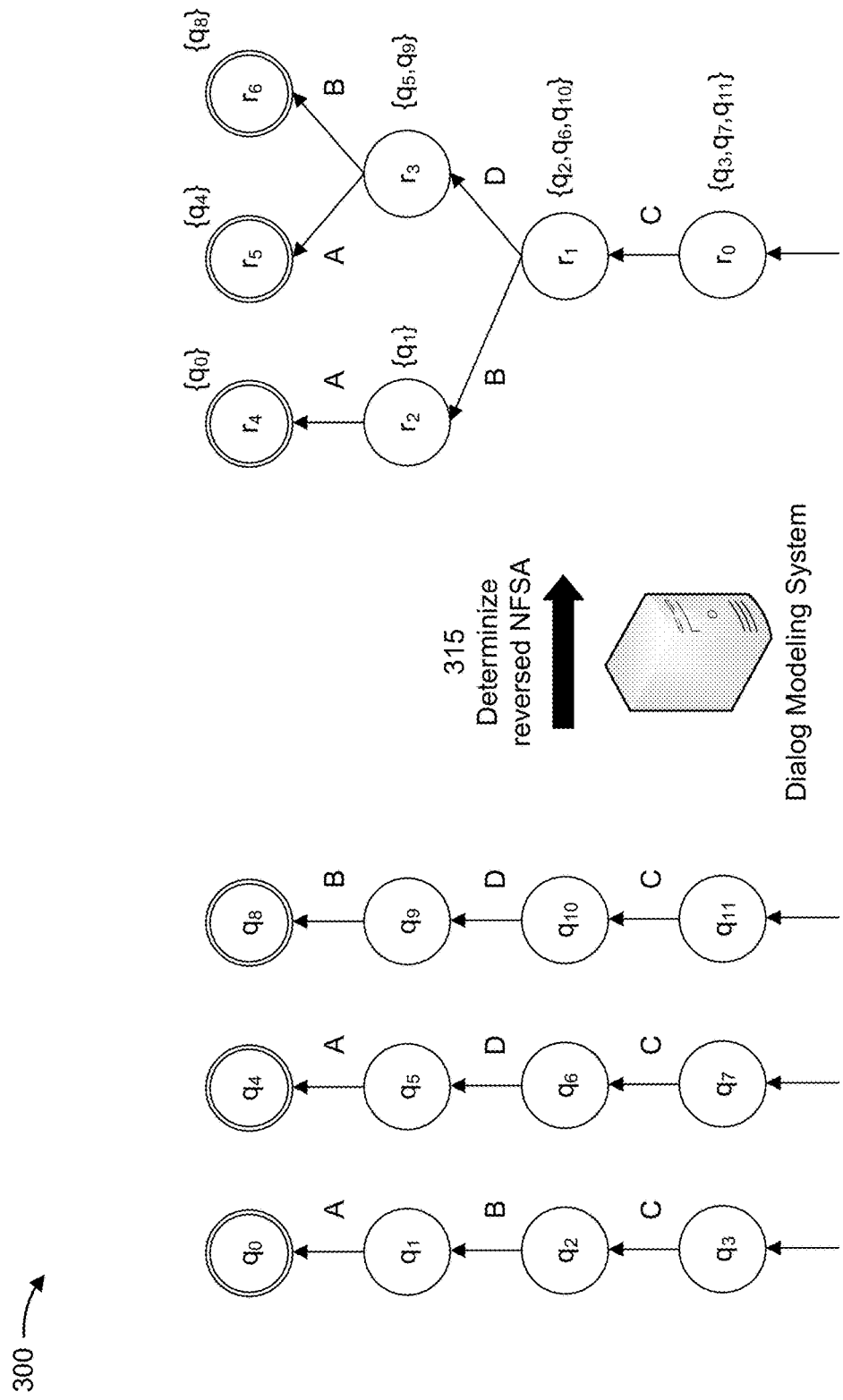

As shown in FIG. 3C, and by reference number 315, the dialog modeling system may determinize the reversed NFSA. For example, in some implementations, the dialog modeling system may determinize the reversed NFSA (e.g., make the reversed NFSA deterministic such that only one state can be reached by consuming a given input subsequence) by collapsing all states that can be reached by the same input subsequence from the end to the beginning of the NFSA. For example, as shown in FIG. 3C, the dialog modeling system may collapse initial states $q_3$, $q_7$, $q_{11}$ into a single initial state $r_0$, which may be annotated with information that indicates the states that were collapsed into the single initial state (e.g., as shown in brackets, where the annotation $\{q_3, q_7, q_{11}\}$ indicates that state $r_0$ corresponds to states $q_3$, $q_7$, and $q_{11}$). Furthermore, starting from the states $q_3$, $q_7$, or $q_{11}$ collapsed into state $r_0$, states $q_2$, $q_6$, $q_{10}$ may be reached by consuming the input subsequence C, whereby the dialog modeling system may collapse states $q_2$, $q_6$, $q_{10}$ into a single state $r_1$. As further shown, starting from the states $q_2$, $q_6$, or $q_{10}$ collapsed into state $r_1$, state $q_1$ may be reached by consuming the input subsequence B and states $q_5$, $q_9$ may be reached by consuming the input subsequence D. Accordingly, state $q_1$ may be collapsed into state $r_2$ that is reachable from $r_1$ by consuming the input subsequence B, and states $q_5$, $q_9$ may be collapsed into state $r_3$ that is reachable from $r_1$ by consuming the input subsequence D. In this way, the dialog modeling system may continue to traverse through the reversed NFSA, collapsing all states that can be reached by the same input subsequence from the end to the beginning of the NFSA, to determinize the reversed NFSA.

Figure 3D:
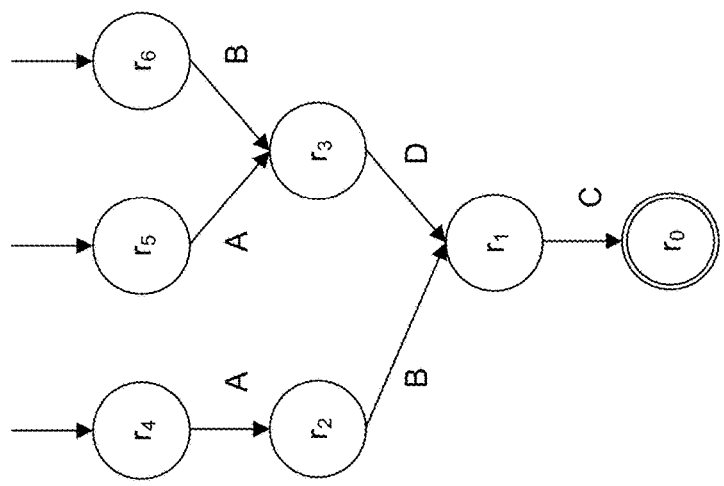
Figure 3D:
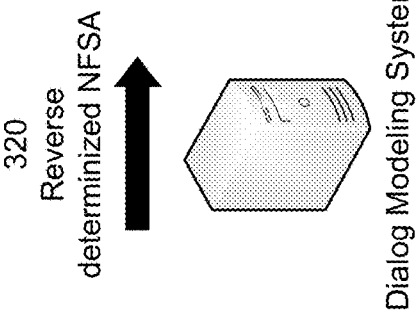
Figure 3D:
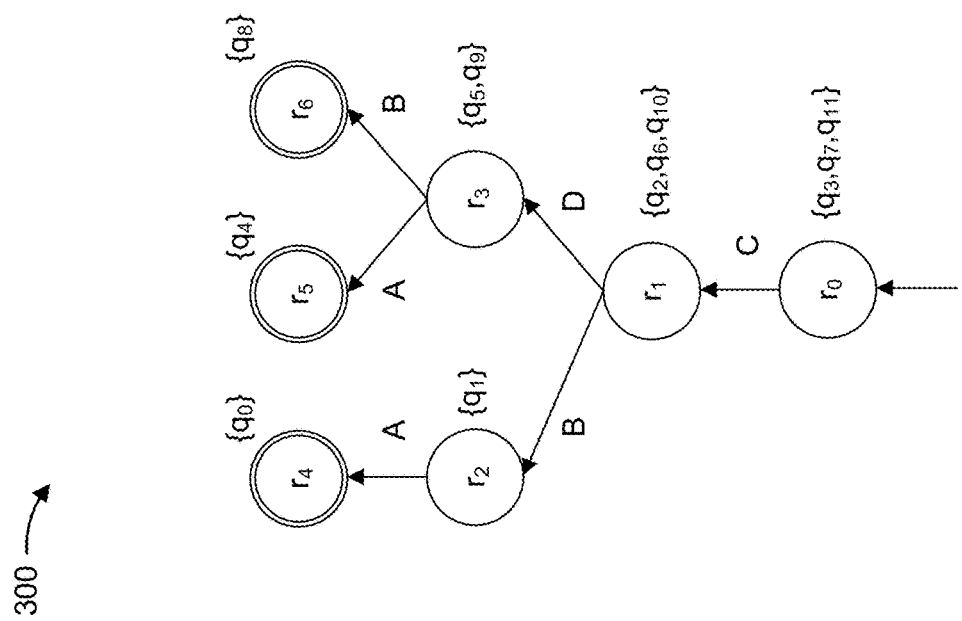

As shown in FIG. 3D, and by reference number 320, the dialog modeling system may then reverse the determinized FSA a second time. For example, after determinizing the reversed NFSA, the dialog modeling system may change the initial state $r_0$ to a final state (shown as two concentric circles on the right) and the dialog modeling system may change the final states $r_4$, $r_5$, $r_6$ (shown as two concentric circles on the left) to initial states. Furthermore, the dialog modeling system may reverse a direction of each transition in the determinized NFSA.

Figure 3E:
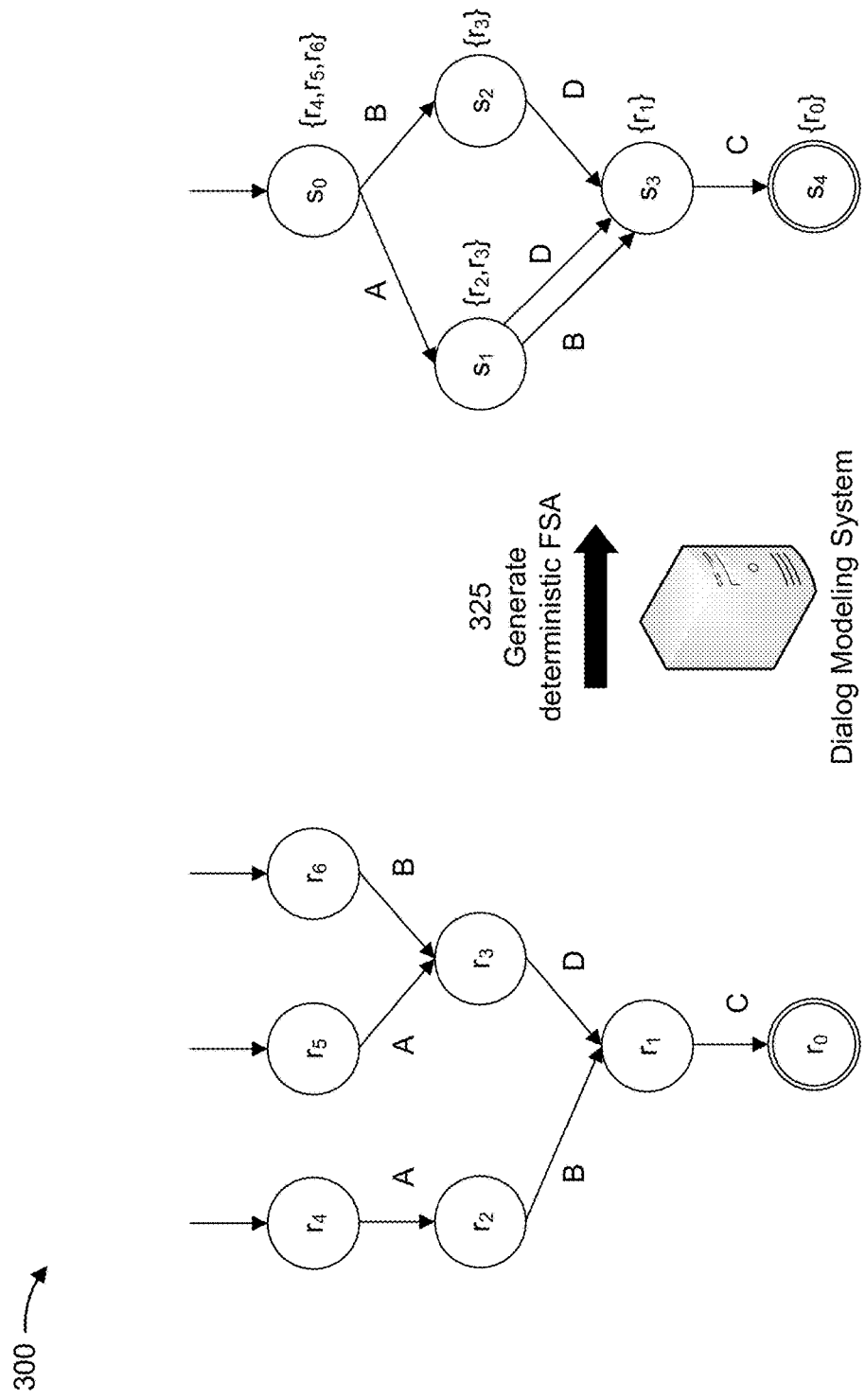

As shown in FIG. 3E, and by reference number 325, the dialog modeling system may determinize the FSA a second time to generate a minimized deterministic FSA (DFSA). For example, in a similar manner as described above, the dialog modeling system may determinize the FSA the second time by again collapsing all states that can be reached by the same input subsequence, except from the beginning to the end. For example, as shown in FIG. 3E, the dialog modeling system may collapse initial states $r_4$, $r_5$, $r_6$ into a single initial state $s_0$, which may be annotated with information that indicates the states that were collapsed into the single initial state (e.g., as shown in brackets). Furthermore, starting from the states $r_4$, $r_5$, $r_6$ collapsed into state $s_0$, consuming the input subsequence A may reach state $r_2$ (from state $r_4$) or state $r_3$ (from state $r_5$), whereby the dialog modeling system may collapse states $r_2$, $r_3$ into a single state $s_1$. In this way, the dialog modeling system may continue to traverse through the reversed FSA, collapsing all states that can be reached by the same input subsequence from the beginning to the end.

Figure 3F:
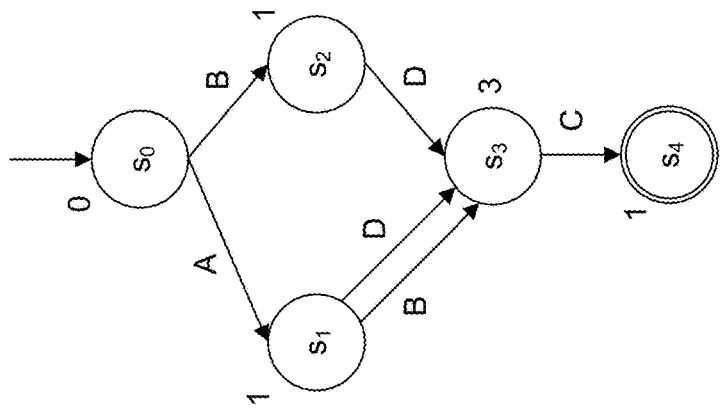
Figure 3F:
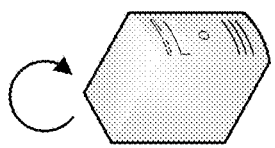

Accordingly, as shown in FIG. 3F, and by reference number 330, the dialog modeling system may annotate each state in the minimized FSA with a number that indicates a quantity of incoming transitions, which may be a first step in computing a topological sort of the minimized FSA. For example, in a topological sort performed by the dialog modeling system, each state may correspond to a task and each transition may represent a task dependency, whereby the topological sort may include ordering all states in the minimized automaton such that no task appears before another task that it depends on. In particular, the dialog modeling system may find a topological sort of the minimized FSA, where the topological sort is a possible ordering of all states in the minimized FSA such that no state $s_j$ that is reachable from a state $s_i$ appears before state $s_i$ in the sequence. For example, in FIG. 3F, the minimized FSA may be topologically sorted as $s_0$, $s_1$, $s_2$, $s_3$, $s_4$ or as $s_0$, $s_2$, $s_1$, $s_3$, $s_4$, where the order of $s_1$ and $s_2$ can be inverted because $s_1$ and $s_2$ do not depend on each other. Accordingly, in order to compute the topological sort, the dialog modeling system may first annotate each state with the number of incoming transitions (e.g., the number of dependencies for each task). For example, initial state so is annotated with a zero (0) because there is no preceding state, state $s_1$ is annotated with a one (0) because there is one incoming transition, state $s_3$ is annotated with a three (3) because there are three incoming transitions, and so on. To perform the topological sort, the dialog modeling system may then traverse the minimized automaton, starting from state $s_0$, and each time that a transition is visited or explored, the counter of the target state is decremented by one (e.g., one fewer dependency to solve). Furthermore, when performing the topological sort, the dialog modeling system does not proceed with exploring reached states until the associated counter has reached zero (0), meaning that all dependencies have been resolved. The process may then be repeated until there are no states left to explore, and the result of the topological sort may correspond to an order in which the various states are explored, which defines an order in which the various states will subsequently be explored to assign weights (e.g., frequencies and/or probabilities) to the transitions to enable carving or pruning the minimized DFSA (e.g., as described in further detail below with reference to FIGS. 4A-4T). For example, in FIG. 3F, the order returned by the topological sort may be $s_0$, $s_1$, $s_2$, $s_3$, $s_4$.

Figure 3G:
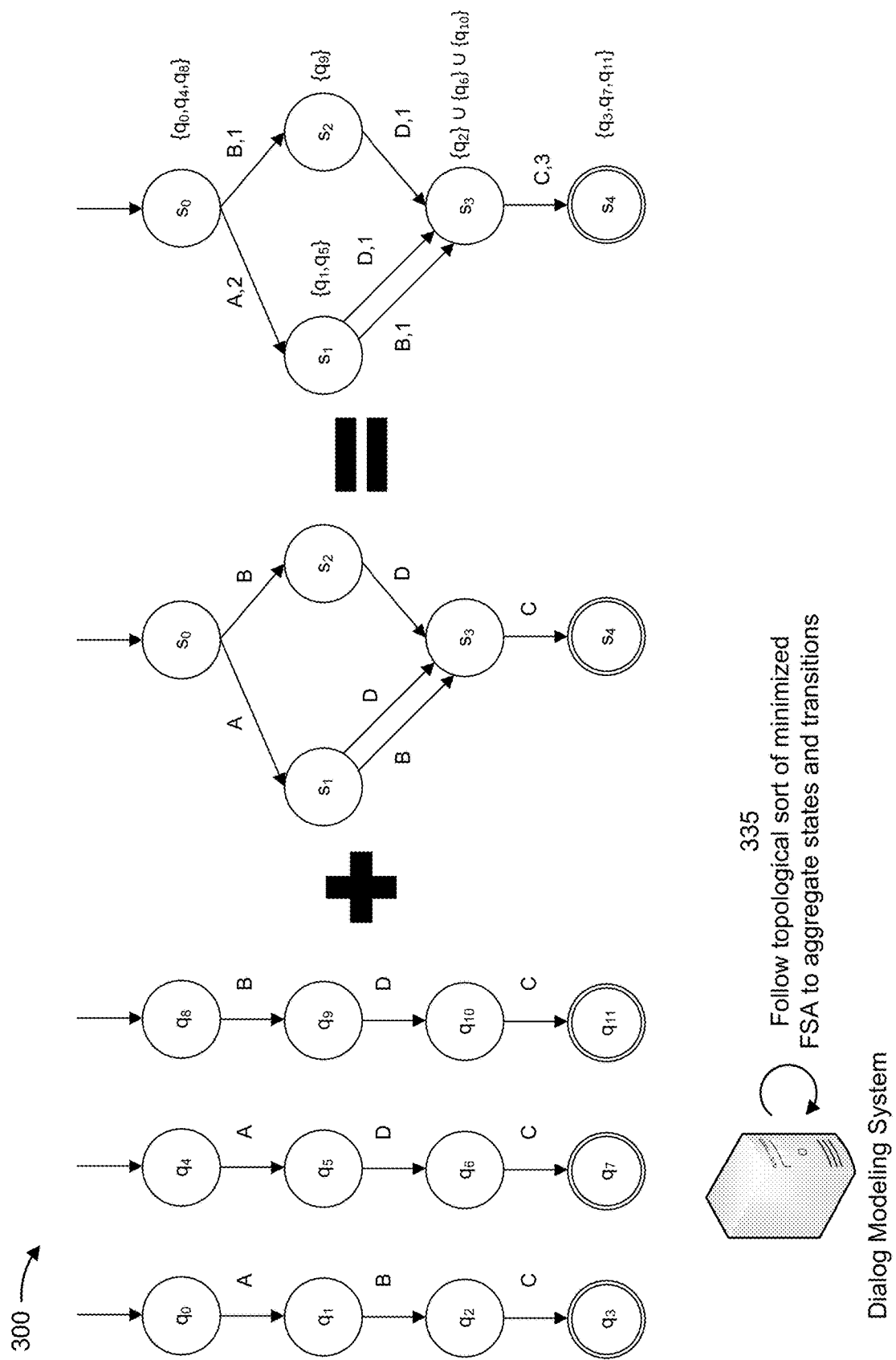

As shown in FIG. 3G, and by reference number 335, the dialog modeling system may then aggregate states and transitions associated with the NFSA by following a topological sort of the minimized automaton. For example, the dialog modeling system may aggregate user utterances and/or other data associated with merged states, and may annotate the corresponding state in the minimized DFSA with the result of the aggregation. Furthermore, the dialog modeling system may aggregate counts of merged transitions and may annotate the corresponding transition in the minimized DFSA with the aggregated counts. In particular, as described herein, the non-minimized NFSA is equivalent to the minimized automaton, whereby the dialog modeling system may follow a topological sort of the minimized automaton to track which states and transitions in the minimized automaton correspond to which states and transitions in the non-minimized NFSA. Accordingly, the dialog modeling system may copy any data annotating the states of the non-minimized NFSA (e.g., user utterances) to the equivalent states in the minimized automaton, and frequencies may be added to the transitions in the minimized automaton according to a quantity of equivalent transitions in the non-minimized NFSA. In other words, properties of merged states and transitions in the non-minimized NFSA may be aggregated to serve as annotations for the corresponding states and transitions in the minimized DFSA. In this way, each transition in the minimized automaton may be associated with a frequency that indicates a quantity of equivalent transitions included in the NFSA, where adding the transition frequencies to the minimized DFSA makes the minimized DFSA a weighted finite state automaton (WFSA).

Figure 3H:
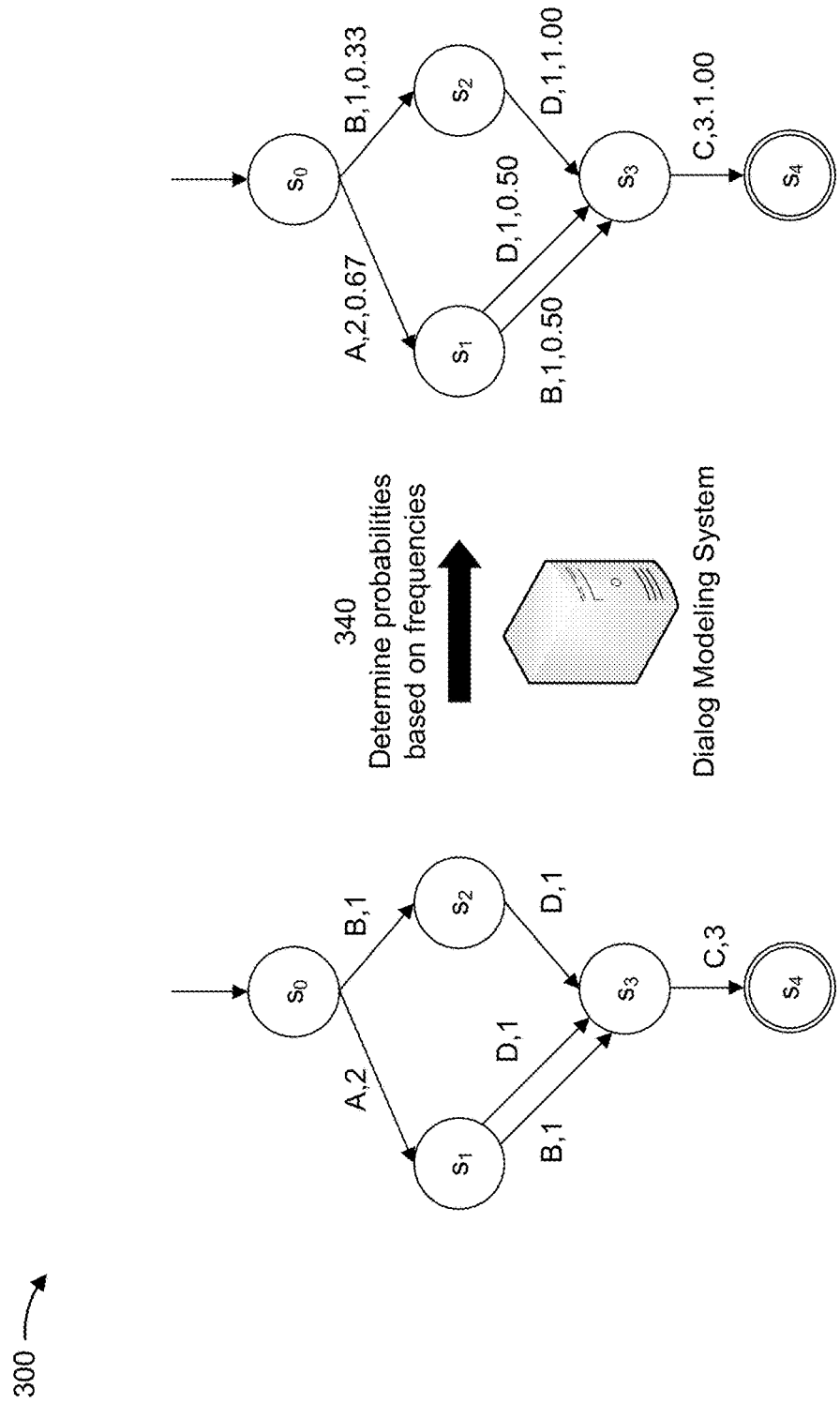

As shown in FIG. 3H, and by reference number 340, the dialog modeling system may determine probabilities to assign to the various transitions based on the frequencies assigned to each respective transition in the minimized DFSA/WFSA. For example, the dialog modeling system may determine, for each state, a sum of the frequencies associated with all outgoing transitions from the respective state, and the dialog modeling system may further determine a frequency associated with each respective transition. Accordingly, a probability for a given transition may be obtained by dividing the frequency associated with the transition by the sum of the frequencies associated with all outgoing transitions from the previous state. For example, in FIG. 3H, state $s_0$ has two (2) outgoing transitions, including a first transition from state $s_0$ to state $s_1$ that has a frequency of two and a second transition from state $s_0$ to state $s_2$ that has a frequency of one (1). Accordingly, the first transition from state $s_0$ to state $s_1$ that has a frequency of two (2) may be associated with a probability of 0.67 or 67% and the transition from state $s_0$ to state $s_2$ that has a frequency of one (1) may be associated with a probability of 0.33 or 33%. Similarly, state $s_1$ has two (2) outgoing transitions, whereby the transition from state $s_1$ to state $s_3$ that is associated with the input symbol B (e.g., a first type of agent utterance) is associated with a probability of 0.50 or 50% and the transition from state $s_1$ to state $s_3$ that is associated with the input symbol D (e.g., a second type of agent utterance) is associated with a probability of 0.50 or 50%.

As indicated above, FIGS. 3A-3H are provided as an example. Other examples may differ from what is described with regard to FIGS. 3A-3H.

Figure 4A:
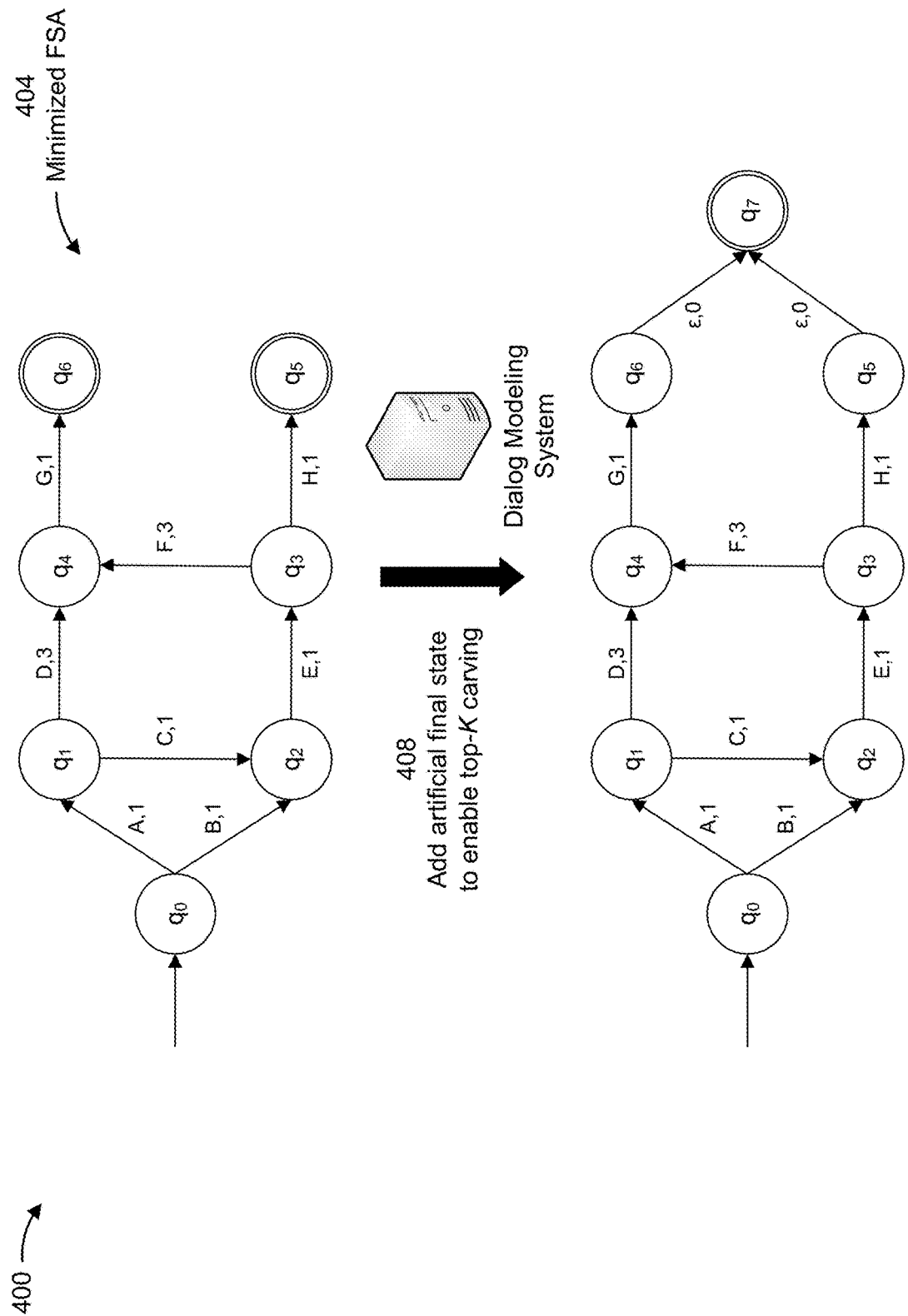
FIGS. 4A-4T are diagrams of an example implementation associated with pruning a DFSA/WFSA to include only a set of K top paths having a highest overall weight based on a frequency or a probability of occurring during a dialog flow in an automated conversational flow system.
Figure 4B:
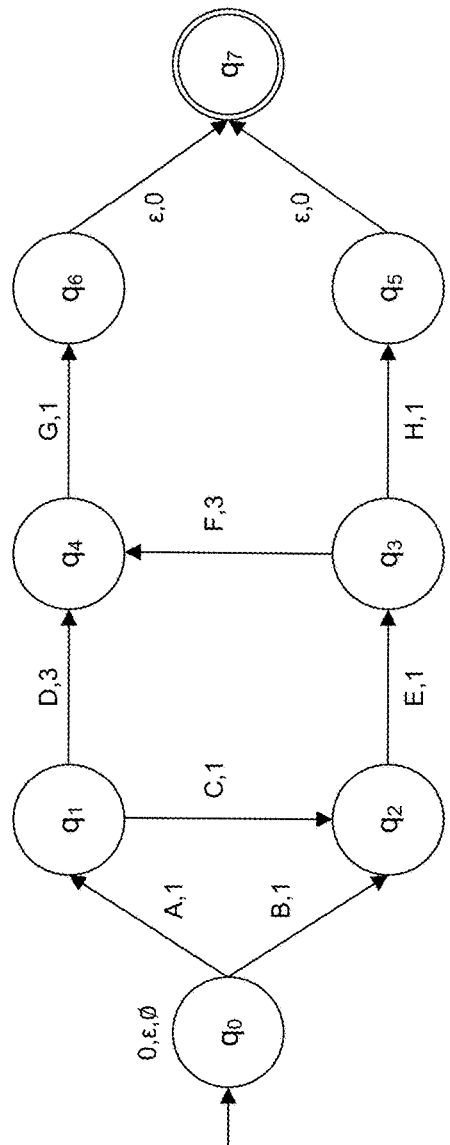
Figure 4C:
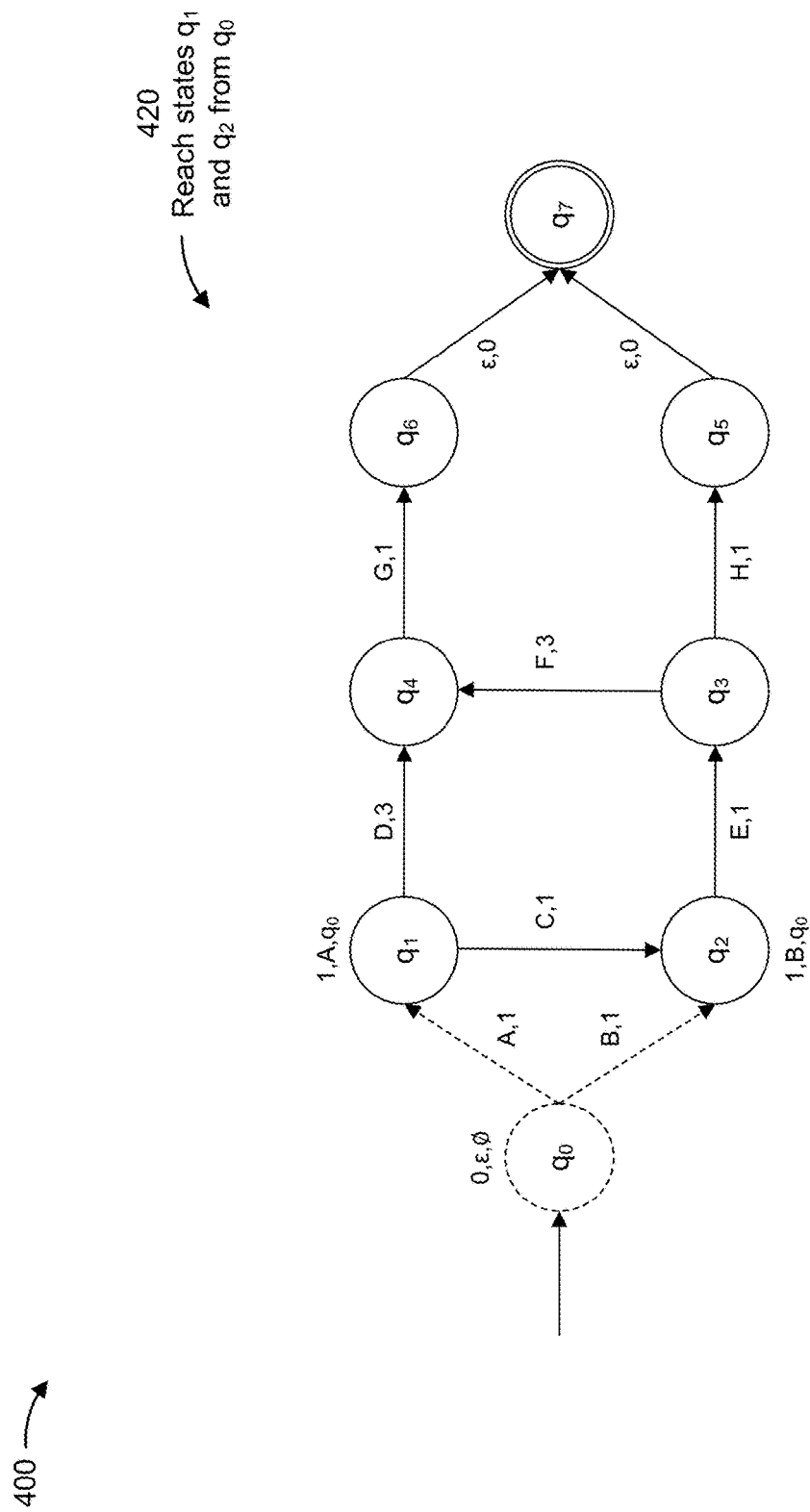
Figure 4D:
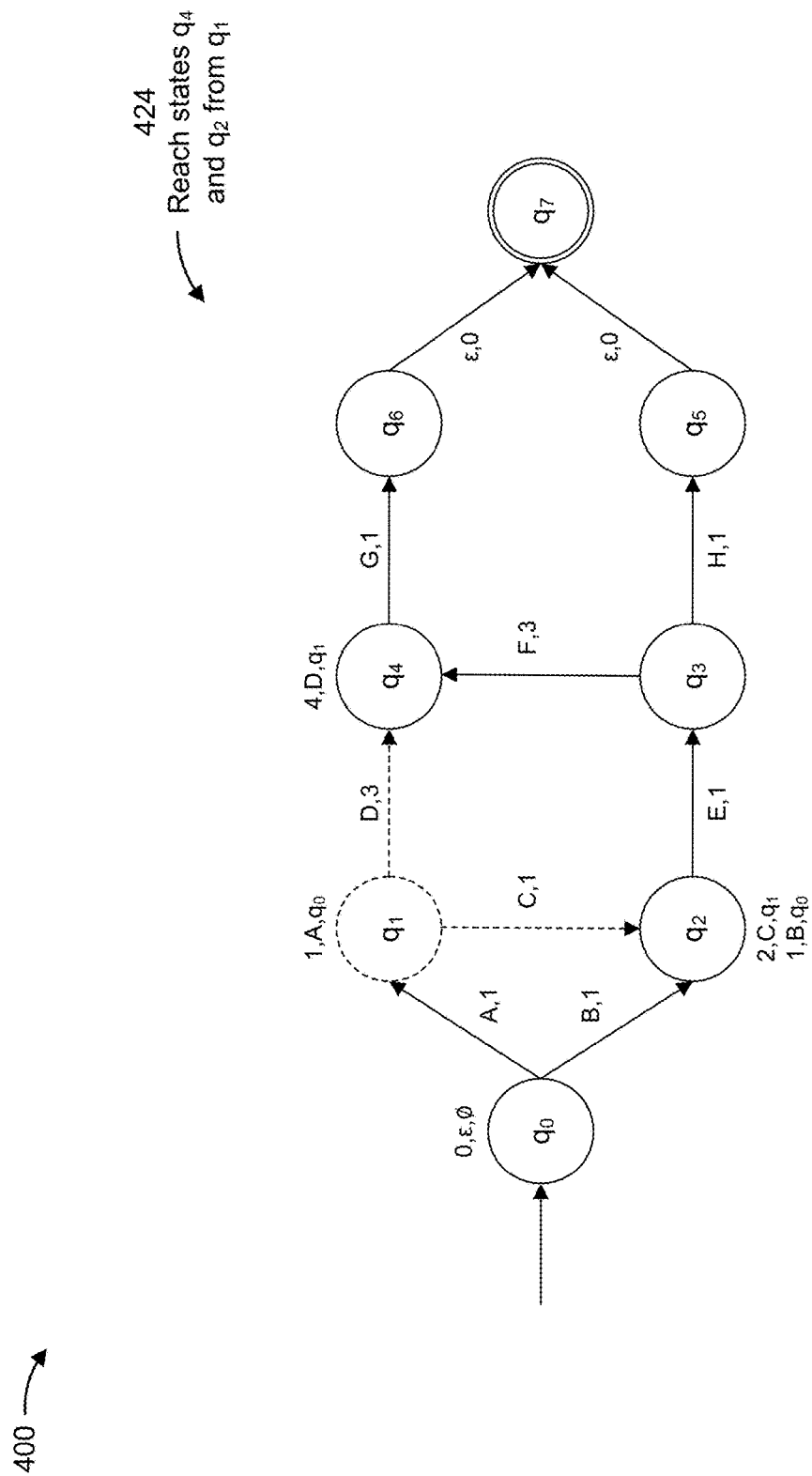
Figure 4E:
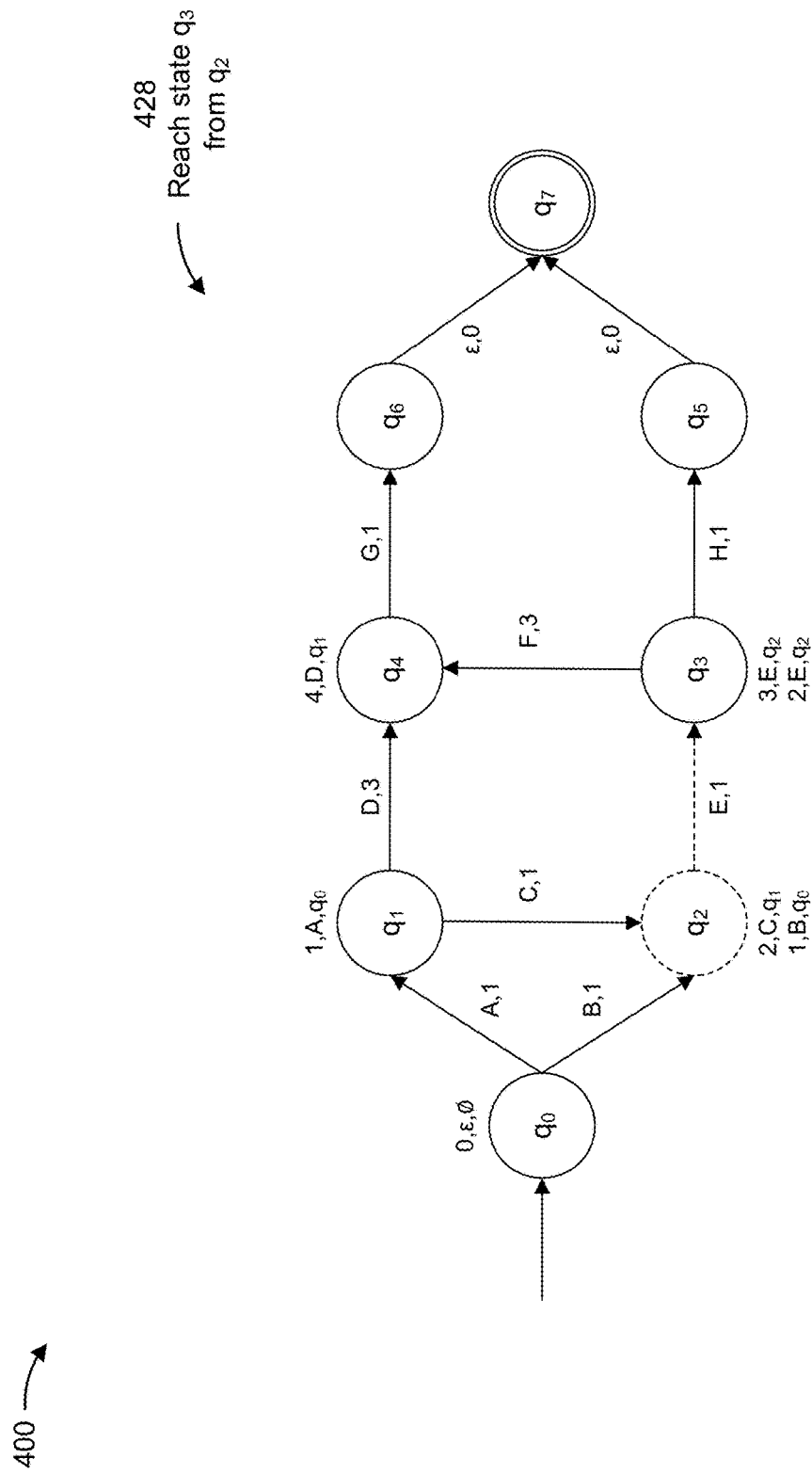
Figure 4F:
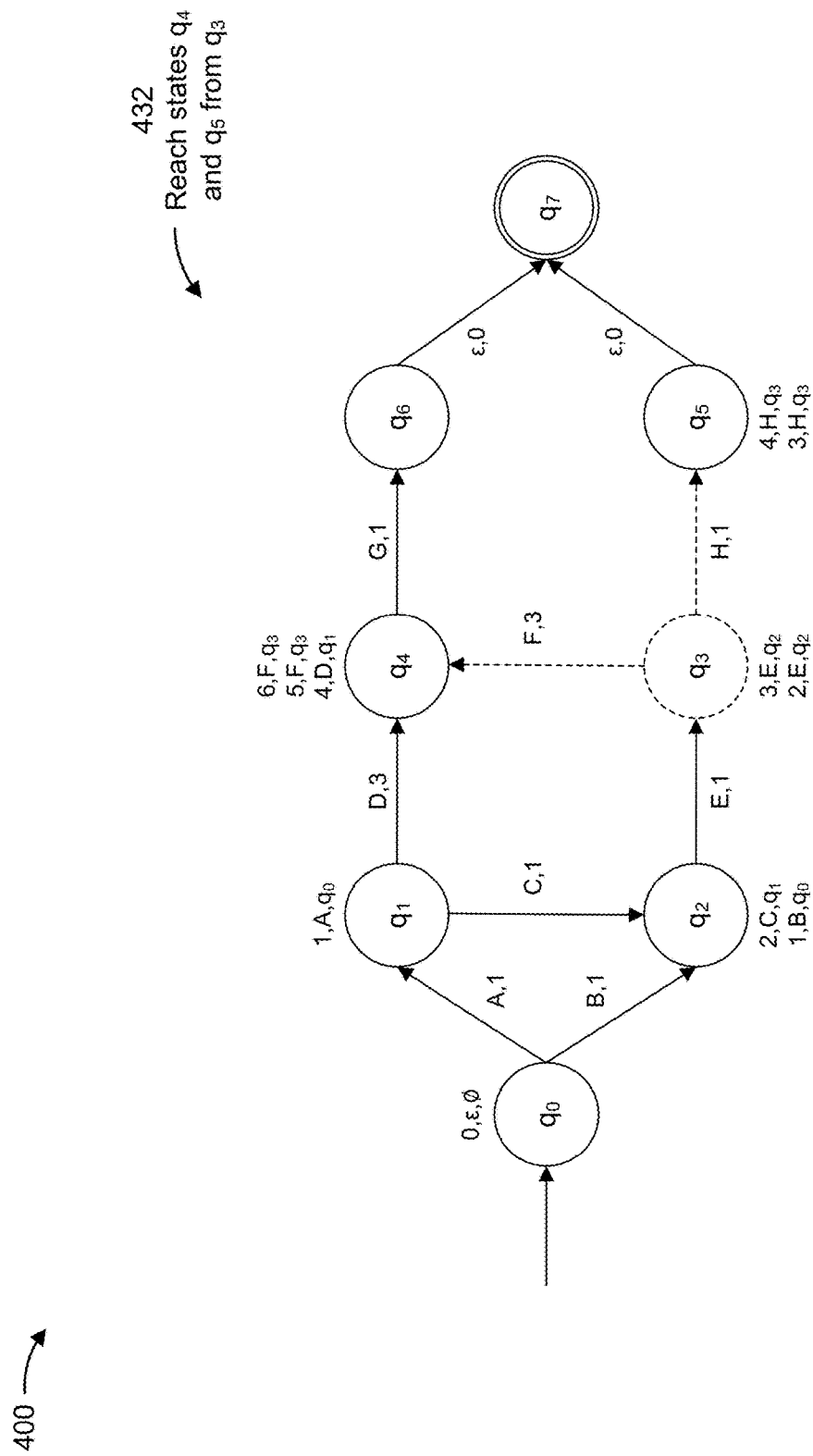
Figure 4G:
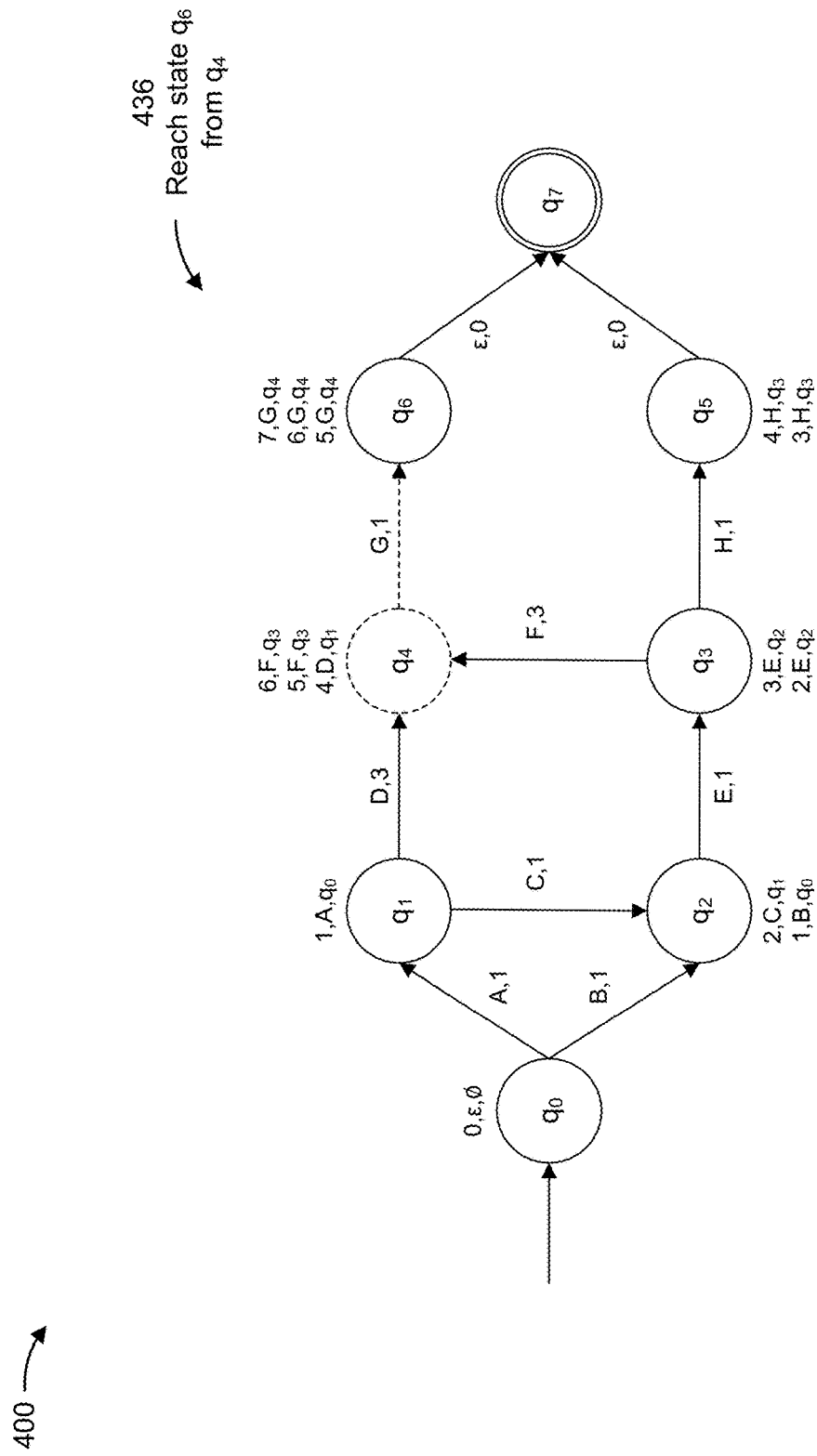
Figure 4H:
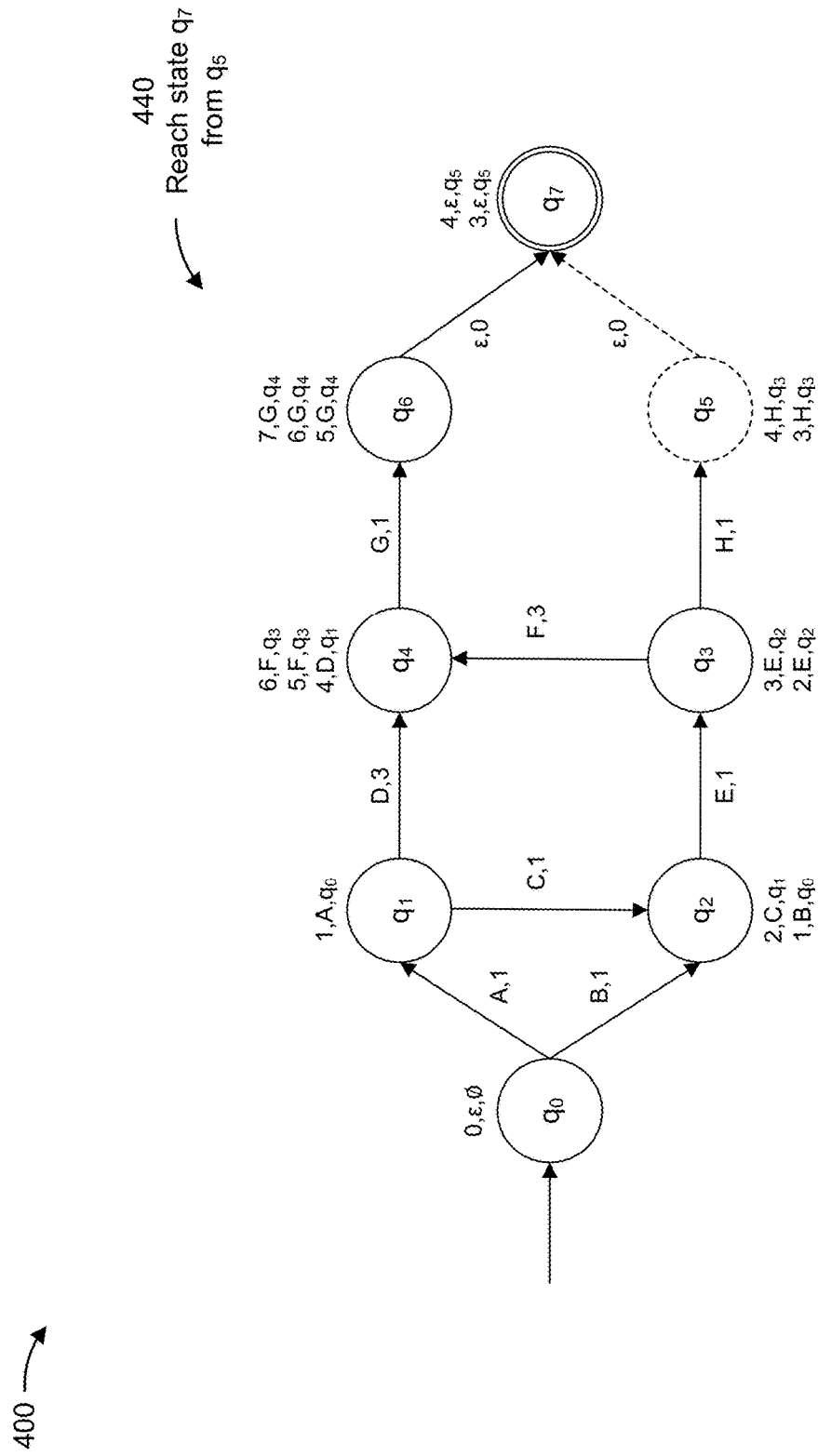
Figure 4I:
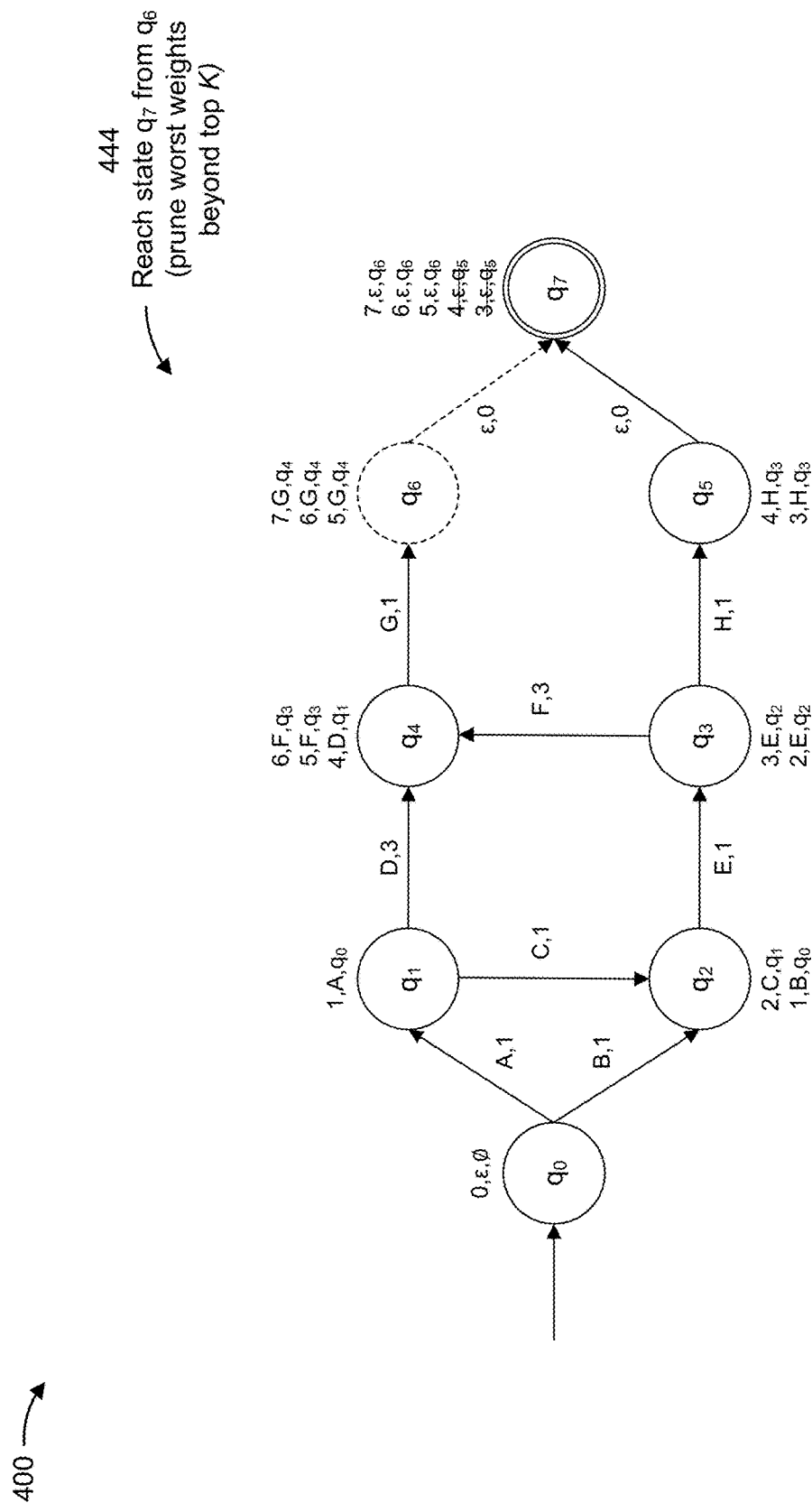
Figure 4J:
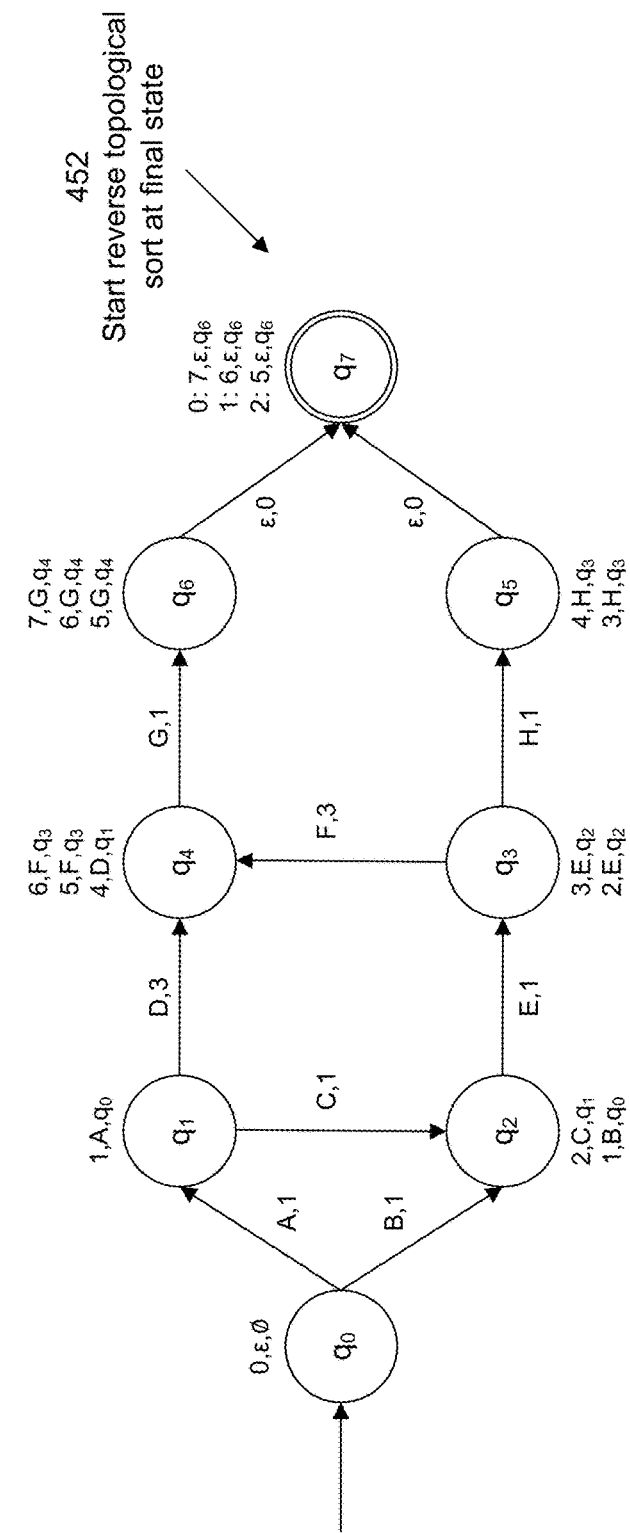
Figure 4K:
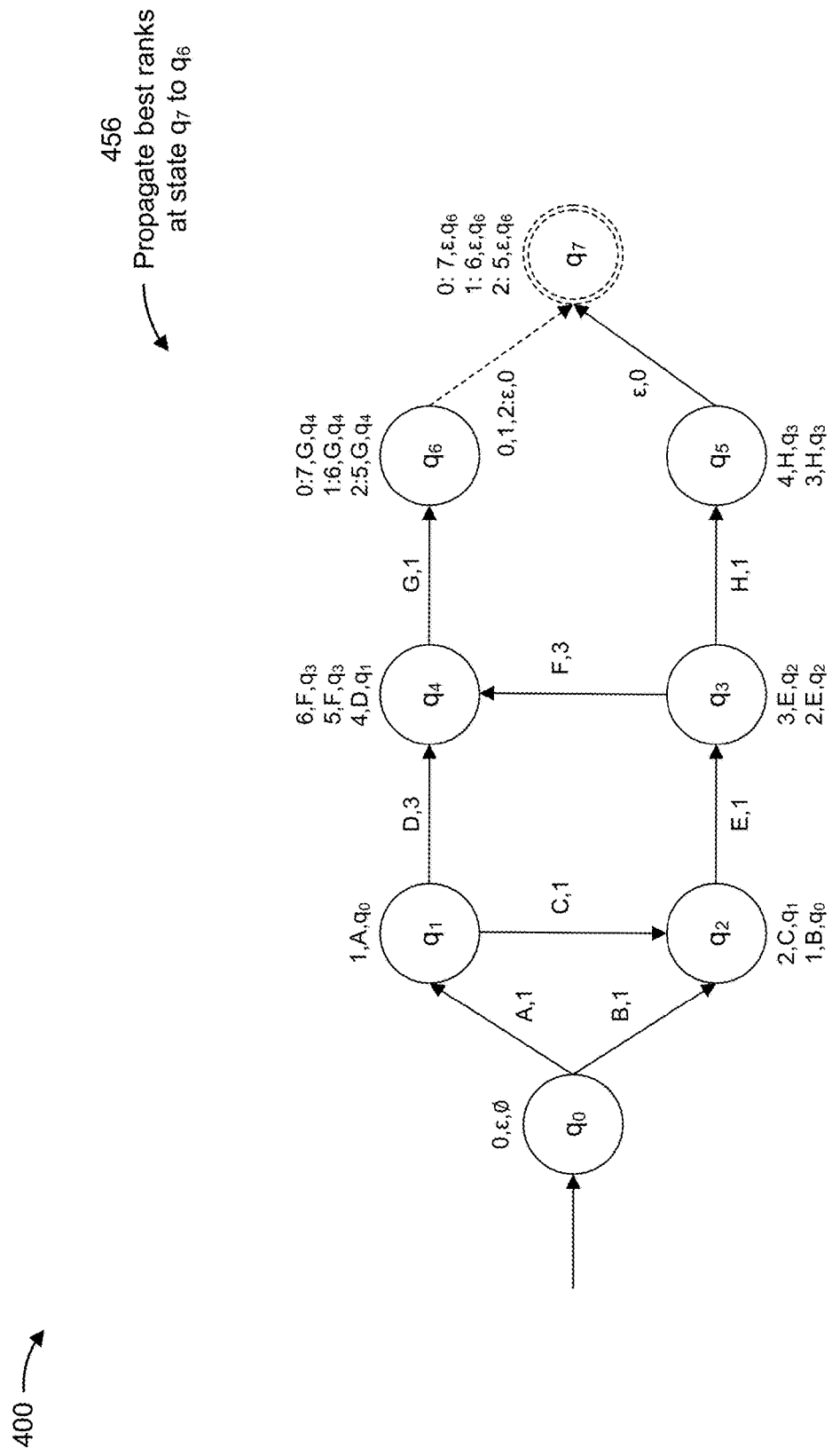
Figure 4L:
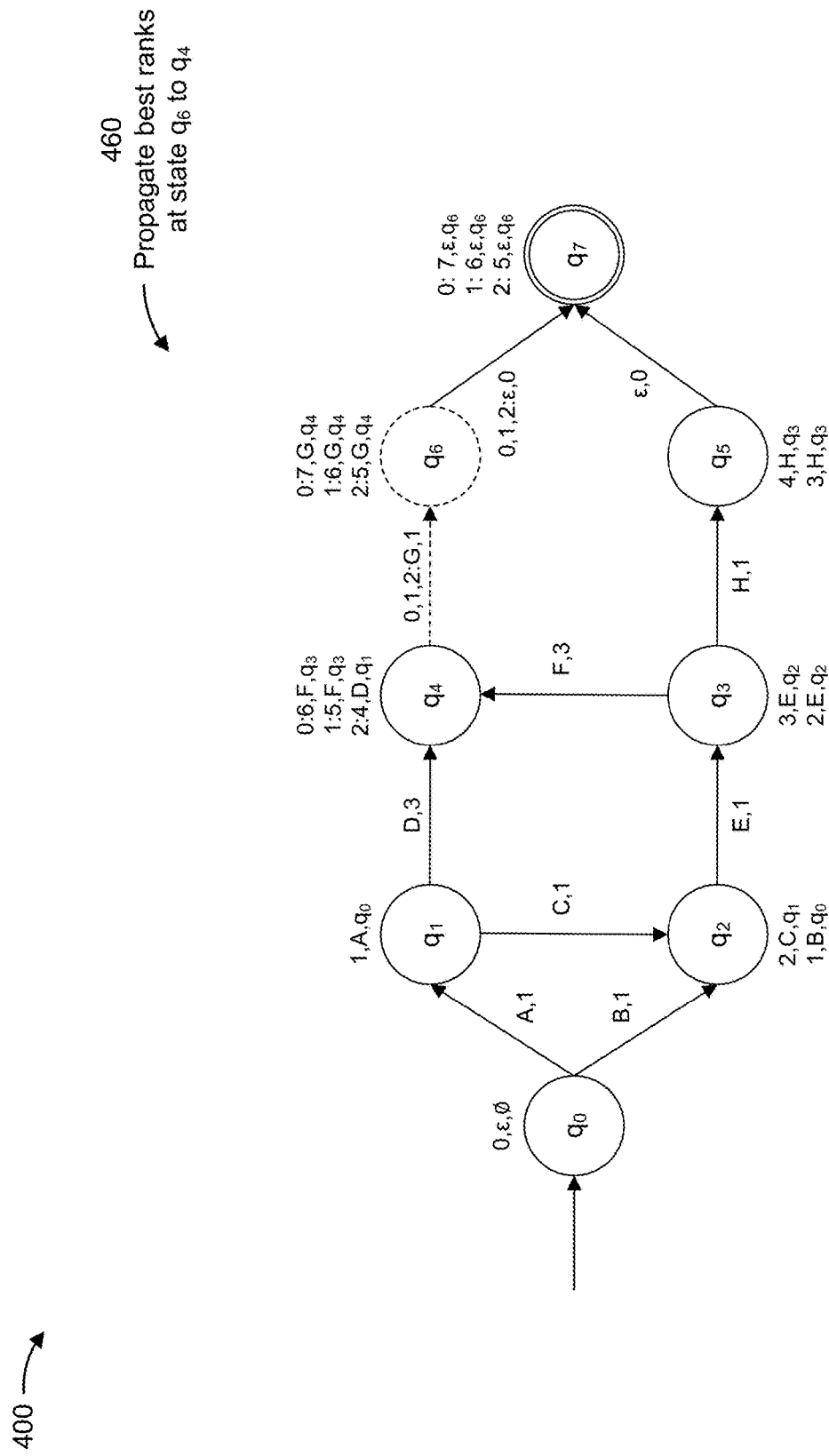
Figure 4M:
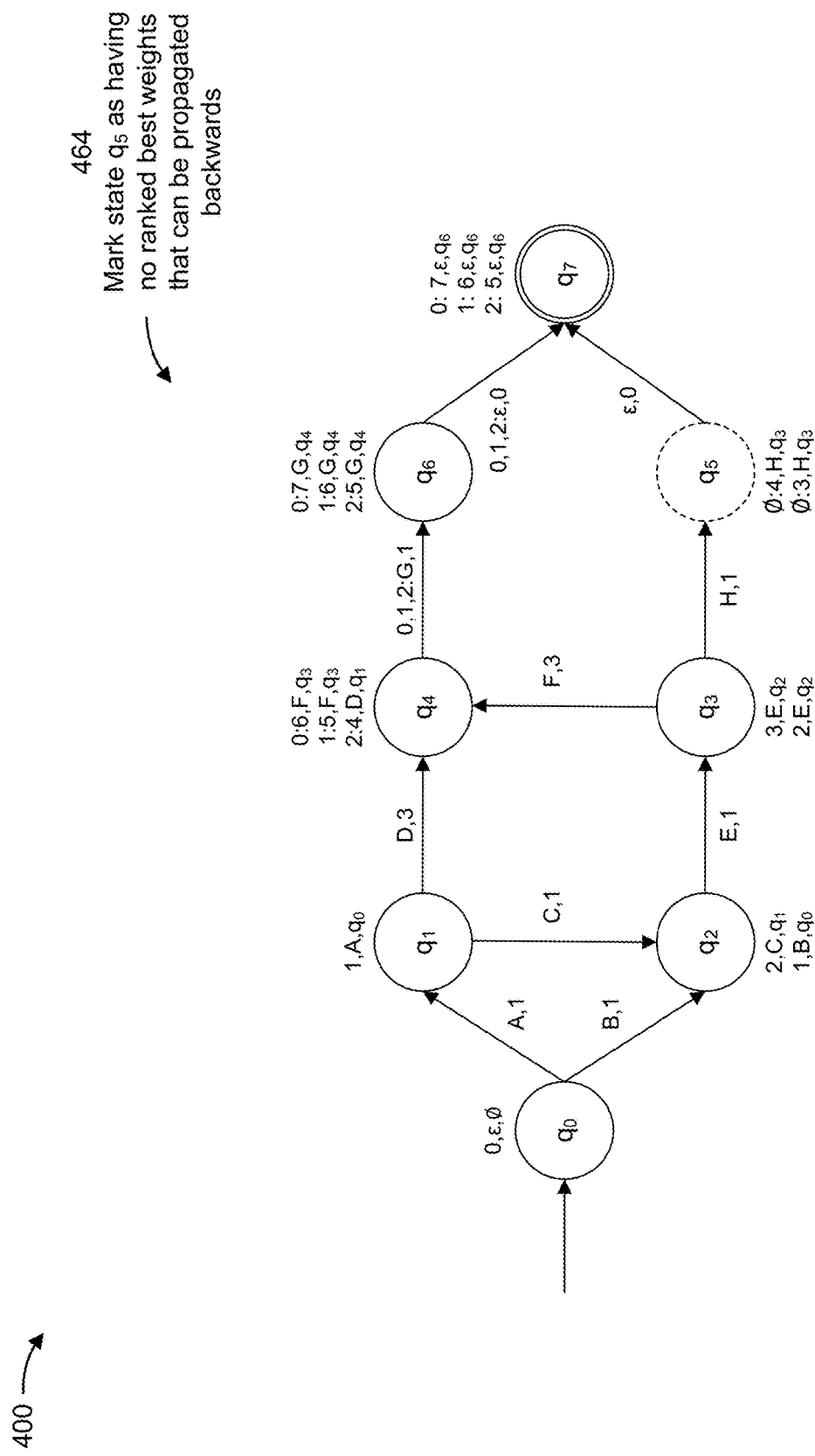
Figure 4N:
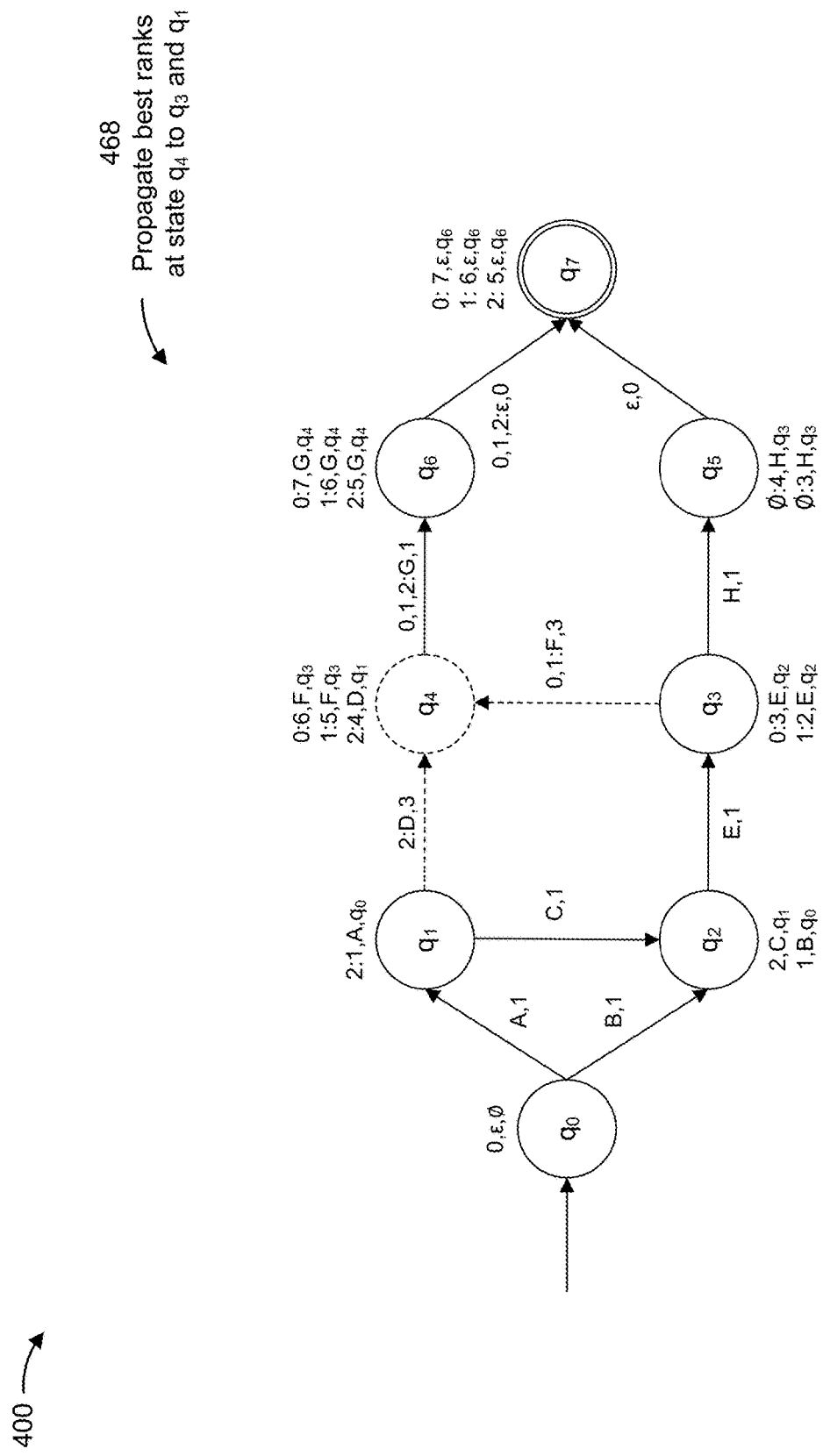
Figure 4O:
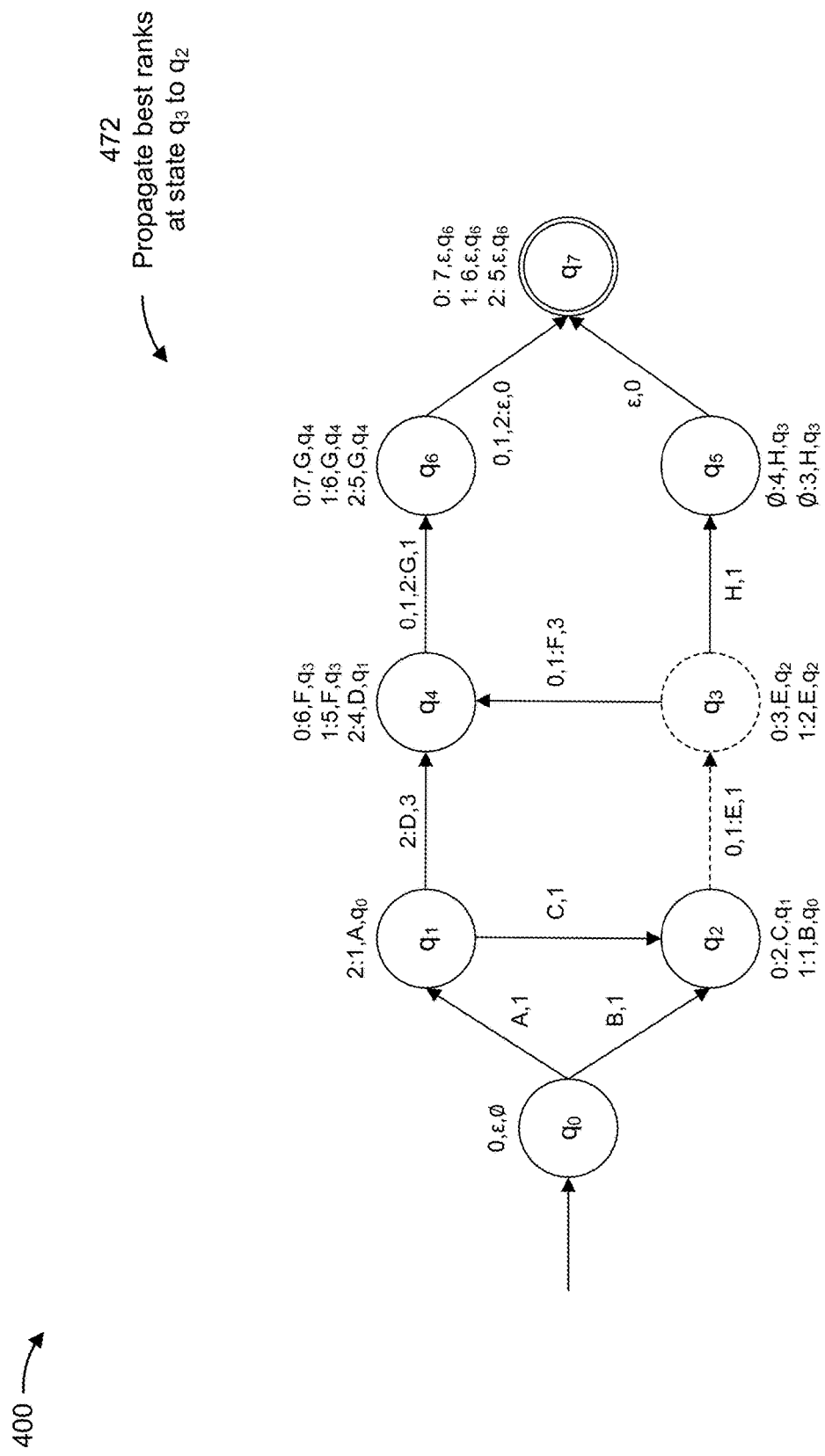
Figure 4P:
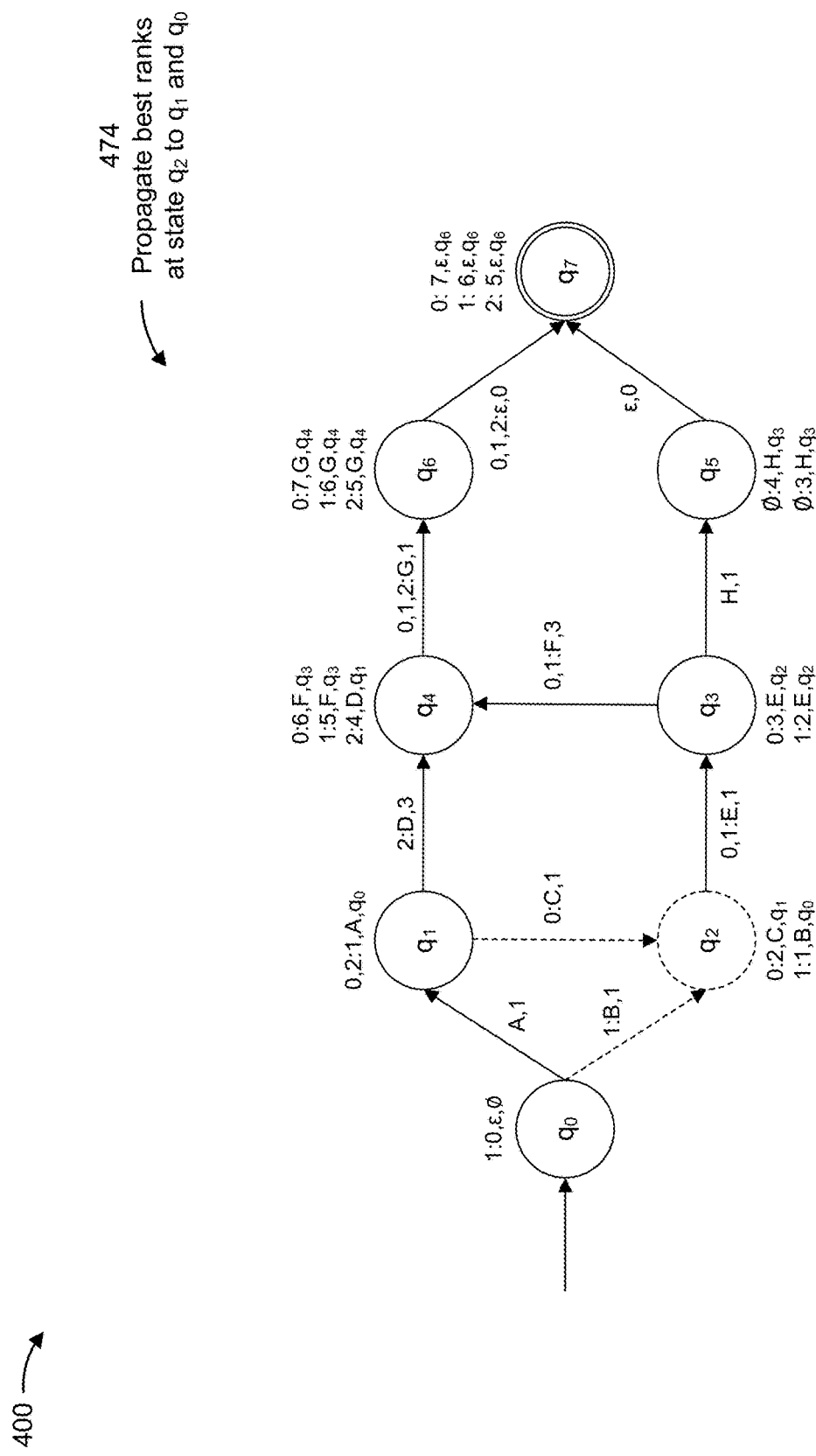
Figure 4Q:
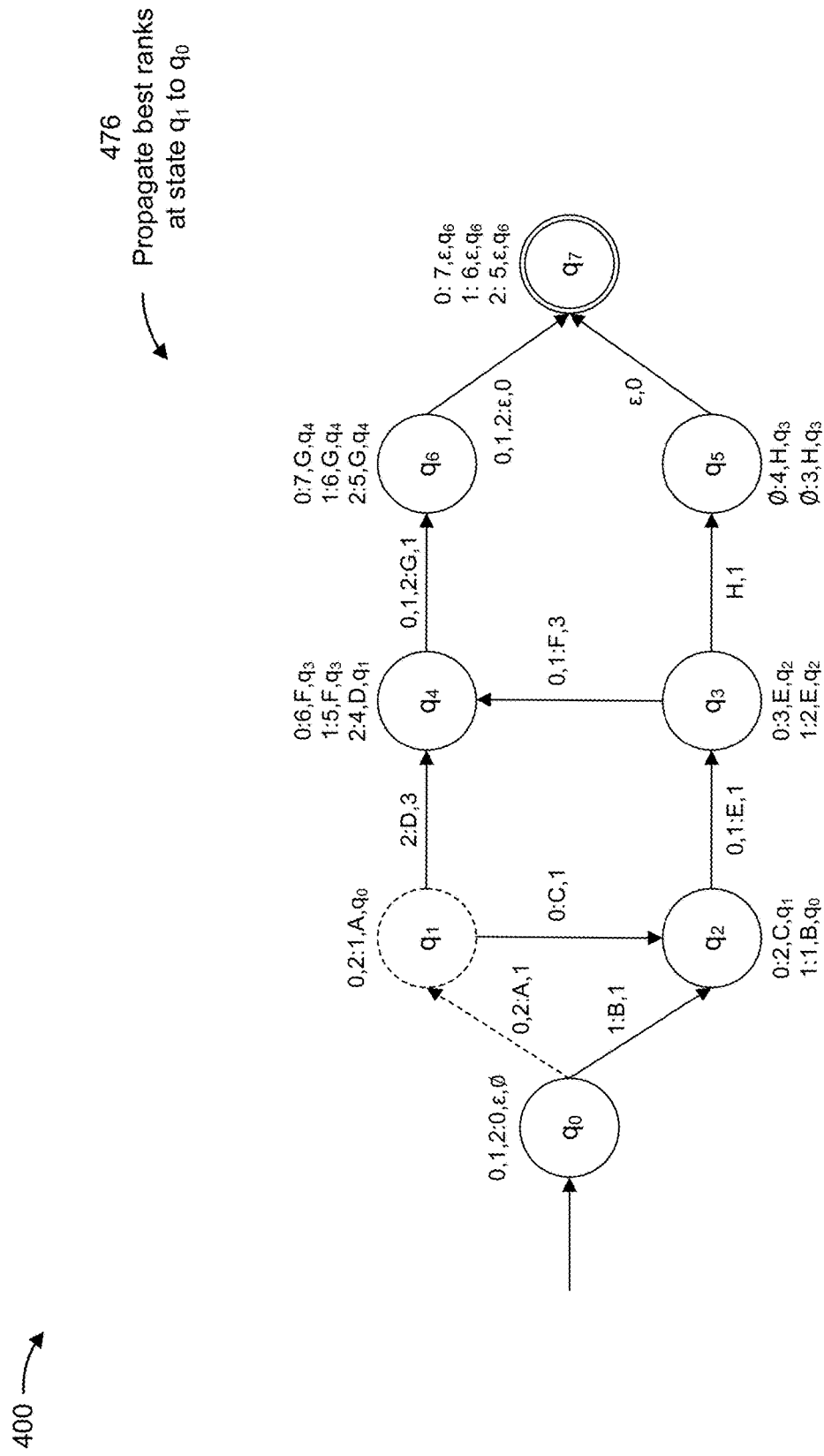
Figure 4R:
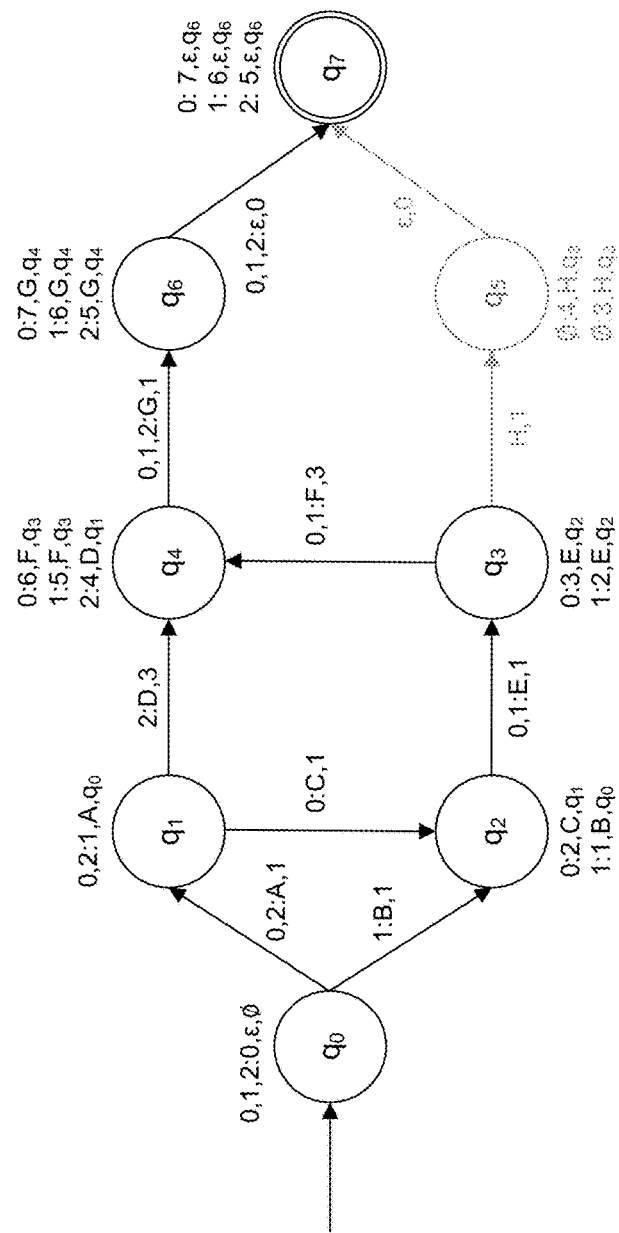
Figure 4S:
Figure 4T:
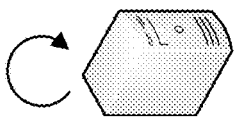
Figure 4T:
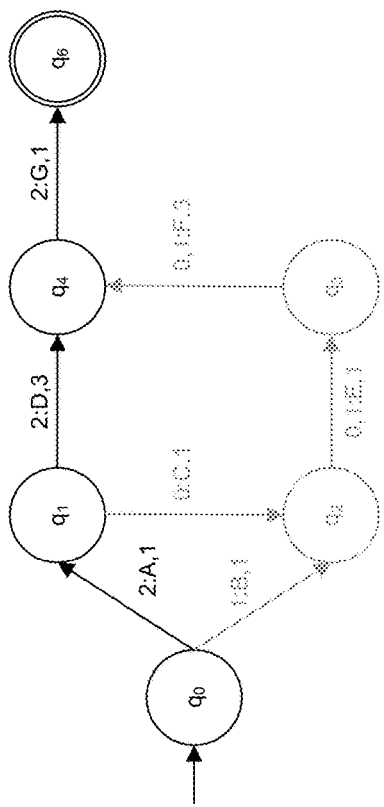
Figure 4T:
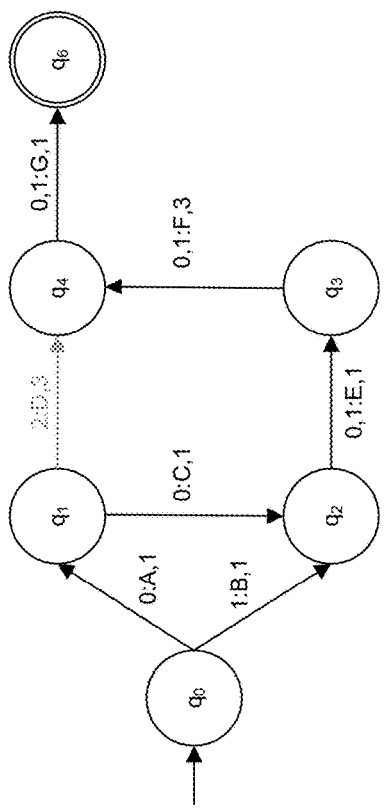

FIGS. 4A-4T are diagrams of an example implementation 400 associated with pruning a DFSA/WFSA to include only a set of K top paths having a highest overall weight based on a frequency or probability of occurring during a dialog flow in an automated conversational flow system. As shown in FIGS. 4A-4T, example implementation 400 includes a dialog modeling system and a client device. The dialog modeling system is described in more detail below in connection with FIGS. 6-7.

In some implementations, as described herein, the techniques shown in FIGS. 4A-4T may generally be used to efficiently carve or prune a minimized and weighted FSA (e.g., a DFSA/WFSA built using the techniques described above with respect to FIG. 2B and FIGS. 3A-3H) to identify a set of K paths that have a highest total weight (e.g., a highest frequency or a highest probability), where K is an integer that generally has a value that is less than a total quantity of paths through the minimized FSA. For example, as described herein, the terms pruning and carving may have similar meanings, where a minimized DFSA may be pruned by removing low-weight paths or carved to keep only high-weighted paths. For example, as described herein, FIGS. 4A-4T depict an efficient top-K carving technique that can be used to compute the total weight of each path through the minimized FSA, determine the top K paths that have the highest total weight, and prune the minimized FSA to remove any states or transitions that do not belong to the top K paths (or carve the minimized FSA to only keep states or transitions that belong to the top K paths). In this way, the efficient top-K carving technique described herein may avoid the exponential cost of computing the overall weights of all possible paths in a dialog flow model that have a large quantity of dialogs and/or complex dialogs (e.g., by taking advantage of the possibility that different paths may have common subpaths), and the efficient top-K carving technique described herein may further avoid computing all possible paths and corresponding weights through the minimized FSA to efficiently identify the top K paths. The top-K carving technique is described herein in connection with an example where the weight assigned to each transition is based on a frequency assigned to each transition (e.g., frequency is used as a carving or pruning criterion). However, it will be appreciated that a probability or other suitable metric may be used as the carving or pruning criterion. In general, the choice of carving or pruning criterion (or criteria) may impact the output of the top-K carving technique. For example, using probability as the carving or pruning criterion may generally result in shorter paths (e.g., each additional item in a sequence reduces the overall probability of the path), whereas using frequency as the carving or pruning criterion may result in more complete conversations being chosen (even if an additional element only occurs one time, f+1>f).

In some implementations, as shown in FIG. 4A, and by reference number 404, the efficient top-K carving technique used by the dialog modeling system is explained with reference to a minimized FSA that may be built using the techniques described above with respect to FIG. 2B and FIGS. 3A-3H and/or other suitable techniques. For example, as shown, each transition in the minimized FSA is associated with a weight that represents a frequency associated with consuming the corresponding transition symbol (e.g., a transition from $q_0$ to $q_1$ that is consumed by the input subsequence A has a weight of one (1), a transition from $q_0$ to $q_2$ that is consumed by the input subsequence B has a weight of one (1), a transition from $q_1$ to $q_4$ that is consumed by the input subsequence D has a weight of three (3), and so on). As discussed above, however, the weight assigned to each transition may be based on a probability associated with the respective transition or any other suitable metric. In general, a brute force algorithm would compute all paths through the minimized FSA, sum all the associated transition weights, and then select the highest weighted path. For example, the brute force algorithm would determine that a path including the sequence ADG has a weight of 1+1+3=5, a path including the sequence ACEFG has a weight of 1+1+1+3+1=7, a path including the sequence ACEH has a weight of 1+1+1+1=4, a path including the sequence BEFG has a weight of 1+1+3+1=6, and a path including the sequence BEH has a weight of 1+1+1=3. In this case, even though the minimized automaton has only 8 transitions, the brute force algorithm would need to compute and sum 19 weights due to weights that are shared across different paths, which is highly inefficient. Accordingly, the top-K carving technique described herein may avoid computing all possible paths and corresponding weights through the minimized FSA to identify the top K paths more efficiently.

For example, as shown in FIG. 4A, and by reference number 408, the dialog modeling system may initialize the efficient top-K carving algorithm by adding an artificial (temporary) final state to the minimized automaton so that there is a unique end state for all possible dialogs. In this way, the top weights that are computed when traversing the minimized automaton will converge into the temporary final state and compete against each other. Furthermore, the dialog modeling system may associate each incoming transition to the temporary final state (e.g., from a former final state, which are $q_5$ and $q_6$ in example 400) with a null input subsequence, shown as E, and a weight of zero (0), which do not alter the overall weight but instead allow all the top weights to propagate to the temporary final state. In this way, a goal of the efficient top-K carving algorithm may be reduced to finding the top K paths from the initial state of the minimized automaton (shown as $q_0$) to the temporary final state (shown as $q_7$).

As shown in FIG. 4B, and by reference number 412, the dialog modeling system may then traverse the minimized FSA by following a topological sort of the minimized FSA (e.g., in a similar manner as described above with reference to FIG. 3F and/or FIG. 3G). More particularly, the dialog modeling system may traverse the minimized FSA by following a topological sort of the minimized FSA and annotating each state with the top K (e.g., highest) weights and a corresponding backwards transition that led to the top K weights. For example, the top-K carving algorithm may be described herein with reference to an example where K is 3, whereby the dialog modeling system may annotate each state with up to the top 3 weights and corresponding backwards transition(s) that led to the top weights associated with each state (although it will be appreciated that K may be any positive integer). For example, as shown by reference number 416, the dialog modeling system may start the topological sort at the initial state, $q_0$, where the K best (e.g., highest) weights propagate forward and are incremented as transition weights are cumulatively added. In cases where more than K best weights collide in a single state, the best weights that collide in the single state compete with each other, and only the K best weights are maintained. Furthermore, as shown, the dialog modeling system may add a dummy or null backwards top transition to the initial state, where the initial state ($q_0$) is reached from nowhere (Ø) by consuming nothing (ε) and with a neutral weight, which is zero (0) in cases where the weights are based on frequencies (e.g., x+0=x) (e.g., as in FIGS. 4A-4T) or one (1) in cases where the weights are based on probabilities (e.g., x*1=x).

Accordingly, as shown in FIG. 4C, and by reference number 420, the dialog modeling system may then start to traverse the minimized FSA from the initial state $q_0$ in a direction of the transitions, to forward propagate the weights, and may initially reach states $q_1$ and $q_2$ from $q_0$ (shown by dashed lines). For example, as shown, state $q_1$ is reached from state $q_0$ by consuming the input symbol A with a best weight of 0+1=1, and state $q_2$ is reached from state $q_0$ by consuming the input symbol B with a best weight of 0+1=1. In this case, state $q_1$ is annotated with a first path indicated by the tuple 1,A,$q_0$, which indicates the cumulative weight of the path, the preceding backwards transition, and the prior state. Similarly, state $q_2$ is annotated with a first path indicated by the tuple 1,B,$q_0$, which indicates the cumulative weight of the path, the preceding backwards transition, and the prior state.

As shown in FIG. 4D, and by reference number 424, the dialog modeling system may then reach states $q_4$ and $q_2$ from $q_1$ (shown by dashed lines). For example, as shown, state $q_4$ is reached from state $q_1$ by consuming the input symbol D with a best weight of 1+3=4, and state $q_2$ is reached from state $q_1$ by consuming the input symbol C with a best weight of 1+1=2. In this case, state $q_4$ is annotated with a first path indicated by the tuple 4,D,$q_1$, which indicates the cumulative weight of the path, the preceding backwards transition, and the prior state. Similarly, state $q_2$ is annotated with a second path indicated by the tuple 2,C,$q_1$, which indicates the cumulative weight of the second path, the preceding backwards transition, and the prior state.

As shown in FIG. 4E, and by reference number 428, the dialog modeling system may then reach state $q_3$ from $q_2$ (shown by dashed lines). For example, as shown, state $q_3$ is reached from state $q_2$ by consuming the input symbol E with best weights of 1+1=2 and 2+1=3, and state $q_3$ is annotated with two tuples corresponding to the two possible paths to state $q_3$.

As shown in FIG. 4F, and by reference number 432, the dialog modeling system may then reach states $q_4$ and $q_5$ from state $q_3$ (shown by dashed lines). For example, as shown, state $q_4$ is reached from state $q_3$ by consuming the input symbol F with best weights of 3+3=6 and 2+3=5, and state $q_5$ is reached from state $q_3$ by consuming the input symbol H with best weights of 3+1=4 and 2+1=3. In this case, states $q_4$ and $q_5$ are annotated with respective tuples that indicate the cumulative weights, preceding backwards transitions, and prior states of no more than K best paths to states $q_4$ and $q_5$.

As shown in FIG. 4G, and by reference number 436, the dialog modeling system may then reach state $q_6$ from state $q_4$ (shown by dashed lines). For example, as shown, state $q_6$ is reached from state $q_4$ by consuming the input symbol G with best weights of 6+1=7, 5+1=6, and 4+1=5, and state $q_6$ is appropriately annotated with three tuples corresponding to the three possible paths to state $q_6$.

As shown in FIG. 4H, and by reference number 440, the dialog modeling system may then reach the final state $q_7$ from state $q_5$ (shown by dashed lines). For example, as shown, the final state $q_7$ is reached from state $q_5$ by consuming nothing (ε) with best weights of 4+0=4 and 3+0=3. Furthermore, as shown in FIG. 4I, and by reference number 444, the dialog modeling system may reach the final state $q_7$ from state $q_6$ (shown by dashed lines). For example, the final state $q_7$ is reached from state $q_6$ by consuming nothing (ε) with best weights of 7+0=7, 6+0=6, and 5+0=5. In this case, the dialog modeling system has found five (5) paths to the final state, which exceeds the value of K (e.g., three in this example). Accordingly, the dialog modeling system may prune the list of best paths to state $q_7$ to include only the top K paths, which in this case involves eliminating the two paths with the lowest total weight.

As shown in FIG. 4J, and by reference number 448, the dialog modeling system may then rank the best weights at the temporary final state and follow a reverse topological sort to propagate the ranks backwards. For example, as shown by reference number 452, the dialog modeling system may start the reverse topological sort at the temporary final state after assigning a best rank (0) to the path with the highest weight, a next-best rank (1) to the path with the second highest weight, and so on up to the path with the Kth highest weight, which is assigned rank K–1.

As shown in FIG. 4K, and by reference number 456, the dialog modeling system may then follow the backward transitions associated with the paths having the K best ranks to propagate the ranks backwards. For example, in FIG. 4K, the paths having the K best ranks each have a backwards transition of symbol c and a prior state of $q_6$, whereby the dialog modeling system propagates ranks 0, 1, and 2 to state $q_6$ based on transition $q_6$,ε,$q_7$ belonging to best paths 0, 1, and 2. As shown in FIG. 4L, and by reference number 460, the best ranks at state $q_6$ may be propagated backwards to state $q_4$ based on transition $q_4$,ε,$q_6$ belonging to best paths 0, 1 and 2.

As shown in FIG. 4M, and by reference number 464, the dialog modeling system may then visit state $q_5$, which has no paths associated with a ranked best weight. Accordingly, the state $q_5$ may be marked as having no ranked best weights that can be propagated backwards.

As shown in FIG. 4N, and by reference number 468, the dialog modeling system may then return to state $q_4$, and may propagate the best ranks at state $q_4$ to states $q_3$ and $q_1$ based on transition $q_3$,F,$q_4$ belonging to best paths 0 and 1 and based on transition $q_1$,D,$q_4$ belonging to best path 2. As shown in FIG. 4O, and by reference number 472, the dialog modeling system may then propagate the best ranks at state $q_3$ backwards to state $q_2$ based on transition $q_2$,E,$q_3$ belonging to best paths 0 and 1. As shown in FIG. 4P, and by reference number 474, the dialog modeling system may then propagate the best ranks at state $q_2$ backwards to states $q_1$ and $q_0$. For example, the path with rank 0 may be propagated backwards from state $q_2$ to state $q_1$ based on transition $q_1$,C,$q_2$ belonging to best path 0, and the path with rank 1 may be propagated backwards from state $q_2$ to state $q_0$ based on transition $q_0$,E,$q_2$ belonging to best path 1. As shown in FIG. 4Q, and by reference number 476, the dialog modeling system may then propagate the best ranks at states $q_1$ and $q_2$ backwards to the initial state $q_0$. For example, as shown, the dialog modeling system may propagate the path with the best rank (0) from state $q_2$ to state $q_1$ based on transition $q_1$,C,$q_2$ belonging to best path 0, may propagate the path with rank 1 from state $q_2$ to state $q_0$ based on transition $q_0$,B,$q_2$ belonging to best path 1, and may propagate the paths with ranks 0 and 2 from state $q_1$ to state $q_0$ based on transition $q_0$,A,$q_1$ belonging to best paths 0 and 2.

As shown in FIG. 4R, and by reference number 480, the dialog modeling system may then prune the minimized FSA by removing all states and transitions that do not belong to any top-ranked paths. For example, in the illustrated example, state $q_5$ does not belong to any top-ranked path, whereby the dialog modeling system may remove state $q_5$ from the minimized FSA, remove all incoming transitions to state $q_5$ from the minimized FSA, and remove all outgoing transitions from state $q_5$ from the minimized FSA. Furthermore, as shown in FIG. 4S, and by reference number 484, the dialog modeling system may remove the temporary final state from the minimized FSA and finalize the remaining connected states (e.g., making state $q_6$ the only final state, since the K best paths to the temporary final state all had state $q_6$ as a penultimate state). Furthermore, the lists of top ranked paths at each state may only be needed to enable the top-K carving algorithm, whereby any data structures or memory locations used to store information related to the lists of top ranked paths at each state may be cleared.

Accordingly, as shown in FIG. 4T, and by reference number 488, the dialog modeling system may then generate an output to visualize and/or export information related to one or more subsets of the top-ranked paths in the pruned FSA (e.g., after states and transitions not belonging to any of the top K paths have been removed and the remaining connected states have been finalized). For example, to avoid outputting a very large dialog flow while maintaining information related to the most relevant paths, the dialog modeling system may output information related to one or more subsets of the top K paths using a pagination technique. For example, the dialog modeling system may output the top K paths in a first range, a second range, and/or a user-specified range (e.g., the best paths from 0 to 10 or 0 to 100, the best paths from 11 to 20, and so on), among other examples. For example, reference number 492 illustrates an example where the dialog modeling system is used to visualize or otherwise output information related to the top 2 paths (the paths ranked 0 and 1), in which case the dialog modeling system may explore the pruned automaton from the initial state, traverse only transitions that are annotated with the top 2 ranks (e.g., rank 0 or rank 1), and export information related to the visited states and transitions. In another example, reference number 496 depicts an example where the dialog modeling system is used to visualize or otherwise output information related to the path having a specific rank (the path with rank 2), in which case the dialog modeling system may explore the pruned automaton from the initial state, traverse only transitions that are annotated with the specific rank, and export information related to the visited states and transitions.

As indicated above, FIGS. 4A-4T are provided as an example. Other examples may differ from what is described with regard to FIGS. 4A-4T.

FIGS. 5A-5F are diagrams of an example implementation 500 associated with a DFSA/WFSA in which initial user utterances are grouped per first agent utterance. As shown in FIGS. 5A-5F, example implementation 500 includes a dialog modeling system. The dialog modeling system is described in more detail below in connection with FIGS. 6-7.

In some implementations, the dialog modeling system may use the techniques described in further detail above with reference to FIGS. 3A-3H to generate a minimized DFSA/WFSA that exactly represents a given set of dialogs to be modeled (e.g., without overgeneration), and may further use the techniques described in further detail above with reference to FIGS. 4A-4T to prune the minimized DFSA/WFSA to include only a set of top K paths that have a highest total weight (e.g., corresponding to a highest probability or highest frequency). In general, each transition in the DFSA/WFSA may correspond to a type of agent utterance that may occur during a dialog with a human user via a conversational user interface. Furthermore, in some cases, the DFSA/WFSA may include user utterances that can occur before, between, or after the agent utterances. Accordingly, in some implementations, the dialog modeling system may use the techniques described herein to efficiently represent the possible user utterances within the modeled dialog flows. For example, in some implementations, the dialog modeling system may receive a user utterance set that includes possible user utterances that may occur during the modeled dialogs, and the dialog modeling system may encode each user utterance to generate a clusterized set of utterance vectors. The dialog modeling system may then form one or more utterance clusters, and the dialog modeling system may select the N largest clusters. The dialog modeling system may then extract center utterances from the N largest clusters to determine the N-best user utterances to be used to annotate each state in the DFSA/WFSA.

Figure 5A:
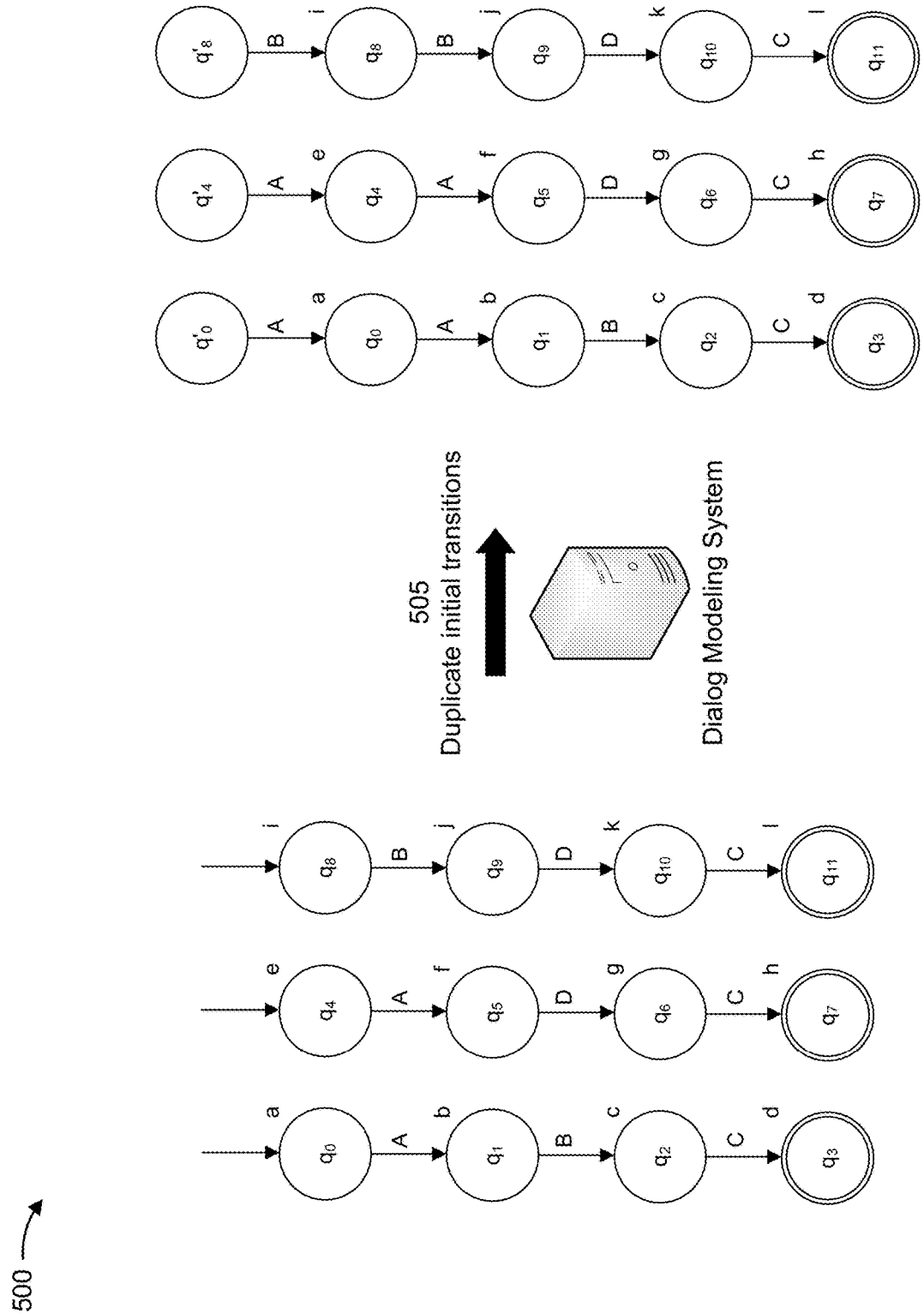
FIGS. 5A-5F are diagrams of an example implementation associated with a DFSA/WFSA in which initial user utterances are grouped per first agent utterance.
Figure 5B:
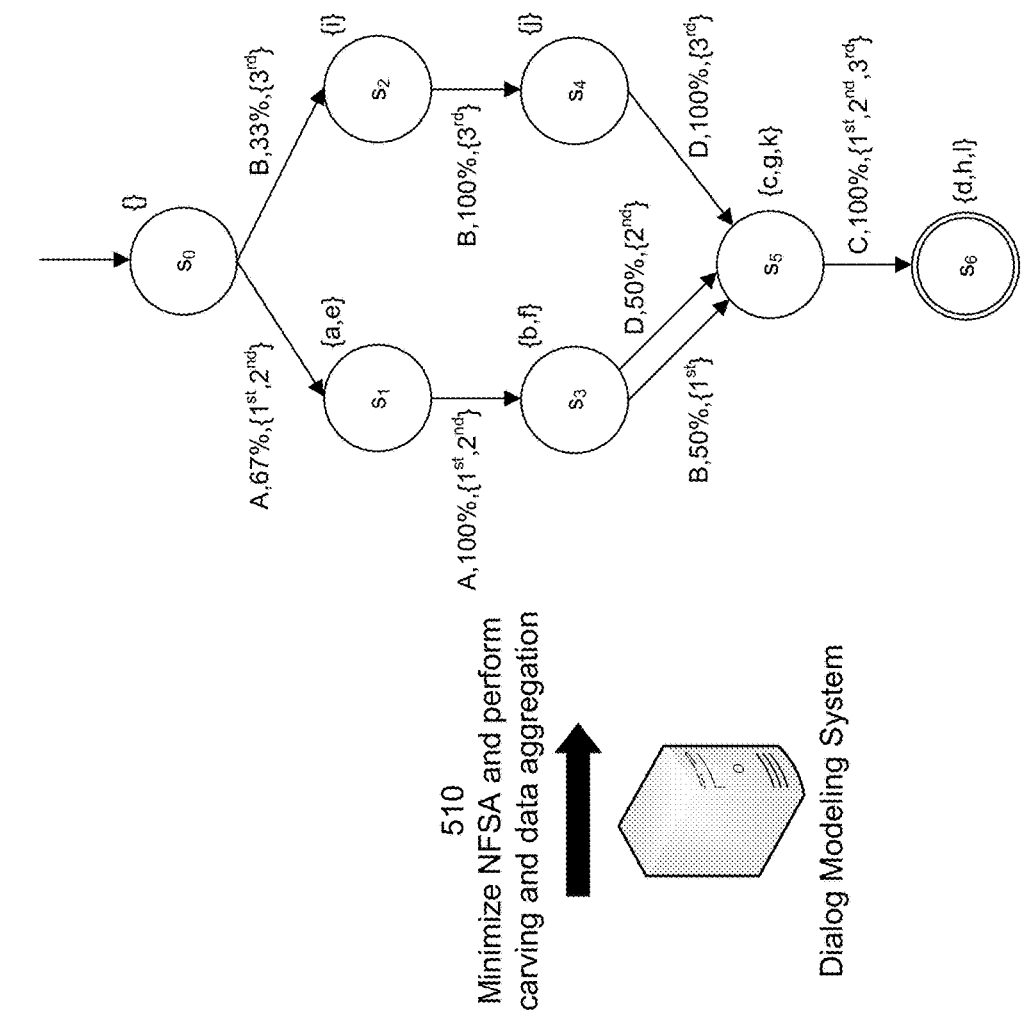
Figure 5B:
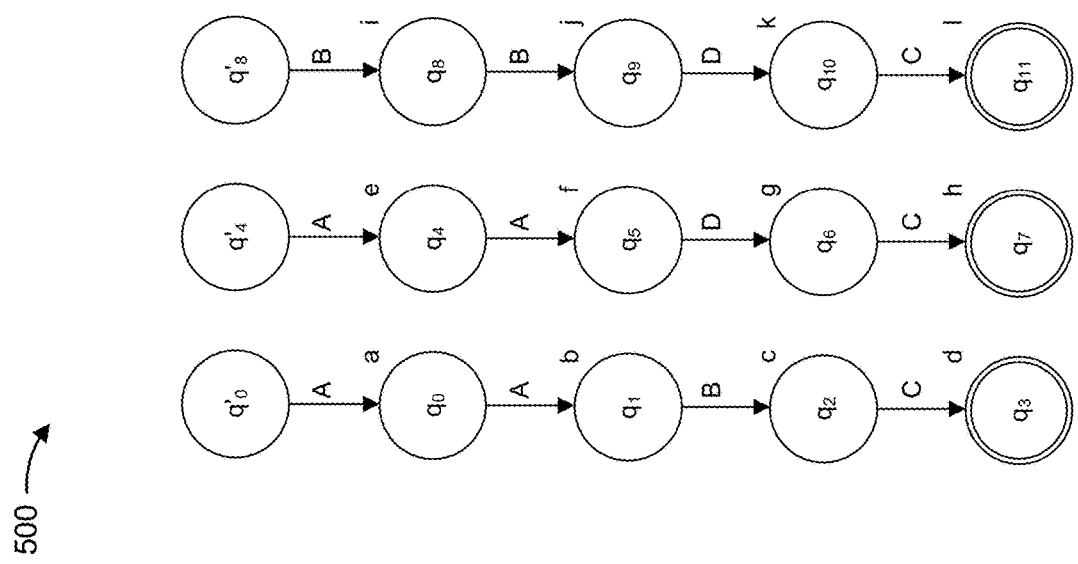
Figure 5C:
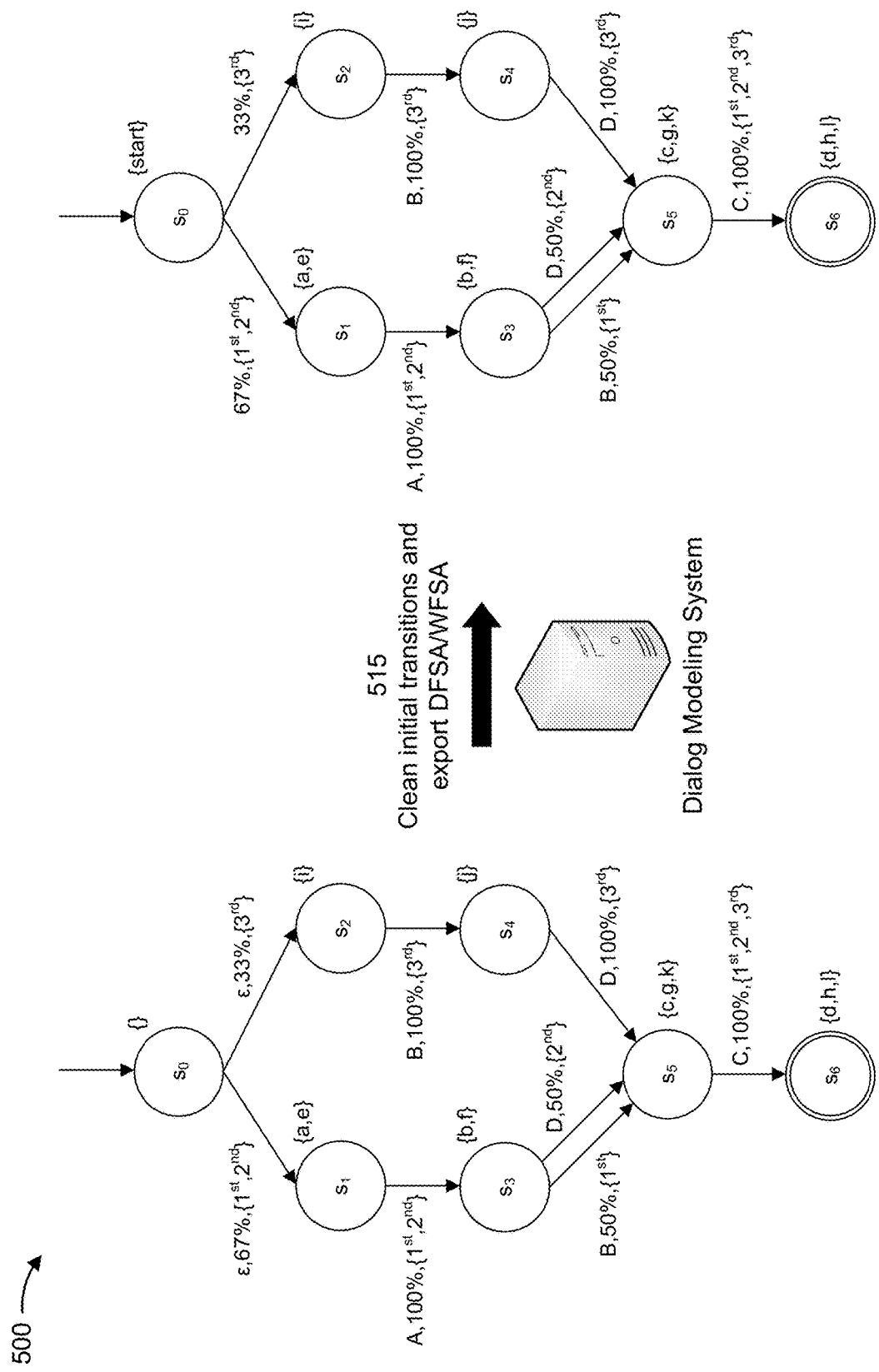

In some implementations, as described herein with reference to FIGS. 5A-5C, the dialog modeling system may generate a DFSA/WFSA in which each transition represents a type of agent utterance and each state is annotated with one or more (up to N) user utterances. Furthermore, the DFSA/WFSA may be augmented to include an initial node that represents a starting point for a dialog with an agent. For example, as shown in FIG. 5A, and by reference number 505, the dialog modeling system may receive an NFSA that represents all dialog flows to be modeled as non-intersecting paths, and the dialog modeling system may duplicate initial transitions of each path in the NFSA. As shown in FIG. 5B, and by reference number 510, the dialog modeling system may minimize the NFSA and perform a top-K carving and data aggregation to generate a DFSA/WFSA using the same or similar techniques as described above with reference to FIGS. 3A-3H and FIGS. 4A-4T. In this case, as shown, states $q_0$ and $q_4$ are collapsed into state $s_1$, state $q_8$ is collapsed into state $s_2$, and states $q'_0$, $q'_4$, and $q'_8$ are collapsed into initial state $s_0$. As further shown in FIG. 5C, and by reference number 515, the dialog modeling system may then clean up the initial transitions and export the DFSA/WFSA. For example, the initial state $s_0$ is annotated with a null set of user utterances based on the initial state so representing a starting point for a dialog flow. However, when the initial states and transitions were duplicated, the transitions following the initial states would have been copied to the outgoing transitions of the initial state $s_0$. Accordingly, as shown in FIG. 5C, the null agent utterances associated with the transitions following the initial state $s_0$ (shown by an epsilon symbol, ε, to represent "nothing") may be removed and each transition from the initial state $s_0$ may lead to a state annotated with one or more groups of user utterances that can start a dialog with the agent, conditioned on the first agent utterance type.

Figure 5D:
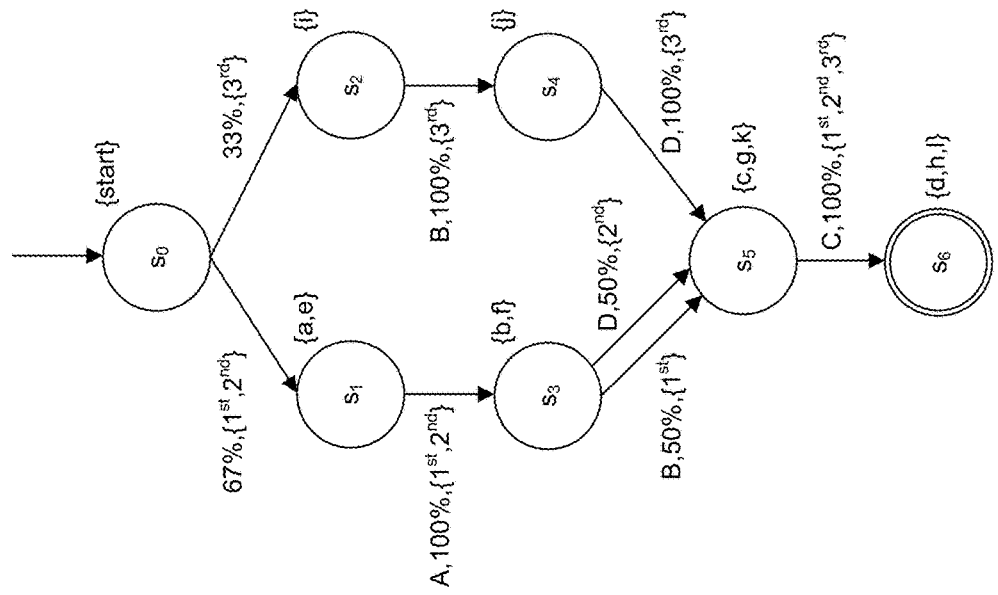
Figure 5D:
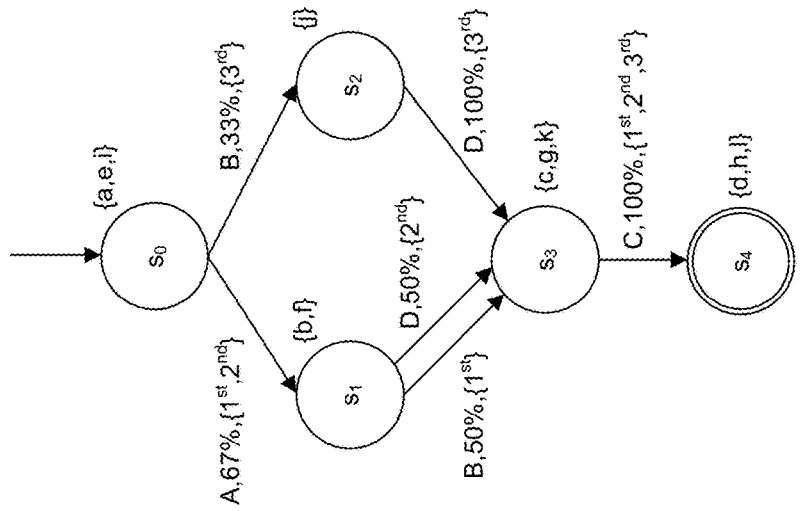
Figure 5E:
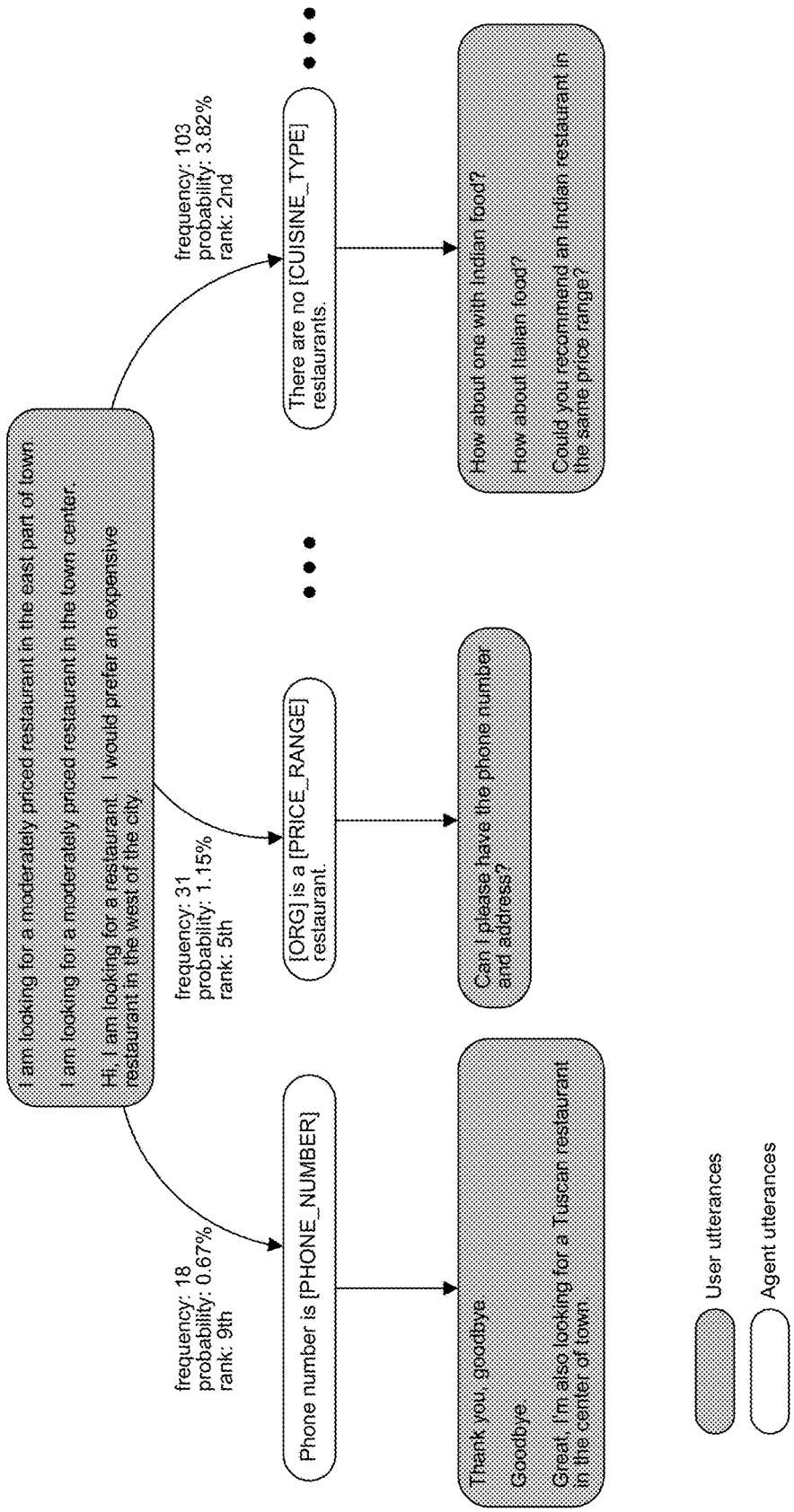
Figure 5F:
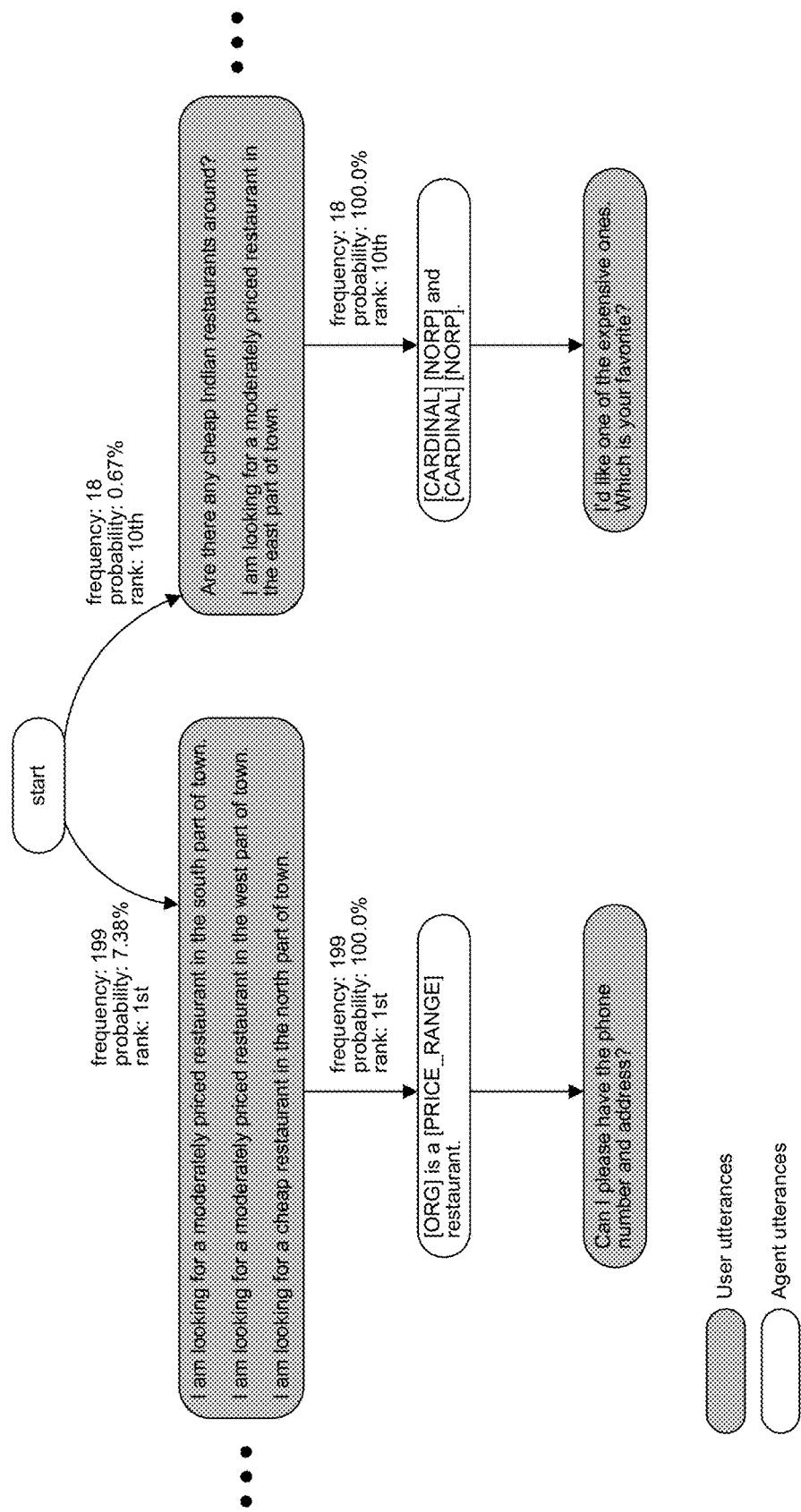

Accordingly, as shown in FIG. 5D, adding a special starting node to the DFSA/WFSA may enable using the DFSA/WFSA to indicate which possible user utterances may lead to the agent having a specific first response. For example, in some implementations, the dialog modeling system may filter the user utterances by clusterizing the user utterances per state and selecting the top k biggest clusters. In some implementations, the dialog modeling system may group all user utterances in a single state, in which case the dialog modeling system may preserve just a few of all possible user utterances. Additionally, or alternatively, in cases where the dialog modeling system splits the user utterances per first agent utterance, the dialog modeling system may perform a filtering per group, and may generate a view that includes a few examples of each case rather than a view with a few examples of all possible user utterances. For example, reference number 520 illustrates a DFSA/WFSA where an initial node includes multiple joint starting user utterances, and reference number 525 illustrates a DFSA/WFSA where an initial node is a starting node that transitions to multiple next states that each include up to N user utterances that can start a conversation or dialog. The value of representing dialogs in this way is further illustrated with reference to FIGS. 5E-5F. For example, in FIG. 5E, reference number 530 depicts an example set of dialog flows where an initial node includes multiple joint starting user utterances (e.g., "I am looking for a moderately priced restaurant in the east part of town," "I am looking for a moderately priced restaurant in the town center," or "Hi, I am looking for a restaurant. I would prefer an expensive restaurant in the west of the city."). In this case, all of the dialog flows represented by the DFSA/WFSA start from the same set of user utterances, which constrains the relevant dialog flows that may be modeled or otherwise represented in the DFSA/WFSA. In contrast, in FIG. 5F, reference number 535 depicts an example set of dialog flows where the initial node is a starting node that transitions to multiple next states that each include up to N user utterances that can start a conversation or dialog. In this case, the FSA is a pseudodeterministic FSA (e.g., is partially deterministic) that can be used to model many different dialog flows that have different sets of starting user utterances, which significantly increases the compactness and efficiency of processing, exporting, visualizing, and/or otherwise utilizing the DFSA/WFSA that represents a set of dialog flows for a given context or domain.

As indicated above, FIGS. 5A-5F are provided as an example. Other examples may differ from what is described with regard to FIGS. 5A-5F.

Figure 6:
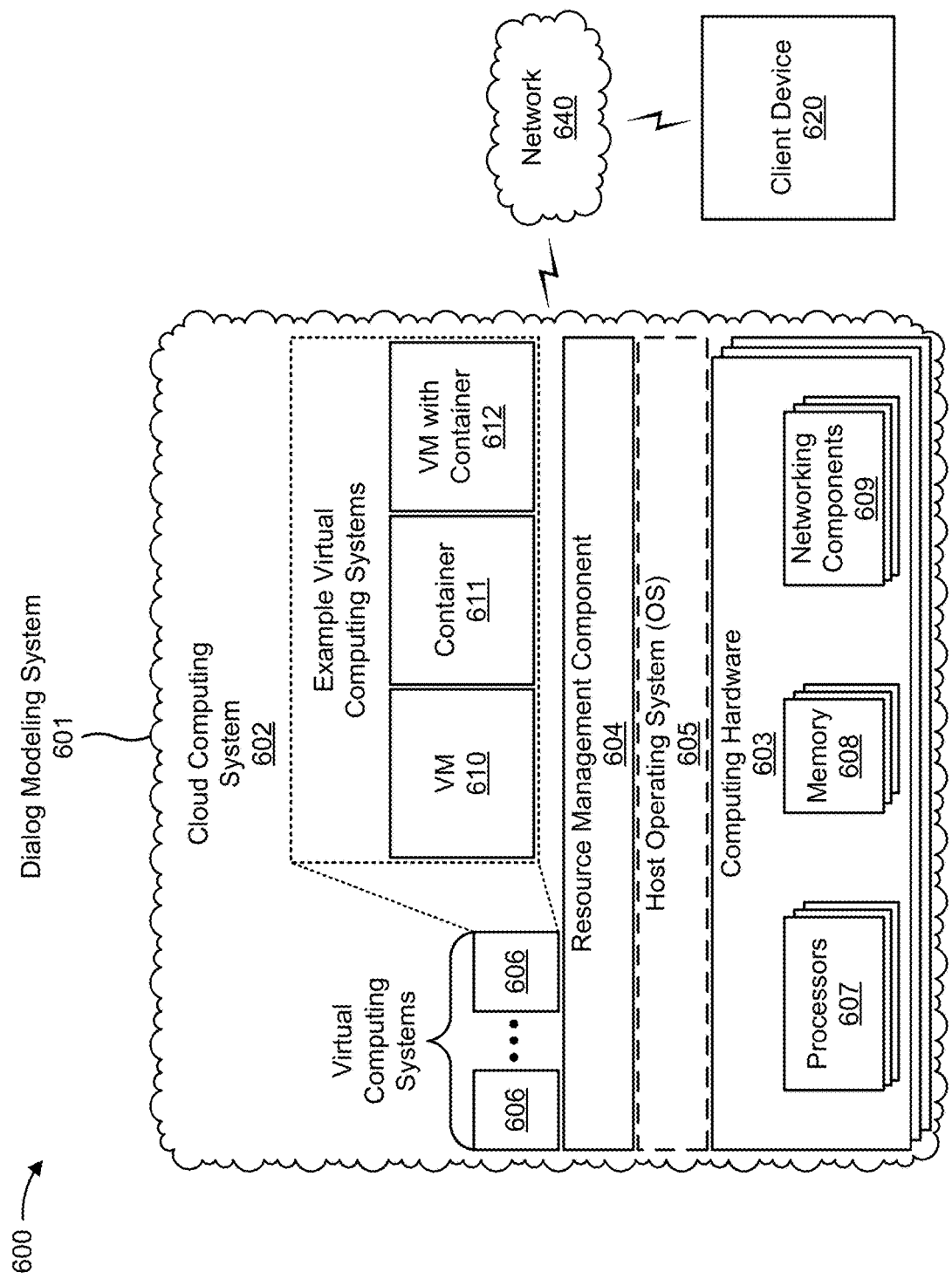
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a dialog modeling system 601, which may include one or more elements of and/or may execute within a cloud computing system 602. The cloud computing system 602 may include one or more elements 603-612, as described in more detail below. As further shown in FIG. 6, environment 600 may include a client device 620 and/or a network 640. Devices and/or elements of environment 600 may interconnect via wired connections and/or wireless connections.

The cloud computing system 602 includes computing hardware 603, a resource management component 604, a host operating system (OS) 605, and/or one or more virtual computing systems 606. The cloud computing system 602 may execute on, for example, an Amazon Web Services platform, a Microsoft Azure platform, or a Snowflake platform. The resource management component 604 may perform virtualization (e.g., abstraction) of computing hardware 603 to create the one or more virtual computing systems 606. Using virtualization, the resource management component 604 enables a single computing device (e.g., a computer or a server) to operate like multiple computing devices, such as by creating multiple isolated virtual computing systems 606 from computing hardware 603 of the single computing device. In this way, computing hardware 603 can operate more efficiently, with lower power consumption, higher reliability, higher availability, higher utilization, greater flexibility, and lower cost than using separate computing devices.

Computing hardware 603 includes hardware and corresponding resources from one or more computing devices. For example, computing hardware 603 may include hardware from a single computing device (e.g., a single server) or from multiple computing devices (e.g., multiple servers), such as multiple computing devices in one or more data centers. As shown, computing hardware 603 may include one or more processors 607, one or more memories 608, and/or one or more networking components 609. Examples of a processor, a memory, and a networking component (e.g., a communication component) are described elsewhere herein.

The resource management component 604 includes a virtualization application (e.g., executing on hardware, such as computing hardware 603) capable of virtualizing computing hardware 603 to start, stop, and/or manage one or more virtual computing systems 606. For example, the resource management component 604 may include a hypervisor (e.g., a bare-metal or Type 1 hypervisor, a hosted or Type 2 hypervisor, or another type of hypervisor) or a virtual machine monitor, such as when the virtual computing systems 606 are virtual machines 610. Additionally, or alternatively, the resource management component 604 may include a container manager, such as when the virtual computing systems 606 are containers 611. In some implementations, the resource management component 604 executes within and/or in coordination with a host operating system 605.

A virtual computing system 606 includes a virtual environment that enables cloud-based execution of operations and/or processes described herein using computing hardware 603. As shown, a virtual computing system 606 may include a virtual machine 610, a container 611, or a hybrid environment 612 that includes a virtual machine and a container, among other examples. A virtual computing system 606 may execute one or more applications using a file system that includes binary files, software libraries, and/or other resources required to execute applications on a guest operating system (e.g., within the virtual computing system 606) or the host operating system 605.

Although the dialog modeling system 601 may include one or more elements 603-612 of the cloud computing system 602, may execute within the cloud computing system 602, and/or may be hosted within the cloud computing system 602, in some implementations, the dialog modeling system 601 may not be cloud-based (e.g., may be implemented outside of a cloud computing system) or may be partially cloud-based. For example, the dialog modeling system 601 may include one or more devices that are not part of the cloud computing system 602, such as device 700 of FIG. 7, which may include a standalone server or another type of computing device. The dialog modeling system 601 may perform one or more operations and/or processes described in more detail elsewhere herein.

The client device 620 includes one or more devices capable of receiving, generating, storing, processing, and/or providing information associated with a DFSA and/or a WFSA that may be used to support dialog flow inferencing for a human-machine interface, as described elsewhere herein. The client device 620 may include a communication device and/or a computing device. For example, the client device 620 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Additionally, or alternatively, the client device 620 may include a server, such as an application server, a client server, a web server, a database server, a host server, a proxy server, a virtual server (e.g., executing on computing hardware), or a server in a cloud computing system. In some implementations, the server device 620 includes computing hardware used in a cloud computing environment (e.g., cloud computing system 602).

Network 640 includes one or more wired and/or wireless networks. For example, network 640 may include a cellular network, a public land mobile network (PLMN), a local area network (LAN), a wide area network (WAN), a private network, the Internet, and/or a combination of these or other types of networks. The network 640 enables communication among the devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
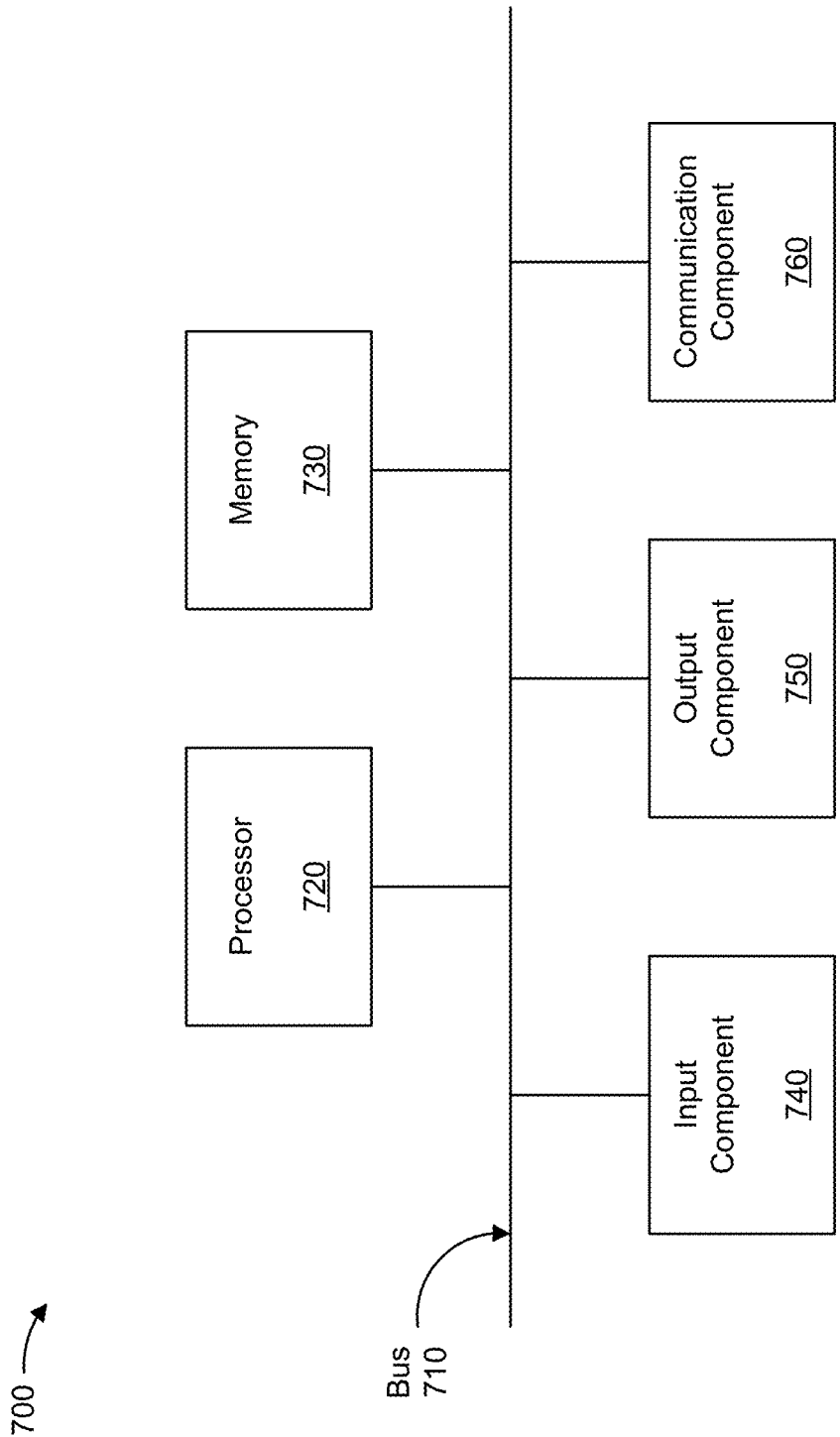
FIG. 7 is a diagram of example components of one or more devices of FIG. 6.

FIG. 7 is a diagram of example components of a device 700, which may correspond to dialog modeling system 601 and/or client device 620. In some implementations, dialog modeling system 601 and/or client device 620 include one or more devices 700 and/or one or more components of device 700. As shown in FIG. 7, device 700 may include a bus 710, a processor 720, a memory 730, an input component 740, an output component 750, and a communication component 760.

Bus 710 includes one or more components that enable wired and/or wireless communication among the components of device 700. Bus 710 may couple together two or more components of FIG. 7, such as via operative coupling, communicative coupling, electronic coupling, and/or electric coupling. Processor 720 includes a central processing unit, a graphics processing unit, a microprocessor, a controller, a microcontroller, a digital signal processor, a field-programmable gate array, an application-specific integrated circuit, and/or another type of processing component. Processor 720 is implemented in hardware, firmware, or a combination of hardware and software. In some implementations, processor 720 includes one or more processors capable of being programmed to perform one or more operations or processes described elsewhere herein.

Memory 730 includes volatile and/or nonvolatile memory. For example, memory 730 may include random access memory (RAM), read only memory (ROM), a hard disk drive, and/or another type of memory (e.g., a flash memory, a magnetic memory, and/or an optical memory). Memory 730 may include internal memory (e.g., RAM, ROM, or a hard disk drive) and/or removable memory (e.g., removable via a universal serial bus connection). Memory 730 may be a non-transitory computer-readable medium. Memory 730 stores information, instructions, and/or software (e.g., one or more software applications) related to the operation of device 700. In some implementations, memory 730 includes one or more memories that are coupled to one or more processors (e.g., processor 720), such as via bus 710.

Input component 740 enables device 700 to receive input, such as user input and/or sensed input. For example, input component 740 may include a touch screen, a keyboard, a keypad, a mouse, a button, a microphone, a switch, a sensor, a global positioning system sensor, an accelerometer, a gyroscope, and/or an actuator. Output component 750 enables device 700 to provide output, such as via a display, a speaker, and/or a light-emitting diode. Communication component 760 enables device 700 to communicate with other devices via a wired connection and/or a wireless connection. For example, communication component 760 may include a receiver, a transmitter, a transceiver, a modem, a network interface card, and/or an antenna.

Device 700 may perform one or more operations or processes described herein. For example, a non-transitory computer-readable medium (e.g., memory 730) may store a set of instructions (e.g., one or more instructions or code) for execution by processor 720. Processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry is used instead of or in combination with the instructions to perform one or more operations or processes described herein. Additionally, or alternatively, processor 720 may be configured to perform one or more operations or processes described herein. Thus, implementations described herein are not limited to any specific combination of hardware circuitry and software.

The number and arrangement of components shown in FIG. 7 are provided as an example. Device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
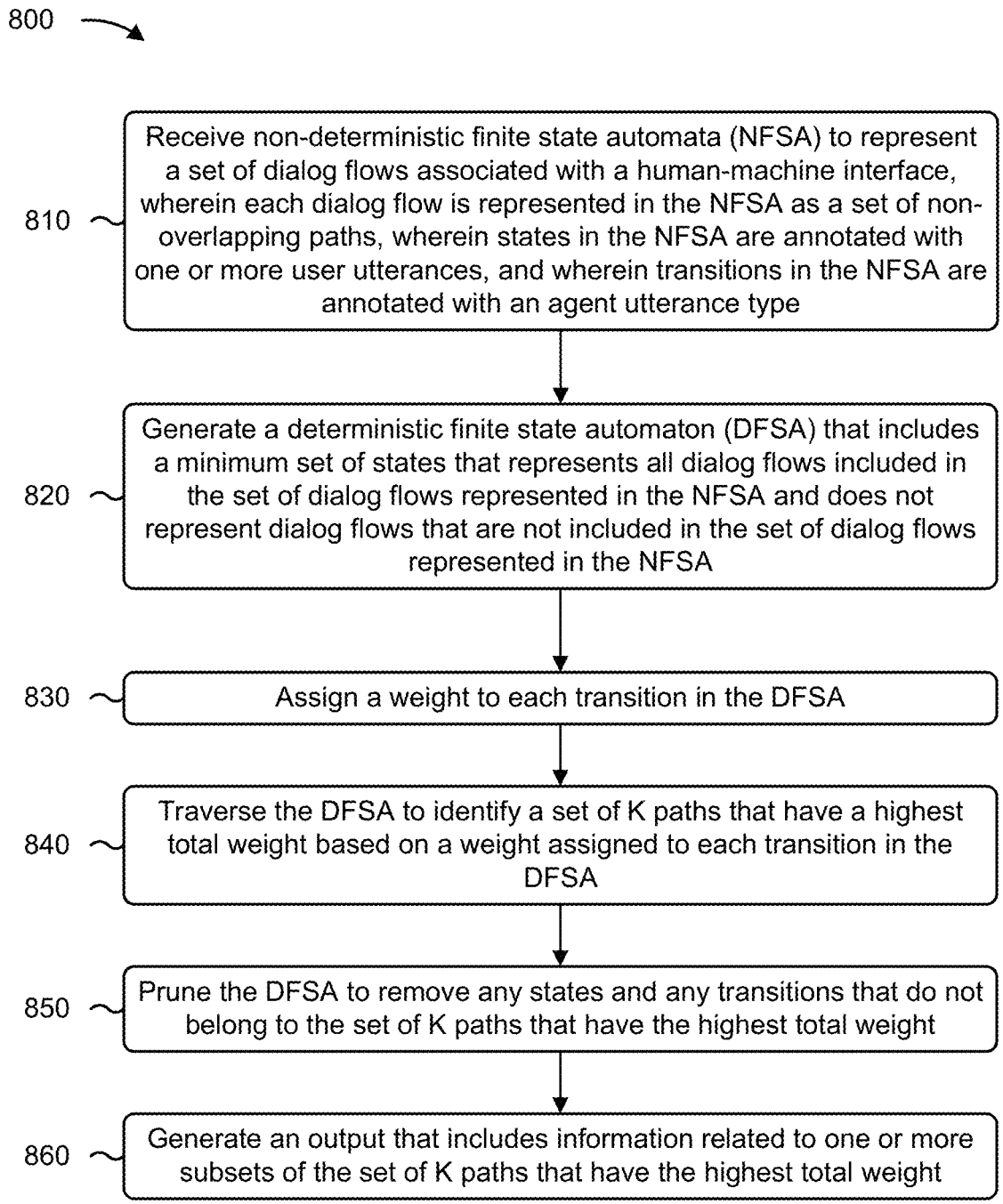
FIG. 8 is a flowchart of an example process associated with generating a DFSA and/or a WFSA to model dialog flows that may be used in an automated conversational flow system.

FIG. 8 is a flowchart of an example process 800 associated with dialog flow inference based on a DFSA and/or a WFSA. In some implementations, one or more process blocks of FIG. 8 are performed by a dialog modeling system (e.g., dialog modeling system 601). In some implementations, one or more process blocks of FIG. 8 are performed by another device or a group of devices separate from or including the dialog modeling system, such as a client device (e.g., client device 620). Additionally, or alternatively, one or more process blocks of FIG. 8 may be performed by one or more components of device 700, such as processor 720, memory 730, input component 740, output component 750, and/or communication component 760.

As shown in FIG. 8, process 800 may include receiving NFSA to represent a set of dialog flows associated with a human-machine interface (block 810). For example, the dialog modeling system may receive NFSA to represent a set of dialog flows associated with a human-machine interface, as described above. In some implementations, each dialog flow is represented in the NFSA as a set of non-overlapping paths. In some implementations, states in the NFSA are annotated with one or more user utterances. In some implementations, transitions in the NFSA are annotated with an agent utterance type.

As further shown in FIG. 8, process 800 may include generating a DFSA that includes a minimum set of states that represents all dialog flows included in the set of dialog flows represented in the NFSA and does not represent dialog flows that are not included in the set of dialog flows represented in the NFSA (block 820). For example, the dialog modeling system may generate a DFSA that includes a minimum set of states that represents all dialog flows included in the set of dialog flows represented in the NFSA and does not represent dialog flows that are not included in the set of dialog flows represented in the NFSA, as described above.

As further shown in FIG. 8, process 800 may include assigning a weight to each transition in the DFSA (block 830). For example, the dialog modeling system may assign a weight to each transition in the DFSA, as described above.

As further shown in FIG. 8, process 800 may include traversing the DFSA to identify a set of K paths that have a highest total weight based on a weight assigned to each transition in the DFSA (block 840). For example, the dialog modeling system may traverse the DFSA to identify a set of K paths that have a highest total weight based on a weight assigned to each transition in the DFSA, as described above.

As further shown in FIG. 8, process 800 may include pruning the DFSA to remove any states and any transitions that do not belong to the set of K paths that have the highest total weight (block 850). For example, the dialog modeling system may prune the DFSA to remove any states and any transitions that do not belong to the set of K paths that have the highest total weight, as described above.

As further shown in FIG. 8, process 800 may include generating an output that includes information related to one or more subsets of the set of K paths that have the highest total weight (block 860). For example, the dialog modeling system may generate an output that includes information related to one or more subsets of the set of K paths that have the highest total weight, as described above.

Process 800 may include additional implementations, such as any single implementation or any combination of implementations described below and/or in connection with one or more other processes described elsewhere herein.

In a first implementation, generating the DFSA includes collapsing, from an end of the NFSA to a beginning of the NFSA, one or more states in the NFSA that are reachable by a common input symbol, and collapsing, from the beginning of the NFSA to the end of the NFSA, one or more states in the NFSA that are reachable by a common input symbol.

In a second implementation, alone or in combination with the first implementation, the weight assigned to each transition in the DFSA is based on a frequency that is based on a quantity of times that an equivalent transition is represented in the set of dialog flows represented by the NFSA.

In a third implementation, alone or in combination with one or more of the first and second implementations, the weight assigned to each transition in the DFSA is based on a probability that is based on a frequency associated with the transition relative a total quantity of outgoing transitions from a source state associated with the respective transition.

In a fourth implementation, alone or in combination with one or more of the first through third implementations, traversing the DFSA to identify the set of K paths that have the highest total weight includes adding a temporary final state to the DFSA, wherein each transition to the temporary final state has a null weight, and traversing the DFSA by following a topological sort, in a forward direction from an initial state of the DFSA to the temporary final state, wherein traversing the DFSA includes associating each respective state in the DFSA with K or fewer highest cumulative weights based on the weight assigned to each respective transition that is included in up to K paths that led to the respective state.

In a fifth implementation, alone or in combination with one or more of the first through fourth implementations, pruning the DFSA includes assigning, at the temporary final state, respective ranks to each path in the set of K paths that have the highest total weight, and traversing the DFSA by following a reverse of the topological sort, in a backward direction from the temporary final state to the initial state of the DFSA, to propagate the respective ranks to the transitions that are included in the set of K paths, wherein the states and the transitions that are removed from the DFSA include states and transitions that are not associated with one or more of the respective ranks associated with the set of K paths that have the highest total weight, and removing the temporary final state from the DFSA.

In a sixth implementation, alone or in combination with one or more of the first through fifth implementations, the output includes a visualization or a data export of the information related to the one or more subsets of the set of K paths having the highest total weight.

In a seventh implementation, alone or in combination with one or more of the first through sixth implementations, an initial state in the DFSA includes one or more outgoing transitions to one or more states that correspond to user utterances starting a dialog.

In an eighth implementation, alone or in combination with one or more of the first through seventh implementations, process 800 includes determining, for each state in the minimized set of states included in the DFSA, N user utterances that best represent the respective state using a clustering technique, and associating each state in the minimized set of states included in the DFSA with the N user utterances that best represent the respective state.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, non-deterministic finite state automata (NFSA) to represent a set of dialog flows associated with a human-machine interface,
wherein each dialog flow is represented in the NFSA as a set of non-overlapping paths, wherein states in the NFSA are annotated with one or more user utterances, and wherein transitions in the NFSA are annotated with an agent utterance type;
generating, by the device, a deterministic finite state automaton (DFSA) that includes a minimum set of states that represents all dialog flows included in the set of dialog flows represented in the NFSA and does not represent dialog flows that are not included in the set of dialog flows represented in the NFSA;
assigning, by the device, a weight to each transition in the DFSA;
traversing, by the device, the DFSA to identify a set of K paths that have highest total weight based on the weight assigned to each transition in the DFSA;
pruning, by the device, the DFSA to remove any states and any transitions that do not belong to the set of K paths that have the highest total weight;
generating, by the device, an output that includes information related to one or more subsets of the set of K paths that have the highest total weight; and
providing, by the device, the output to an automated conversational flow system, wherein the automated conversational flow system configures a virtual agent associated with the human-machine interface to enable interaction between a user and the virtual agent.

2. The method of claim 1, wherein generating the DFSA includes:
collapsing, from an end of the NFSA to a beginning of the NFSA, one or more states in the NFSA that are reachable by a common input symbol; and
collapsing, from the beginning of the NFSA to the end of the NFSA, one or more states in the NFSA that are reachable by a common input symbol.

3. The method of claim 1, wherein the weight assigned to each transition in the DFSA is based on a frequency that is based on a quantity of times that an equivalent transition is represented in the set of dialog flows represented by the NFSA.

4. The method of claim 1, wherein the weight assigned to each transition in the DFSA is based on a probability that is based on a frequency associated with the transition relative to a total quantity of outgoing transitions from a source state associated with the respective transition.

5. The method of claim 1, wherein traversing the DFSA to identify the set of K paths that have the highest total weight includes:
adding a temporary final state to the DFSA, wherein each transition to the temporary final state has a null weight; and
traversing the DFSA by following a topological sort, in a forward direction from an initial state of the DFSA to the temporary final state,
wherein traversing the DFSA includes associating each respective state in the DFSA with K or fewer highest cumulative weights based on the weight assigned to each respective transition that is included in up to K paths that led to the respective state.

6. The method of claim 5, wherein pruning the DFSA includes:
assigning, at the temporary final state, respective ranks to each path in the set of K paths that have the highest total weight; and
traversing the DFSA by following a reverse of the topological sort, in a backward direction from the temporary final state to the initial state of the DFSA, to propagate the respective ranks to the transitions that are included in the set of K paths,
wherein the states and the transitions that are removed from the DFSA include states and transitions that are not associated with one or more of the respective ranks associated with the set of K paths that have the highest total weight; and
removing the temporary final state from the DFSA.

7. The method of claim 1, wherein the output includes a visualization or a data export of the information related to the one or more subsets of the set of K paths having the highest total weight.

8. The method of claim 1, wherein an initial state in the DFSA includes one or more outgoing transitions to one or more states that correspond to user utterances starting a dialog.

9. The method of claim 1, further comprising:
determining, for each state in the minimized set of states included in the DFSA, N user utterances that best represent the respective state using a clustering technique; and
associating each state in the minimized set of states included in the DFSA with the N user utterances that best represent the respective state.

10. A dialog modeling system, comprising:
one or more memories; and
one or more processors, coupled to the one or more memories, configured to:
receive non-deterministic finite state automata (NFSA) to represent a set of dialog flows associated with a human-machine interface,
wherein each dialog flow is represented in the NFSA as a set of non overlapping paths, wherein states in the NFSA are annotated with one or more user utterances, and wherein transitions in the NFSA are annotated with an agent utterance type;
generate a deterministic finite state automaton (DFSA) that includes a minimum set of states that represents all dialog flows included in the set of dialog flows represented in the NFSA and does not represent dialog flows that are not included in the set of dialog flows represented in the NFSA;
assign a weight to each transition in the DFSA;
traverse the DFSA to identify a set of K paths that have a highest total weight based on a weight assigned to each transition in the DFSA;
prune the DFSA to remove any states and any transitions that do not belong to the set of K paths that have the highest total weight;
generate an output that includes information related to one or more subsets of the set of K paths that have the highest total weight; and
provide the output to an automated conversational flow system, wherein the automated conversational flow system configures a virtual agent associated with the human-machine interface to enable interaction between a user and the virtual agent.

11. The dialog modeling system of claim 10, wherein the one or more processors, to generate the DFSA, are configured to:
collapse, from an end of the NFSA to a beginning of the NFSA, one or more states in the NFSA that are reachable by a common input symbol; and
collapse, from the beginning of the NFSA to the end of the NFSA, one or more states in the NFSA that are reachable by a common input symbol.

12. The dialog modeling system of claim 10, wherein the weight assigned to each transition in the DFSA is based on one or more of a frequency, a probability, or a rank.

13. The dialog modeling system of claim 10, wherein the one or more processors, to traverse the DFSA to identify the set of K paths that have the highest total weight, are configured to:
add a temporary final state to the DFSA, wherein each transition to the temporary final state has a null weight;
traverse the DFSA by following a topological sort, in a forward direction from an initial state of the DFSA to the temporary final state,
  wherein the one or more processors, to traverse the DFSA, are configured to associate each respective state in the DFSA with K or fewer highest cumulative weights based on the weight assigned to each respective transition that is included in up to K paths that led to the respective state;
assign, at the temporary final state, respective ranks to each path in the set of K paths that have the highest total weight; and
traverse the DFSA by following a reverse of the topological sort, in a backward direction from the temporary final state to the initial state of the DFSA, to propagate the respective ranks to the transitions that are included in the set of K paths,
  wherein the states and the transitions that are removed from the DFSA include states and transitions that are not associated with one or more of the respective ranks associated with the set of K paths that have the highest total weight; and
remove the temporary final state from the DFSA.

14. The dialog modeling system of claim 10, wherein an initial state in the DFSA includes one or more outgoing transitions to one or more states that correspond to user utterances starting a dialog.

15. The dialog modeling system of claim 10, wherein the one or more processors are further configured to:
determine, for each state in the minimized set of states included in the DFSA, N user utterances that best represent the respective state using a clustering technique; and
associate each state in the minimized set of states included in the DFSA with the N user utterances that best represent the respective state.

16. A non-transitory computer-readable medium storing a set of instructions, the set of instructions comprising:
one or more instructions that, when executed by one or more processors of a dialog modeling system, cause the dialog modeling system to:
receive non-deterministic finite state automata (NFSA) to represent a set of dialog flows associated with a human-machine interface,
  wherein each dialog flow is represented in the NFSA as a set of non overlapping paths, wherein states in the NFSA are annotated with one or more user utterances, and wherein transitions in the NFSA are annotated with an agent utterance type;
generate a deterministic finite state automaton (DFSA) that includes a minimum set of states that represents all dialog flows included in the set of dialog flows represented in the NFSA and does not represent dialog flows that are not included in the set of dialog flows represented in the NFSA;
assign a weight to each transition in the DFSA;
traverse the DFSA to identify a set of K paths that have a highest total weight based on a weight assigned to each transition in the DFSA;
prune the DFSA to remove any states and any transitions that do not belong to the set of K paths that have the highest total weight;
generate an output that includes information related to one or more subsets of the set of K paths that have the highest total weight; and
provide the output to an automated conversational flow system, wherein the automated conversational flow system configures a virtual agent associated with the human-machine interface to enable interaction between a user and the virtual agent.

17. The non-transitory computer-readable medium of claim 16, wherein the weight assigned to each transition in the DFSA is based on a frequency that is based on a quantity of times that an equivalent transition is represented in the set of dialog flows represented by the NFSA.

18. The non-transitory computer-readable medium of claim 16, wherein the weight assigned to each transition in the DFSA is based on a probability that is based on a frequency associated with the transition relative to a total quantity of outgoing transitions from a source state associated with the respective transition.

19. The non-transitory computer-readable medium of claim 16, wherein the output includes a visualization or a data export of the information related to the one or more subsets of the set of K paths having the highest total weight.

20. The non-transitory computer-readable medium of claim 16, wherein an initial state in the DFSA includes one or more outgoing transitions to one or more states that correspond to user utterances starting a dialog.

* * * * *